United States Patent [19]

McClure et al.

[11] 4,028,500
[45] June 7, 1977

[54] MOBILE UNIT SUPERVISORY CONTROL SEQUENCER AND METHOD

[75] Inventors: George F. McClure, Winter Park; John Richard Endicott, Maitland; Lionel D. Freeman; Marion L. Cunningham, both of Orlando; Joel D. Wells, Orlando, all of Fla.

[73] Assignee: Martin Marietta Corporation, Orlando, Fla.

[22] Filed: Apr. 21, 1975

[21] Appl. No.: 569,677

Related U.S. Application Data

[63] Continuation-in-part of Ser. No. 360,560, May 15, 1973, Pat. No. 3,898,390.

[52] U.S. Cl. .................. 179/41 A; 179/90 K; 179/90 B; 325/55; 325/64
[51] Int. Cl.² .................................. H04M 7/04
[58] Field of Search ............ 179/41 A, 90 K, 90 B, 179/90 BB, 90 BD, 90 AN, 15 BZ; 325/16, 55, 64

[56] References Cited

UNITED STATES PATENTS

| | | | |
|---|---|---|---|
| 2,168,602 | 8/1939 | Hassan | 340/311 |
| 3,320,368 | 5/1967 | Applebaum | 179/84 C |
| 3,662,118 | 5/1972 | Phoenix et al. | 179/90 B |
| 3,668,526 | 6/1972 | Raskin | 179/41 A |
| 3,729,595 | 4/1973 | Sarati et al. | 179/41 A |
| 3,743,792 | 7/1973 | Duff et al. | 179/84 C |
| 3,760,121 | 9/1973 | Nissim | 179/90 K |
| 3,792,203 | 2/1974 | Martin | 179/90 B |
| 3,806,663 | 4/1974 | Peek et al. | 179/41 A |
| 3,819,873 | 6/1974 | Stockton et al. | 179/84 C |
| 3,859,475 | 1/1975 | Wulfsberg et al. | 179/41 A |

Primary Examiner—Kathleen H. Claffy
Assistant Examiner—Gerald L. Brigance
Attorney, Agent, or Firm—Burns, Doane, Swecker & Mathis

[57] ABSTRACT

A mobile communication unit providing simplified calling procedures and thus an increase in the effective use of communication channels. An address signal representing a telephone system subscriber may be entered into a storage register in the mobile unit and the address signal in the register is displayed. A manually depressable call switch is depressed to generate a call initiation signal and a call-up signal including the stored and displayed address signal is broadcast in response to the generation of said call initiation signal through the manual depression of said call switch. A response signal acknowledging said call-up signal is received and receipt of said response signal is automatically indicated. Two-way voice communication is established over a two-way communication channel in response to removal of a handset from cooperating relationship with a hook-switch. The handset and hook-switch are independent of the manually depressable call switch so that a call may be initiated and acknowledged without removing the handset from the hook-switch. The mobile unit is operable to retain the last stored and displayed address signal for initiating the broadcast of subsequent call-up signals and the mobile unit includes means independent of said handset and hook-switch for clearing the stored address. Provision is made for storing a number of frequently called addresses and retrieving the addresses on demand of the mobile unit operator to further increase the ease of operation.

39 Claims, 30 Drawing Figures

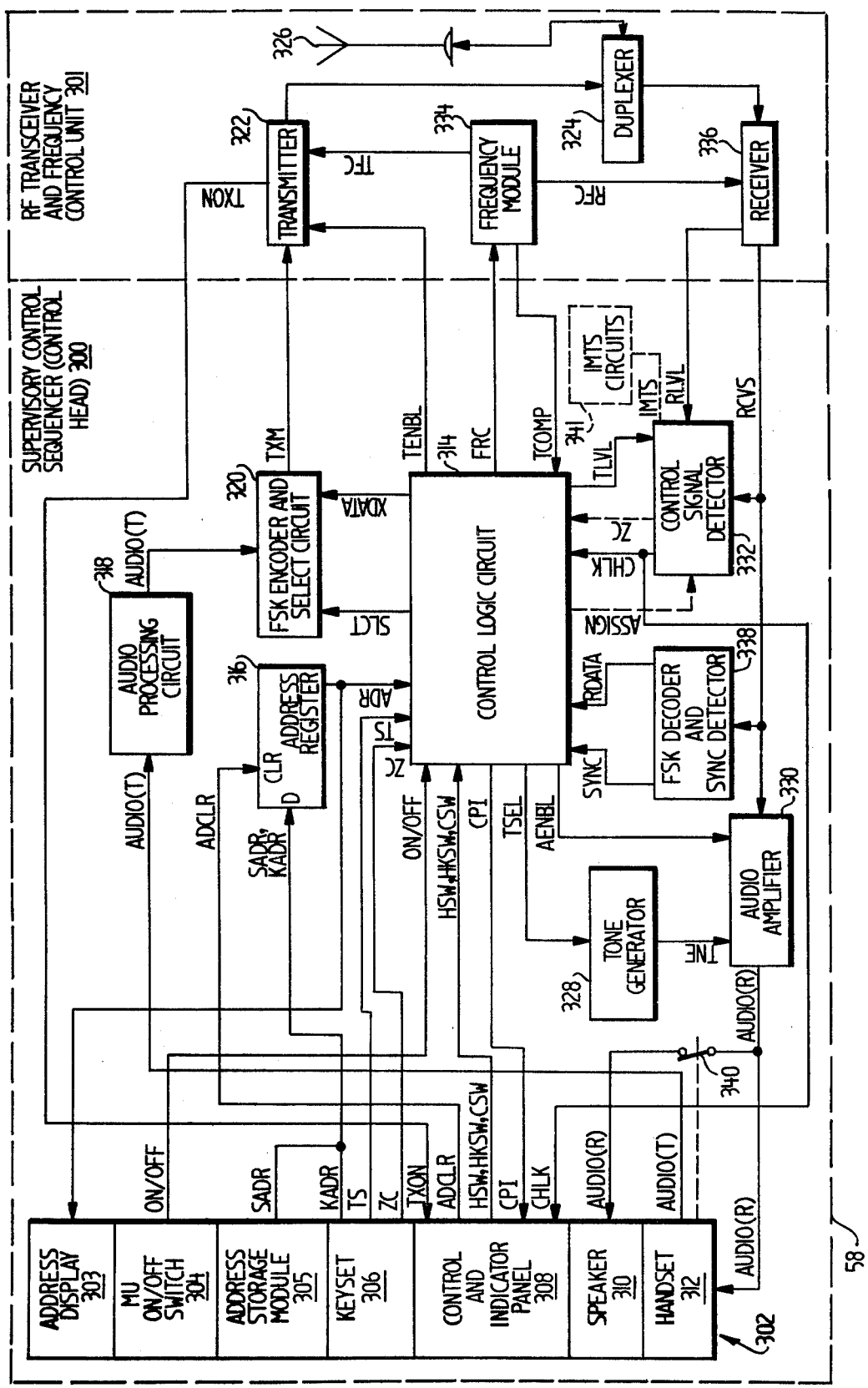
FIG. 2 MOBILE UNIT

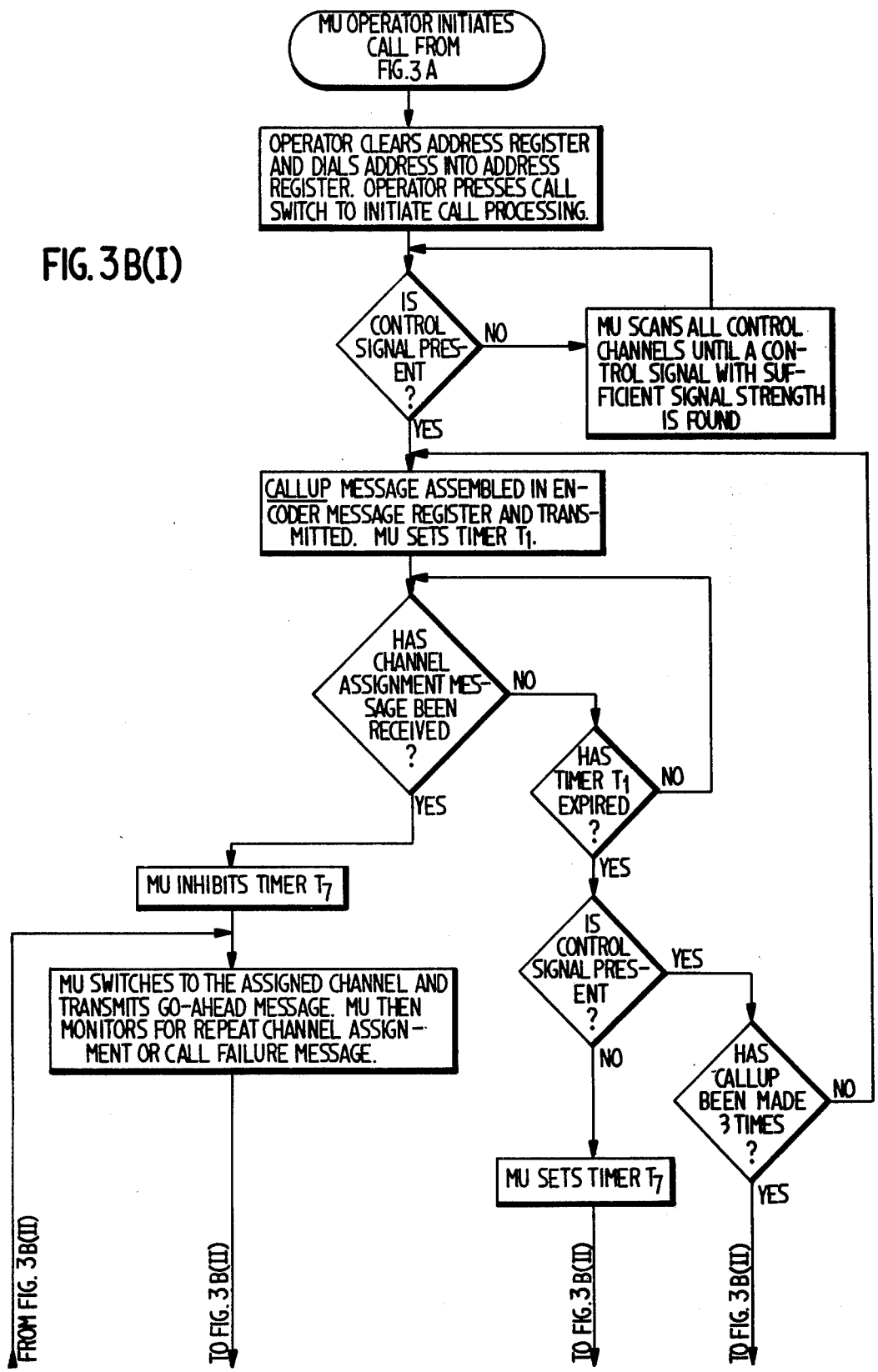

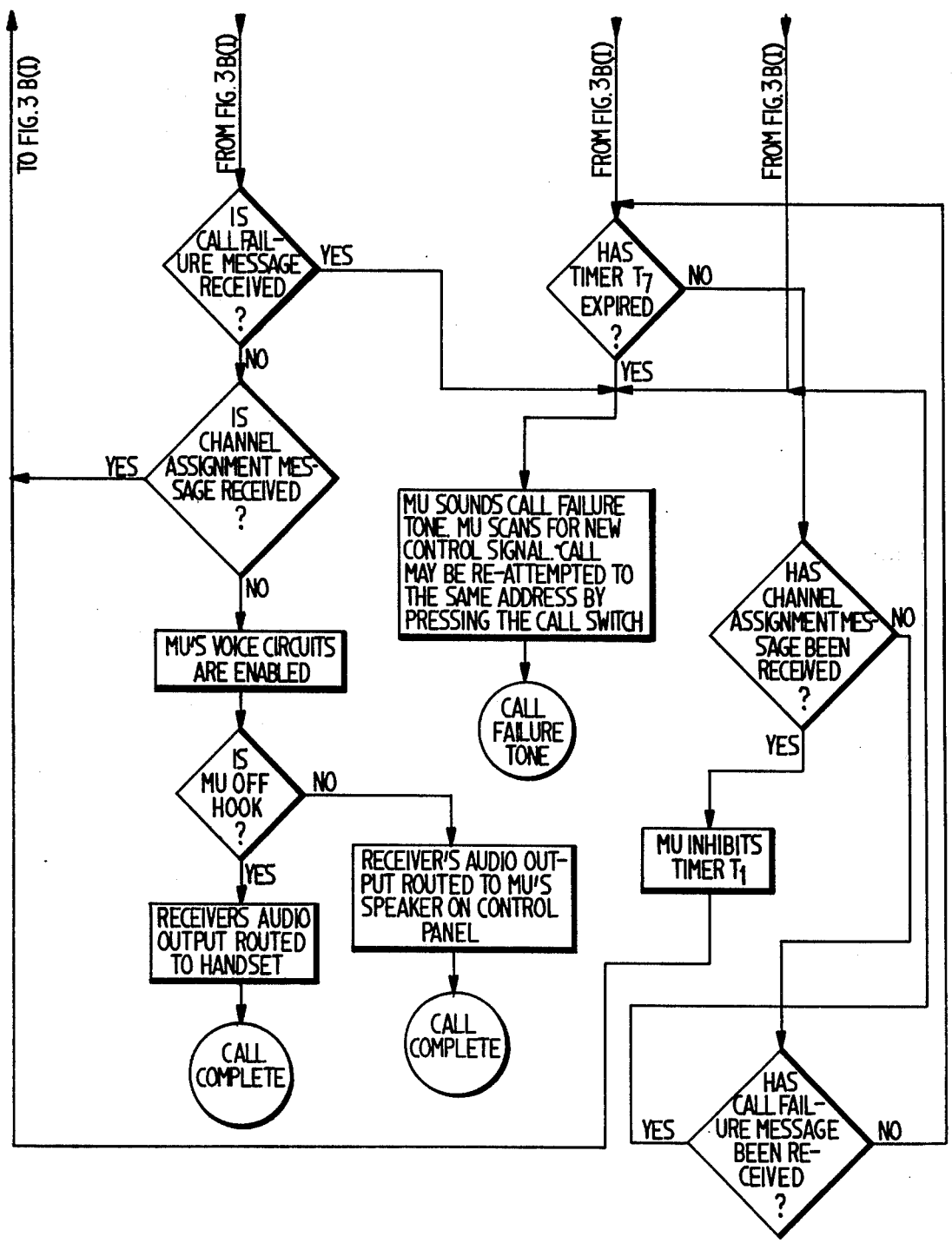
FIG. 3B(II)

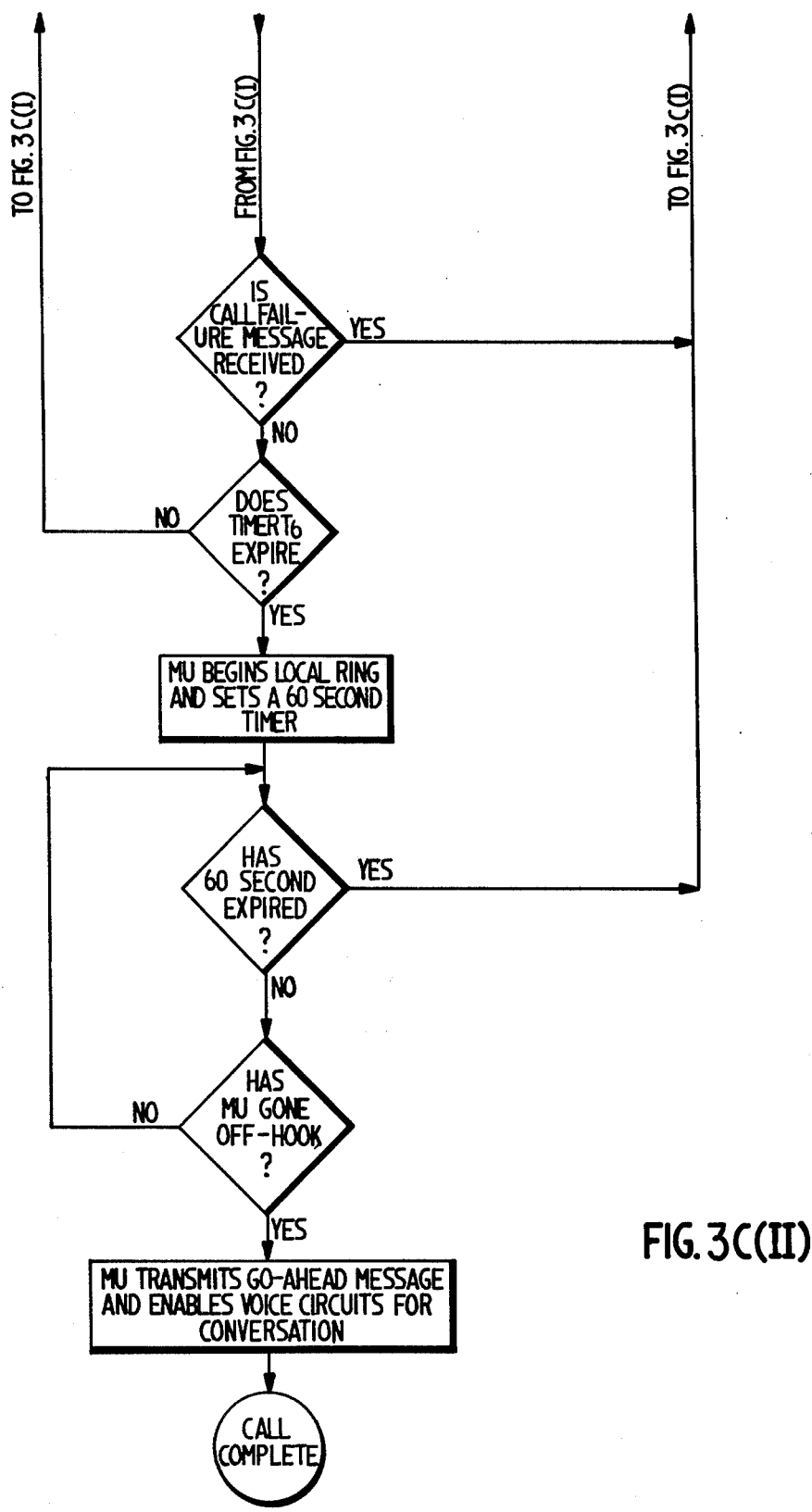
FIG. 3C(II)

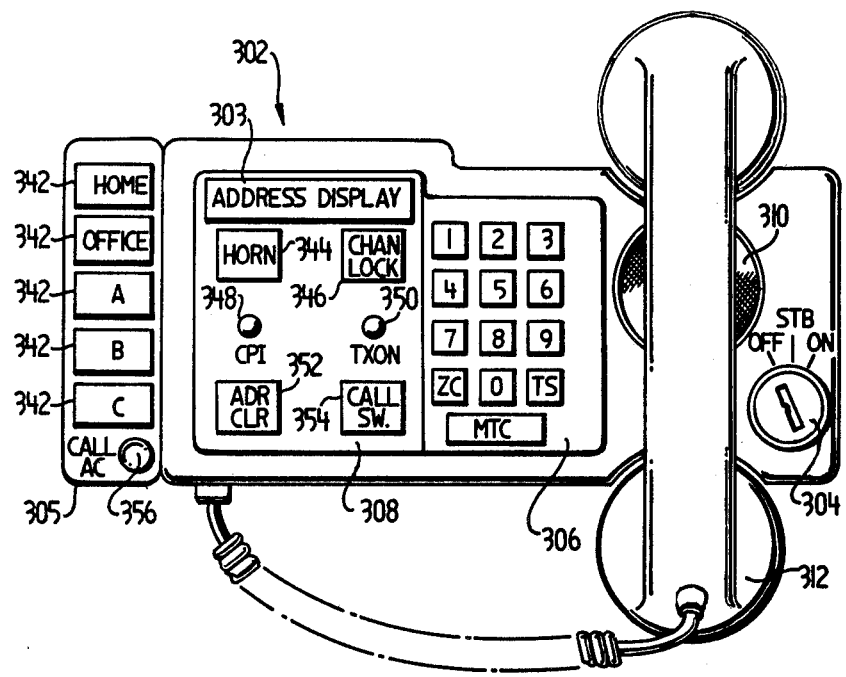
FIG. 4 MOBILE UNIT INPUT/OUTPUT PANEL
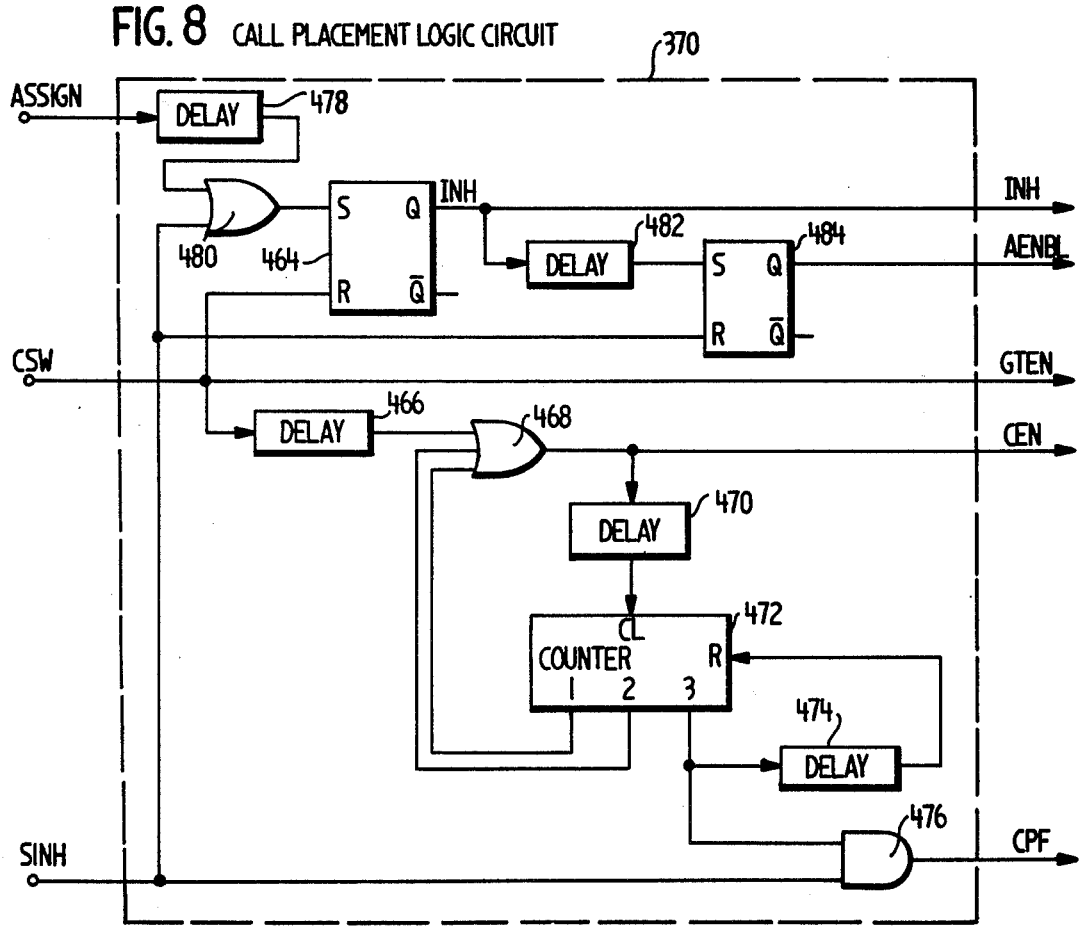
FIG. 8 CALL PLACEMENT LOGIC CIRCUIT

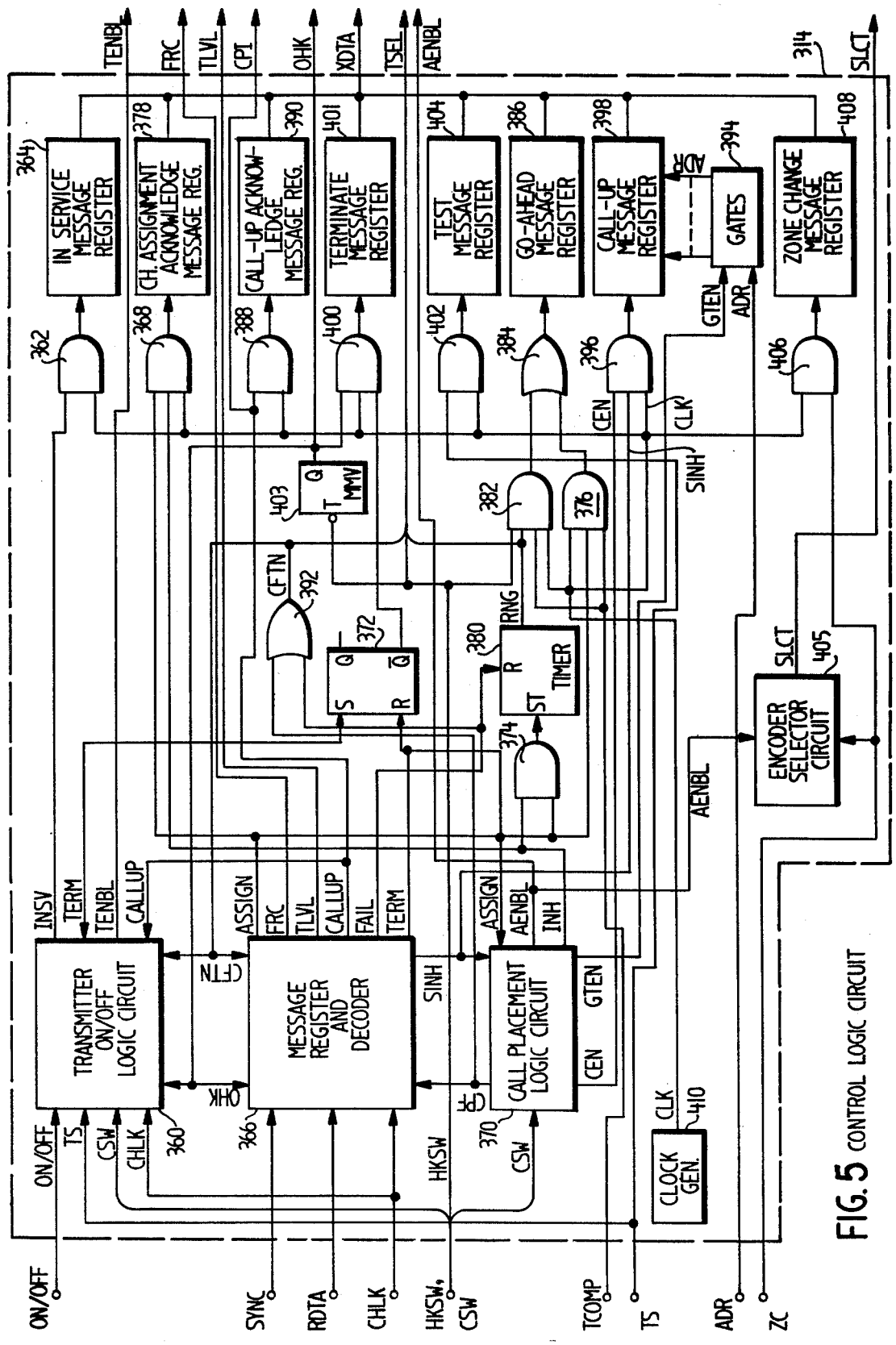
FIG. 5 CONTROL LOGIC CIRCUIT

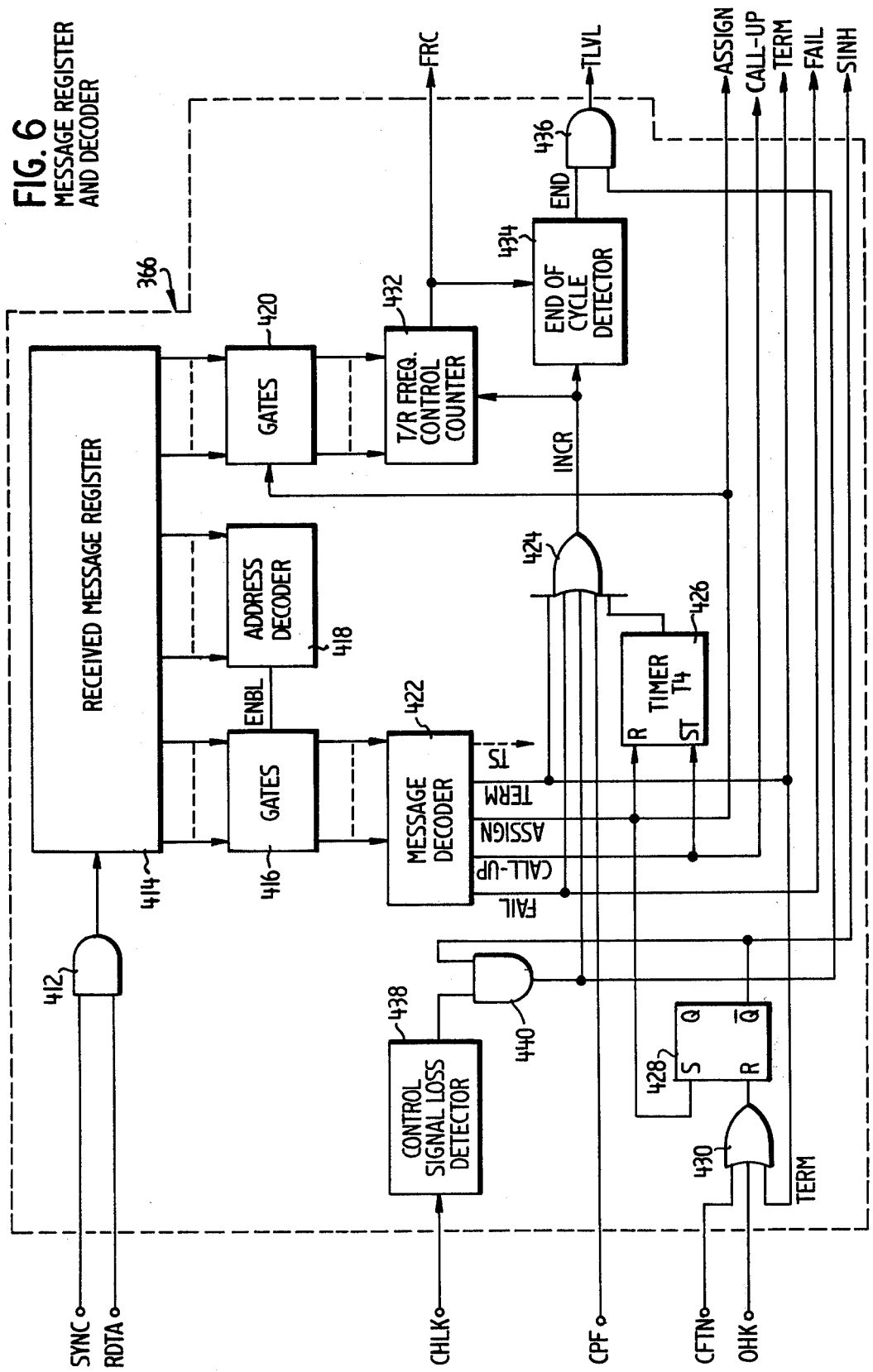

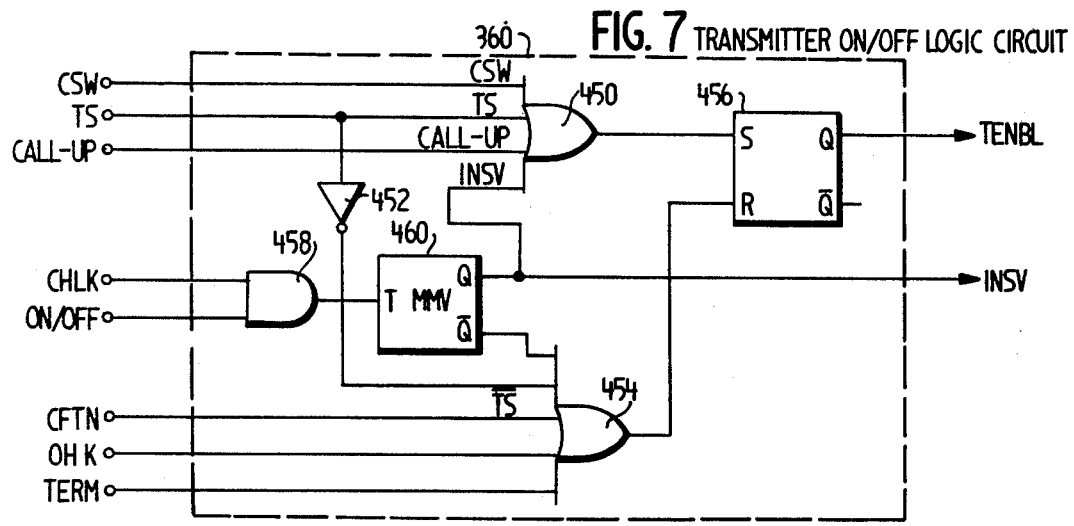
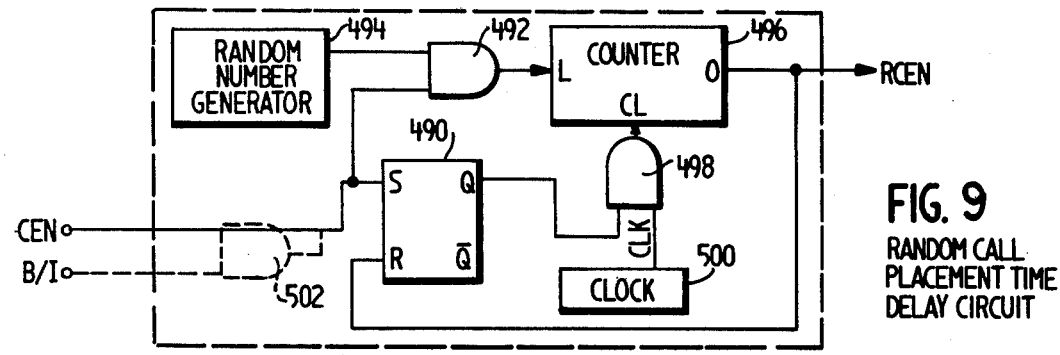

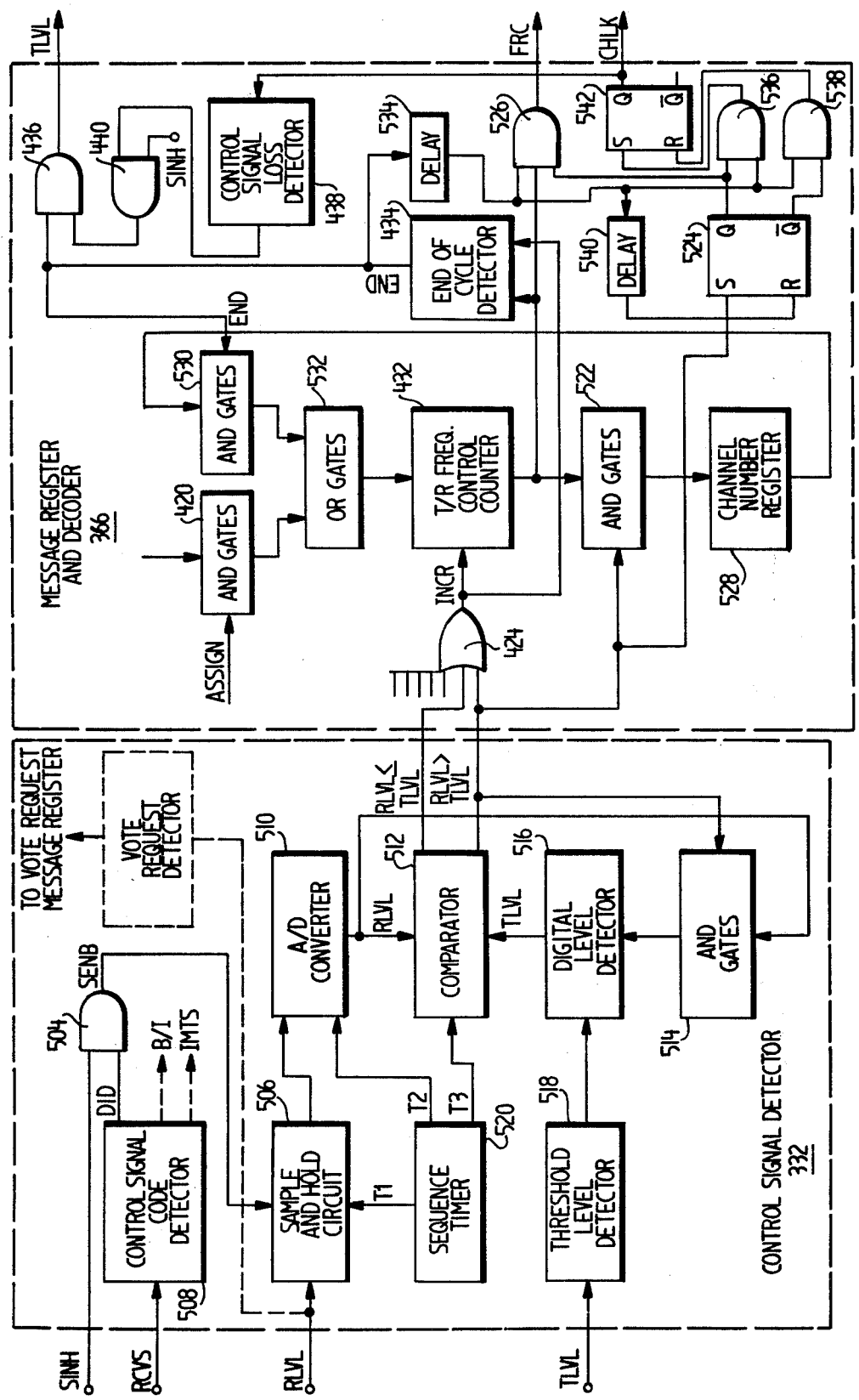
FIG. 10 CONTROL SIGNAL SELECTOR

RF TRANSCEIVER AND FREQUENCY CONTROL UNIT

MOBILE UNIT SUPERVISORY CONTROL SEQUENCER AND METHOD

RELATED APPLICATIONS

This application is a Continuation-in-part of copending U.S. patent application Ser. No. 360,560 filed May 15, 1973 for "Multiple Zone Communication System and Method." Said application Ser. No. 360,560 is now Pat. No. 3,898,390.

BACKGROUND OF THE INVENTION

The present invention relates to mobile radio communications systems and, in particular, to a novel method and mobile radio communications unit for more convenient initiation of calls and for increasing the effective use of communication channels assigned for mobile telephone service.

Approximately 12 communication channels, each including two distinct frequencies for two-way communications (an up-link and a down-link), are typically available for use in present day mobile telephone systems. In one known system, usually referred to as Improved Mobile Telephone Service (IMTS), communication is established over the available channels from a wire line telephone system to mobile units through the use of transmitters which transmit omnidirectionally throughout a large geographical area or zone from an antenna approximately centered in the area. A plurality of satellite receivers are spaced throughout the geographical area to receive transmissions from the mobile units and relay the transmissions to the central location. Calls are established through seizure of a marked idle channel by a mobile unit and by placing or receiving a call over the seized marked idle channel.

With only 12 channels available for use in this type of system, only 12 simultaneous conversations are possible and, not only is the total number of subscribers in a service area necessarily limited, but also the subscribers who do obtain service tend to find circuits busy a very high percentage of the time when attempting to place a call. It can thus be seen that 12-channel systems based upon large zone coverage from a central location have been unable to meet present user demands, let alone future requirements for mobile radiotelephone service.

It has been proposed that a large number of channels in about the 900 MHz. band be allocated for mobile telephone use. This increase in the number of available channels will, of course, result in an increase in the number of users that the system is capable of serving. However, known systems do not lend themselves to the effective use of this larger channel allocation particularly in view of the signaling approaches employed. Moreover, known systems do not provide the degree of flexibility which will eventually be desired in mobile telephone systems having a large number of subscribers who are, to at least some extent, free to move over relatively long distances within and/or between one or more distinct mobile telephone systems.

The mobile telephone units utilized with known radiotelephone systems present other unique problems both in IMTS applications and more advanced systems designed for larger channel allocation. For example, present user dialing procedures and IMTS signaling methods are relatively inefficient and waste considerable air time. Each call from the mobile unit in a mobile telephone system requires transmitting the user's Automatic Number (identification) (hereinafter ANI), consisting of seven digits, and the called number, which may be seven or 10 digits. The time required to transmit 17 digits using conventional IMTS tone signaling techniques is on the order of 20 seconds. Although the user is billed for this time, the net effect is a loss of revenue to the operating companies, increased billing costs to the subscriber and considerable customer dissatisfaction with the service provided.

Moreover, mobile telephone units are typically installed in automobiles or other such vehicles and the operators' attention must ordinarily be directed primarily to the operation of the vehicle. With known mobile telephone units, the unit scans the available spectrum for an idle channel and locks onto the idle channel if one is so designated. The telephone handset must be lifted from the hook-switch to place a call and, when the handset is lifted, the unit may be either scanning or locked onto the idle channel. If the unit is scanning, the scanning stops and no dial tone is present. The user must therefore hang up and try again. If a dial tone is present signifying that the unit is locked onto an idle channel, the idle channel is seized and the user must then dial the desired number.

It is, of course, quite inconvenient and may be dangerous to place a call in this manner if the vehicle is in motion. Known approaches to initiating and establishing a call are additionally time consuming and require considerable effort on the part of the mobile telephone unit operator. Moreover, from the time the idle channel is seized until the call has been completed, that channel is unavailable for use by others. Since this time period includes dialing time and perhaps other wasted time, the overall use of the available channels is inefficient. Also, experience indicates that misdialing, in a vehicular environment, is a frequent occurrence, which results in additional loss of air time and higher cost to the user.

It is accordingly an object of the present invention to provide a novel method and mobile communication unit for increasing the effective use of available communication channels.

It is an object of the present invention to provide a novel method and mobile communication unit for more effectively employing a large number of communication channels allocated to the system.

It is a further object of the present invention to provide a novel method and mobile telephone unit for establishing and maintaining mobile telephone communications through one or more base stations in predetermined zones of a service area.

It is another object of the present invention to provide a novel method and mobile telephone unit in which a designated control channel is employed for initial call-up signaling to and from the mobile unit and for talking channel assignment.

It is still another object of the present invention to provide a novel method and mobile telephone unit operable in conjunction both with advanced signaling techniques and with known techniques.

It is still a further object of the present invention to provide a novel mobile telephone supervisory control sequencer and method for simplified placement and reception of calls by the mobile unit operator.

These and other objects and advantages are accomplished in accordance with the present invention as will become apparent to one skilled in the art to which the invention pertains from a perusal of the following detailed description and claims when read in conjunction with the drawings.

BRIEF DESCRIPTION OF THE DRAWINGS

FIG. 2 is a functional block diagram of one embodiment of a mobile unit operable in accordance with the present invention;

FIGS. 3A–3C are flow diagrams illustrating the operation of the mobile unit of FIG. 2;

FIG. 4 is a pictorial representation of one embodiment of the input/output panel of the mobile unit of FIG. 2;

FIG. 5 is a functional block diagram of one embodiment of the control logic circuit of FIG. 2;

FIG. 6 is a functional block diagram of one embodiment of the message register and decoder of FIG. 2;

FIG. 7 is a functional block diagram of one embodiment of the transmitter on/off logic circuit of FIG. 2;

FIG. 8 is a functional block diagram of one embodiment of the call placement logic circuit of FIG. 2;

FIG. 9 is a functional block diagram of one embodiment of a random call placement time delay circuit for use with the mobile unit of FIG. 2;

FIG. 10 is a functional block diagram of one embodiment of a control signal detector for use in selecting a control signal channel having the highest signal level of those signal channels received by the mobile unit of FIG. 2;

DETAILED DESCRIPTION

I. Basic System Description

In accordance with this invention, two-way calls such as telephone calls and dispatch services may be readily established between fixed units and mobile units as well as between two mobile units. As will become apparent from the following detailed description, the mobile unit in accordance with the present invention provides various features which will result in the more efficient use of radio spectrum, a reduction in time and effort required of the operator, and a greater degree of safety and convenience for the mobile unit operator. As will further become apparent to one skilled in the art to which the invention pertains, the mobile unit in accordance with the present invention is extremely versatile and provides the above features and numerous other advantages both in conjunction with known signaling techniques and other signaling techniques disclosed hereinafter.

Figure 1:
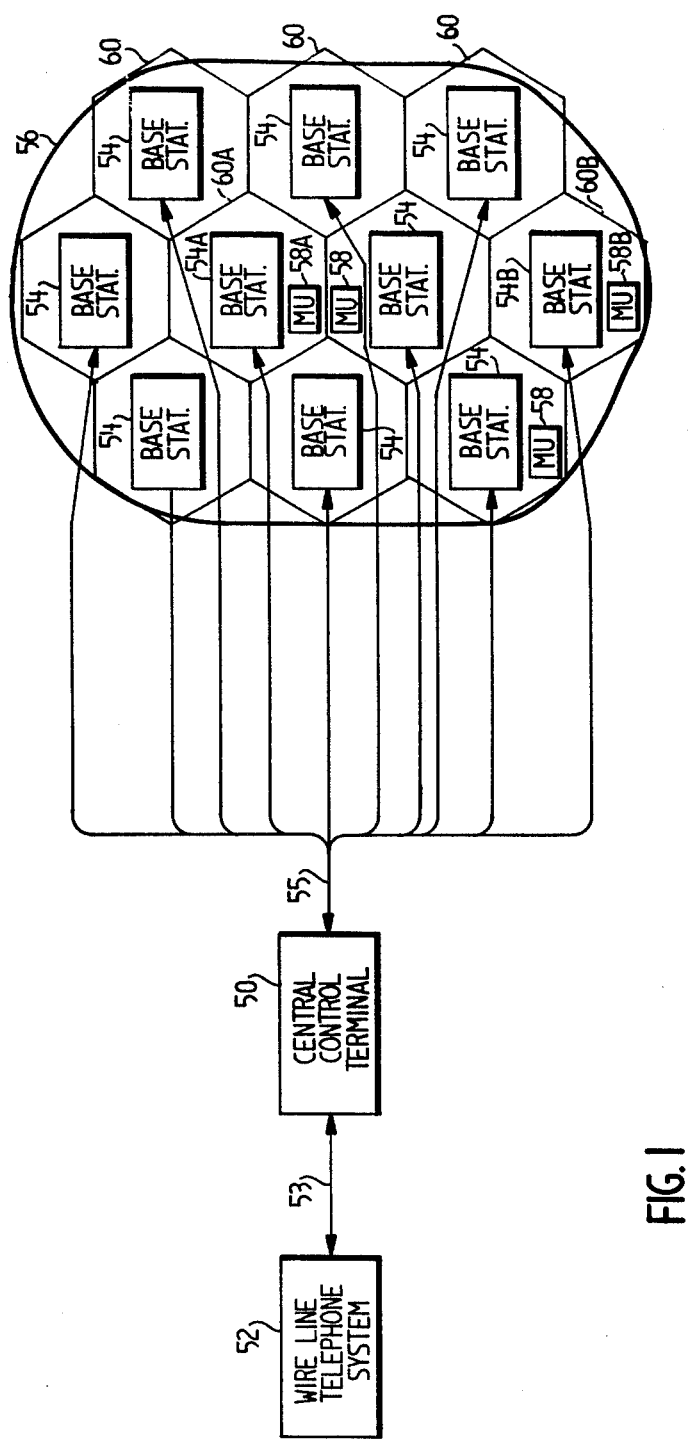
FIG. 1 is a functional block diagram illustrating a small zone mobile telephone system including mobile units operable in accordance with the present invention.

One embodiment of the present invention in the environment of a small zone mobile telephone system is generally illustrated in FIG. 1. Referring now to FIG. 1, a central control terminal 50 provides centralized control of the system. The central control terminal 50 may be accessed through any suitable switching such as the illustrated commercially installed wire line telephone system 52 and may receive and transmit telephone calls over the commercially installed telephone lines and exchanges of the system 52.

A plurality of trunk lines 53 may selectively connect subscribers of the wire line telephone system 52 to the central control terminal 50 in a conventional manner and a plurality of commercially installed, two-wire or other suitable transmission lines 55 may link the central control terminal 50 to each of a plurality of base stations 54 spaced throughout a mobile telephone service area generally indicated at 56. Each base station 54 may be connected to the central control terminal over a plurality of the telephone lines 55 designated as talking lines or links and over one pair of the two-wire telephone lines 55 designated as control and signaling lines or links.

Telephone calls may be selectively placed through the central control terminal 50 and the base station 54 between the wire line telephone system subscribers and mobile telephone units 58 as will become apparent from the subsequent description of the invention. The central control terminal 50 may provide the necessary supervisory and control functions of one or more systems from a convenient central location. The control terminal 50 may assign calls to zone base stations on any available channels on a noninterfering basis, perform necessary switching and interfacing functions for fixed-to-mobile or mobile-to-mobile call connection, perform statistical traffic data collection from which changes in system configuration may result and perform message accounting and billing functions.

Calls may be established between subscribers to the wire line telephone system 52 and the mobile units 58 in the service area 56 under the control of the central control terminal 50 over a plurality of radio communication channel assigned to the system. Calls between the fixed telephones of the telephone system 52 and the mobile units 58 are routed through the central control terminal 50 and one of the base stations 54 serving an appropriate small zone 60 within the service area 56.

Similarly, calls between two mobile units may be routed through the central control terminal 50 and base stations 54.

Each of the base stations 54 may include a plurality of transmitters and a plurality of receivers and other equipment required to serve one and preferably several mobile units 58 simultaneously engaged in calls. Each base station 54 is preferably assigned one or more radio communication channels on a noninterfering basis since the areas served by the base stations preferably overlap. Each communication channel includes two distinct frequencies (an up-link and a down-link) so that two-way radio communications may be simultaneously carried on as in ordinary wire line telephone systems. Each mobile unit 58 preferably includes a single transmitter and a single receiver (e.g., a transceiver), both of which may be tunable through the frequency band of the channels assigned to the system.

The embodiment of the system illustrated in FIG. 1 is disclosed in greater detail in copending U.S. patent application Ser. No. 360,560 filed May 15, 1973 by Wells et al. for "Multiple Zone Communication System and Method". The Wells et al. application, now U.S. Pat. No. 3,898,390, is assigned to the assignee of this invention and is hereby incorporated herein by reference.

With the mobile unit of this invention employed in conjunction with the small zone system of FIG. 1, one of the channels assigned to each base station 54 is preferably designated as a control signal channel and differs in frequency from at least the control signal channels assigned to immediately adjacent base stations. As will subsequently be described in greater detail, the establishing of calls to or from the mobile unit of this invention and the initiation of other control functions may be accomplished over the control signal channel in each small zone 60 and the control signal channel may be employed for conversion, i.e., assigned to a call, in the event, for example, that no other channels are available. It will, however, also become apparent that these same functions may be accomplished in accordance with the present invention whether a dedicated control channel or an idle channel (IMTS) approach to signaling is employed.

As an example of signaling over a designated control signal channel, the mobile units may all search for and lock onto an appropriate control signal channel as is subsequently described in detail. A call may be initiated to a mobile unit 58 over the wire line telephone system 52 and the call may be transmitted to one or more appropriate base stations 54 via the central control unit 50 over the appropriate control and signaling links of the telephone lines 55. The address of the called mobile unit 58 may be selectively broadcast over the control signal channels serving one or more of the zones 60 as required and, when the central control terminal 50 receives an indication that the called mobile unit has received the initial calling or call-up signal over a particular control signal channel, the central control terminal 50 may assign an available one of the remaining base stations channel, i.e., talking channel, to that call.

Similarly, when a call is placed from a mobile unit 58 to a subscriber of the wire line telephone system 52, the call is initiated over a base station control signal channel and the control and signaling link connecting that base station to the control terminal 50. An available one of the talking channels assigned to the base station 54 through which the call is established is then assigned to the call. It can thus be seen that all initial signaling involved in establishing a call between the wire line telephone system 52 and a mobile unit 58 in a particular zone 60 may be accomplished over a designated control signal channel serving that zone. As will hereinafter become apparent, a minimum amount of signaling is accomplished over the control signal channel 50 so that one control signal channel may effectively accommodate a relatively large number of users in a zone 60. Moreover, to avoid signaling collisions, provision is made to assure that the control channel is not accessed simultaneously by more than one mobile unit 58 repeatedly as in subsequently described in detail.

Reuse of channels in separated zones 60 of the service area 56 is permissible as long as sufficient separation exists between the zones 60 assigned the same channels. For example, channels assigned for use in zone 60A of FIG. 1 may also be assigned for use in zone 60B if undesirable interference does not result. Moreover, channels may be assigned to the zones dynamically on a noninterfering basis depending upon current under density in the various zones. As another aspect of the small zone system approach, the converage areas of the zones 60 may overlap in a predetermined manner to provide service to a mobile unit 58 in one zone 60 through a base station 54 in an adjacent zone when no channels are available in the zone in which the mobile unit is located and locked to a control signal channel. These and other aspects of the small zone system approach are described in greater detail in the referenced Wells et al. application.

As will be described hereinafter, the mobile unit in accordance with the present invention many also be employed in conjunction with a conventional IMTS signaling approach involving the seizure of an idle channel which serves both as a control signaling channel for call placement and as a talking channel once the call is established. While the IMTS approach may be employed in a small zone system such as that illustrated in FIG. 1, this approach is typically used in a single zone sysem in which the entire service area is served from a central transmitter unit and a plurality of satellite receiver units located throughout the service area. Because of the difference in approach in call placement between the IMTS idle channel and the dedicated control channel system described in the referenced Wells et al. application, the supervisory and control functions of the mobile unit necessarily differ as a function of the system approach to call placement. However, as will become apparent hereinafter, most of the novel features of the mobile unit of the present invention may be implemented in conjunction with either type of mobile telephone system approach.

Moreover, it will become apparent to one skilled in the art to which the invention pertains that the present invention provides considerable versatility in terms of the types of signaling formats which may be employed. For example, as subsequently described, the mobile unit may transmit and receive data in an entirely digital format (e.g. pure binary), in an entirely tone format (e.g. a dial pulse format such as that employed in IMTS) or in various combinations thereof (e.g. digital signaling to the mobile unit and tone signaling from the mobile unit to the central station).

II. Mobile Unit

A preferred embodiment of a mobile unit for use in a system employing designated control channels such as that illustrated in FIG. 1 is illustrated and described hereinafter in connection with FIGS. 2–11.

Referring now to FIG. 2, each mobile unit 58 includes a supervisory control sequencer or control head 300 and an RF transceiver and frequency control unit 301. The supervisory control sequencer 300 includes an input/output panel 302 and various circuits through which calling and receiving functions may be performed either automatically or under the control of the subscriber or mobile unit operator as will hereinafter be described. The RF transceiver and frequency control unit 301 receives and broadcasts voice signals and encoded messages at the appropriate frequencies under the control of the supervisory control sequencer 300.

The supervisory control sequencer 300 may include an input/output panel 302 comprising an address display 303, a mobile unit on/off switch 304, an address storage module 305, a keyset or keyboard 306, a control and indicator panel 308, a speaker 310, and a handset 312. A mobile unit on/off signal ON/OFF from the on/off switch 304 may be applied to a control logic circuit 314 and stored address signal SADR, together with a keyset data signal KADR, may be applied to the data input terminal D of a suitable conventional address register 316. The address signal ADR stored in the address register 316 may be applied to the control logic circuit 314 and to the address display 303.

A test signal TS and a zone change signal ZC may be applied from the keyset or keyboard 306 to the control logic circuit 314. An address clear signal ADCLR may be applied to the clear input terminal CLR of the address register 316 and a horn switch or HSW signal, a hook switch or HKSW signal and a call switch or CSW signal may be applied to the control logic circuit 314 from the control and indicator panel 308.

An audio transmit AUDIO (T) signal from the handset 312 may be applied through a suitable conventional audio processing circuit 318 to a suitable conventional FSK encoder and select circuit 320. The transmitter modulating signal TXM from the FSK encoder and select circuit 320 may be applied to a suitable conventional transmitter 322 and a modulated carrier signal from the transmitter 322 may be applied through a conventional duplexer 324 to an antenna 326. A transmitter or TXON signal from the transmitter 322 may be applied to the control and indicator panel 308.

The control logic circuit 314 may generate a call-in-progress indicator or CPI signal for application to the control and indicator panel 308 and may generate a tone selector TSEL signal for application to a suitable conventional tone generator 328. An audio enable signal AENBL may be applied from the control logic circuit 314 to a conventional audio amplifier 330 and a threshold level signal TLVL may be applied from the control logic circuit 314 to a suitable control signal detector 332.

The control logic circuit 314 may also provide an input select signal SLCT and a transmit data signal XDTA for application to the FSK encoder and select circuit 320. A transmitter enable signal TENBL from the control logic circuit 314 may be applied to the transmitter 322 and a frequency control signal FRC may be applied from the control logic circuit 314 to a suitable frequency module 334. Transmitter and receiver frequency control signals TFC and RFC, respectively, may be generated by the frequency module 334 and may be applied to the transmitter 322 and to a suitable conventional receiver 336. A tuning complete or TCOMP signal generated by the frequency module 334 may be applied to the control logic circuit 314.

Signals received over the antenna 326 may be applied through the duplexer 324 to the receiver 336 and a received signal level or RLVL signal from the receiver 336 may be applied to the control signal detector 332. The received signal RCVS from the receiver 336 may be applied to the control signal detector 332, to a suitable FSK decoder and sync detector 338 and to the audio amplifier 330. A channel lock signal CHLK from the control signal detector 332 may be applied to the control logic circit 314 and to the control and indicator panel 308. A received data signal RDTA and a sync signal SYNC from the FSK decoder and sync detector 338 may be applied to the control logic circuit 314. A received audio signal AUDIO (R) may be applied from the audio amplifier 330 to the handset 312 and through a handset controlled switch 340 to the speaker 310.

Figure 3A:
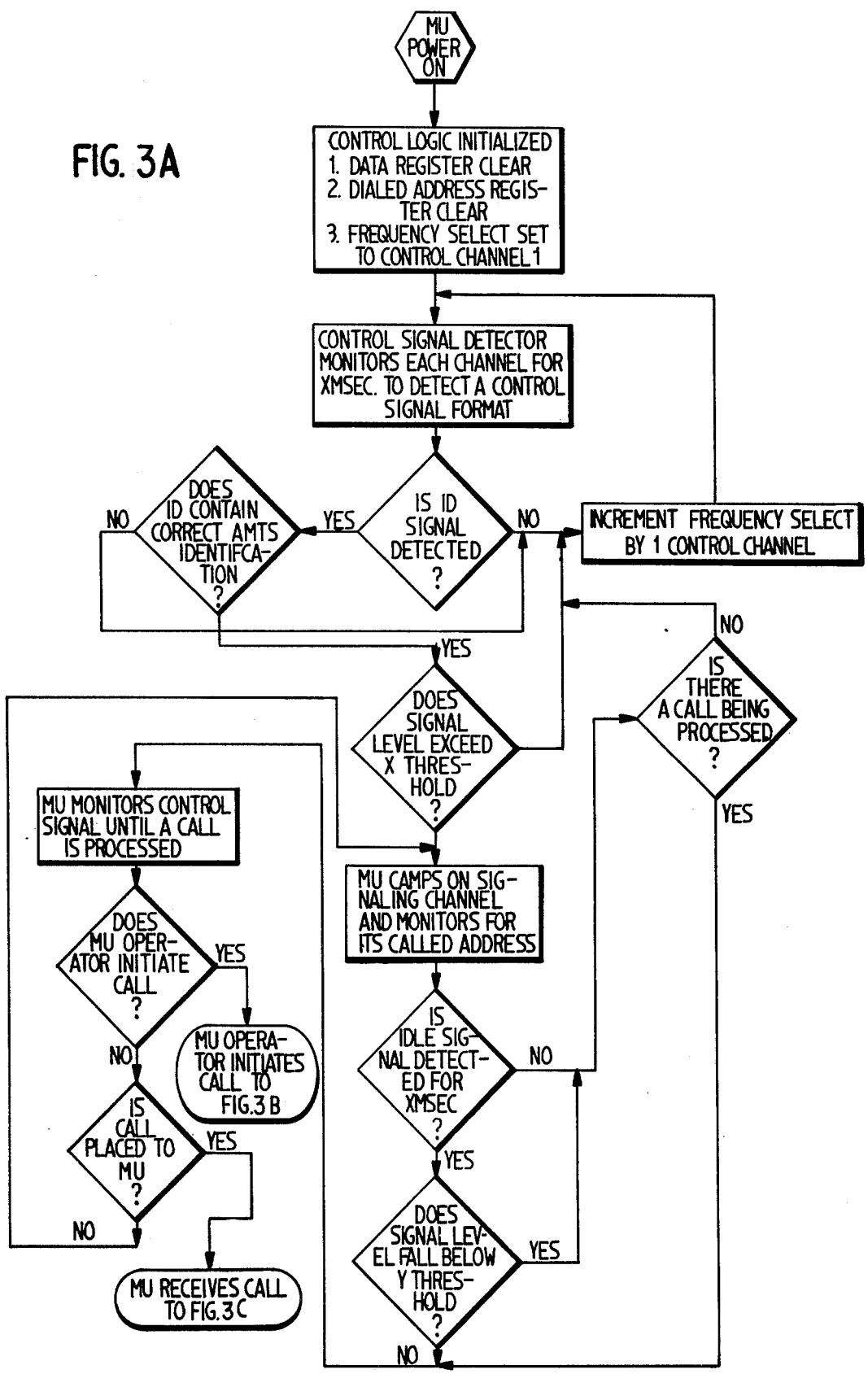
Figure 3C:
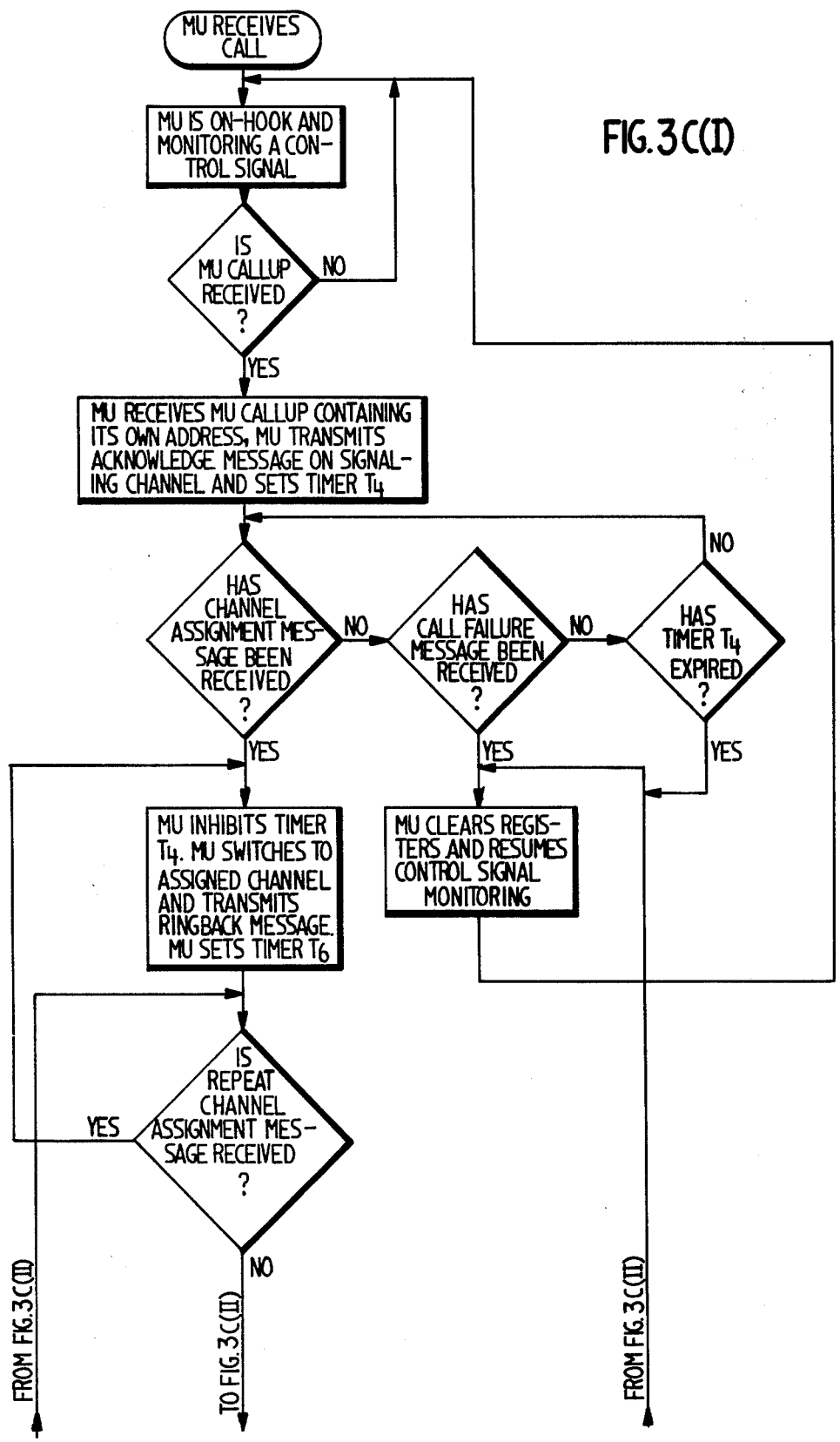

The operation of the mobile unit of FIG. 2 may be more clearly understood with continued reference to FIG. 2 and with reference to the flow diagrams of FIGS. 3A–3C. Referring now to FIGS. 2 and 3A, when the mobile unit is energized by the mobile unit on/off switch 302, the data registers in the control logic circuit 314 are initialized, the address register 316 is initialized and the frequency module 314 is set to the first control channel of the group of control chanels assigned to the system.

As is described in the referenced Wells et al. patent, the identities (e.g. frequencies) of channels designated as control channels may be transmitted as part of the control channel ID signal and stored for subsequent use in locating a suitable control channel. This technique minimizes the search required of the mobile unit in finding a suitable control channel. The control signal detector 332 monitors the first control channel to which the receiver 336 is tuned for a control signal format containing the correct identifier or ID signal. If the ID signal is not detected, or if the ID signal does not contain the correct information the frequency module 334 is incremented by the frequency control signal FRC to sequentially monitor each control channel unit the proper ID signal is detected by the control signal detector 332. The signal level RLVL of the properly decoded ID signal may then be compared to a predetermined threshold level TLVL by the control signal detector 332 and if the signal level RLVL does not exceed the predetermined threshold, the mobile unit continues to search for a control channel. In this manner, control channel frequency, control channel data coding, and control channel received level may all be employed as criteria in the selection of an appropriate control channel.

When a control channel having a suitable signal level is received and properly identified, the mobile unit locks onto the control channel and monitors the control channel for its called address. When control channel lock-on is achieved by the control signal detector 332, the channel lock signal CHLK provides an appropriate indication to the control logic circuit 314 and may illuminate an indicator on the control and indicator panel 308. Moreover, the control logic circuit 314 may assemble an appropriate "in service" message and the "in service" message may be broadcast by the transmitter 322 over the selected control channel to provide the control terminal 50 of FIG. 1 with an indication as to the location and identity of the mobile unit.

As is described more fully in the referenced Wells et al. patent, the control channel ID signal contains a busy/idle status portion which may be monitored by the control signal detector 332. If the idle signal is not detected for a predetermined period of time or if the control channel signal level RLVL falls below a predetermined threshold (e.g. the threshold represented by the TLVL signal), a search for a new control channel may be initiated by the control signal detector 314. If, at the time, a call is currently being processed, or if neither of the two previous conditions exists, the mobile unit continues to monitor the control signal channel until a call is processed either through the initiation of a call by the mobile unit operator or through the placement of a call to the mobile unit.

With continued reference to FIG. 2 and with reference now to FIG. 3B, the mobile unit operator may initiate a call by first clearing the address register 316 by generating the ADCLR signal and by entering the desired address into the address register 316 from either the address storage module 304 or the keyset 306. The address stored in the register 316 is displayed by the address display 301 and, if correct, the operator may depress a call switch to generate the call switch signal CSW to initiate call processing by the control logic circuit 314.

If a control signal channel is still being monitored as was previously described when a call processing is initiated, a call-up message is assembled in a message register and applied through the FSK encoder and select circit 320 to the transmitter 322 for broadcast thereof in response to the SLCT signal from the control logic circuit 314. If a suitable control signal is not being monitored when call processing is initiated, the mobile unit may continue to scan the control channels until an acceptable control signal is found before assembling and broadcasting the "call-up" message.

When the "call-up" message is broadcast, a timer $T_1$ may be set and the mobile unit may then await receipt of a "channel assignment" message until the timer expires. If the timer expires before the "channel assignment" message has been received and if the control signal is still present, the "call-up" message may be repeated two times. However, if a control signal is not present, the mobile unit may set a timer $T_7$ and await the receipt of the "channel assignment" message until the timer $T_7$ expires.

After the "call-up" message has been transmitted three times without receiving the "channel assignment" message, a call failure tone may be sounded. Similarly, the call failure tone may be sounded after the timer $T_7$ expires without receiving the "channel assignment" message, or upon receipt of a "call failure" message. The mobile unit may then scan the control channels for a new control channel and the call may be reattempted to the same address, i.e., to the same telephone subscriber, by depressing the call switch. The called address need not be reentered since the last called address is stored in the address register 316 until cleared by the ADCLR signal.

If the "channel assignment" message is received and successfully decoded by the FSK decoder and sync detector 338 before either of the timers $T_1$ and $T_7$ expires, the timer $T_7$ is inhibited and the mobile unit transmitter 322 and receiver 336 are tuned to the assigned channel by the frequency mobule 334 output signals TFC and RFC. The transmitter 322 is enabled by the TENBL signal from the control logic circuit 314 and a channel assignment "acknowledge" message is transmitted by applying the appropriate XDTA signal to the FSK encoder and select circuit 320 and selecting the applied XDTA signal for transmission. The receiver 336 then monitors the assigned talking channel for a repeat "channel assignment" message or a "call failure" message.

If a call failure message is received, the call failure tone is sounded and the call may be reattempted as previously described. If a repeat "channel assignment" message is received, the mobile unit may switch to that assigned channel and again transmit the "acknowledge" message. If the repeat "channel assignment" message is not received after a predetermined period of time, the AENBL signal from the control logic circuit 314 enables the audio amplifier 330 and the SLCT signal from the control logic circuit 314 selects the AUDIO (T) signal from the audio processing circuit 318 for application to the transmitter 322 through the FSK encoder and select circuit 320. If the mobile unit handset 312 is not "off hook", the received audio signal AUDIO (R) is applied to the speaker 310 through the switch 340. When the handset 312 is lifted and is thus "off hook", the received audio signal AUDIO (R) may be applied solely to the handset 312 and an "off hook" or "go-ahead" message may be broadcast over the assigned talking channel.

It will be appreciated from the foregoing that a call can be initiated by entering the called address (telephone number) and depressing the call switch, and the call is thereafter established without further operator intervention. Moreover, the operator need not repeatedly check the status of the call signalling channel prior to initiating a call since the mobile unit automatically awaits the appropriate indication of control channel availability and the like and then places the call after call initiation, all without further operator intervention.

The mobile unit may receive a call from a fixed telephone or another mobile unit as is illustrated in FIG. 3C. With continued reference to FIG. 2 and with reference not to FIG. 3C, the mobile unit monitors a control signal until a "call-up" message containing the mobile unit address is received and decoded by the FSK decoder and sync detector 338. When the "call-up" message is received and decoded the mobile unit transmits an "acknowledge" message on the control signal channel and sets a timer $T_4$. The mobile unit then awaits receipt of a "channel assignment" message over the control channel.

If a "call failure" message is received before the "channel assignment" message or if the timer $T_4$ expires before the "channel assignment" message is received the mobile unit is initialized and resumes the monitoring of the control signal. However, if the "channel assignment" message is received before a "call failure" message, the timer $T_4$ is inhibited and the mobile unit transmitter 322 and receiver 336 are tuned to the assigned channel by the frequency module 334. The mobile unit then transmits a "ring back" or channel assignment "acknowledge" message over the assigned talking channel and a timer $T_6$ is set.

If a repeat "channel assignment" message is received, the mobile unit is tuned to the newly assigned channel and transmits the "acknowledge" message. If a "call failure" message is received, the mobile unit is initialized and resumes control signal monitoring. However, as soon as the timer $T_6$ expires, the control logic circuit 314 selects an appropriate "ringing" tone for application from the tone generator 328 through the audio amplifier 330 to the speaker 310. one The "ringing" tone continues for a predetermined period of time, e.g., 60 seconds, and if the mobile unit does not go "off hook" during this 60-second time period, the mobile unit is initialized and resumes control signal monitoring. If the mobile unit goes "off hook" within the 60-second time period, the hook switch or HKSW signal applied to the control logic circuit 314 from the control and indicator panel 308 effects the transmission of a "go ahead" message from the transmitter 322 by way of the encoder and select circuit 320 and the audio circuits are enabled as was described in connection with FIG. 3B.

With continued reference to FIG. 2, each mobile unit 58 may also be provided with suitable conventional circuits indicated in phantom at 341 for operation in systems employing improved mobile telephone service IMTS techniques. The control signal detector may include an IMTS control signal detector (not shown) and if the mobile unit is operating in an IMTS system and detects an IMTS idle channel marker signal, the IMTS circuits 341 may be energized. Thereafter, the mobile unit 58 may operate in accordance with IMTS signaling techniques in placing and receiving calls. Of course, if such versatility is not required, the mobile unit supervisory control sequencer may be operable only in one type of system or the other and may be implemented solely for IMTS operation as is hereinafter described in greater detail.

A. Mobile Unit Input/Output Panel

One embodiment of the mobile unit input/output panel 302 of FIG. 2 is illustrated pictorially in FIG. 4. Referring now to FIG. 4, the input/output panel 302 provides various controls and indications as was previously described in connection with FIG. 2. The address display 303 may be any suitable multiple digit display unit for displaying the subscriber addresses or telephone numbers. The mobile unit on/off switch 304 may be a three-position switch having an "off" position, a "standby" position and an "on" position so that the mobile unit may be de-energized (off), fully energized (on) or placed in a receive only mode (standby).

The address storage module 305 may comprise any suitable memory or storage unit for storing frequently called addresses or telephone numbers. The desired stored address may be entered into the address register 316 of FIG. 2 from the address storage module 305 by depressing the appropriate memory storage access switch 342 illustrated in FIG. 4.

The keyset or keyboard 306 may comprise any suitable conventional push-button or rotary dial telephone keyboard such as a Touch Tone pad. The additional keys ZC and TS may be provided to generate the zone change or ZC signal test TS signal previously described in connection with FIG. 2. In addition to or in lieu of the address storage module 305, the keyset 306 may include an access code key MTC through which frequently called numbers stored by the control logic circuit 314 of FIG. 2 may be accessed. For example, two of the numerical keys may be depressed followed by the depression of the MTC key. When the mobile unit operator initiates a call, the code entered into the address register in this manner may be utilized by the control logic circuit 314 of FIG. 2 to locate a stored address and assemble a call-up message containing the entire stored address as was previously described.

The control and indicator panel 308 may include a horn switch 344, a channel lock indicator 346, a call in progress or CPI indicator 348, a transmitter on or TXON indicator 350, an address clear switch 352 and a call switch 354. The horn switch may be depressed by the mobile unit operator when the operator is leaving the vehicle so that a horn or other auxiliary device may alert the operator as to the receipt of incoming calls. The channel lock indicator 346 provides an indication of control channel lock-on, and the call in progress and transmitter on indicators 348 and 350 may indicate that a call has been received but has not been answered and that the transmitter 322 is energized, respectively. The address clear switch 352 may be depressed to clear the last address entered into the address register 316 of FIG. 2 and the call switch 354 may be depressed to effect the transmission of a call-up message from the mobile unit to the address stored in the address register 316 of FIG. 2.

The speaker 310 may provide audible monitoring of supervisory signal tones during a call-up and may act as a "ringer" to alert the mobile unit operator of an incoming call. The audible indication may be provided through the handset 312 when the handset 312 is removed from the hook switch (not shown) through the opening of the switch 340 of FIG. 2. Alternatively, audible indications and voice communications may be received over both the speaker 310 and the handset 312.

In placing a call through the mobile unit control head 300, the mobile unit operator may depress any desired one of the switches 342 on the address storage module 305 or may enter the desired address through the keyboard 306. The entered address is stored in the address register 316 and also displayed on the address display 303. If the displayed address is correct the mobile unit operator may depress the call switch 354 to initiate the call-up procedure previously described. If the displayed address is erroneous, the address clear switch 352 may be depressed and the address reentered.

In receiving a call, the mobile unit operator may be alerted through the speaker 310 or, if the horn switch 344 is depressed, through an auxiliary signaling device such as the vehicle horn. The mobile unit operator lifts the handset 312 and the call may be completed as was previously described. A call acknowledge or call annunciator indicator 356 may be provided to indicate to the mobile unit operator that the mobile unit has tuned to the assigned channel and has acknowledged the "call-up" message and "channel assignment" message.

B. Control Logic Circuit

One embodiment of a logic circuit for performing the previously described functions of the control logic circuit 314 of FIG. 2 is functionally illustrated in FIG. 5 to facilitate an understanding of the invention.

Referring now to FIG. 5, the ON/OFF signal from the mobile unit on/off switch 304 of FIG. 2 may be applied to a transmitter on/off logic circuit 360. An in service or INSV output signal from the transmitter on/off logic circuit 360 may be applied to one input terminal of a two input terminal AND gate 362 and the output signal from the AND gate 362 may be applied to the clock input terminal of an "in service" message register 364.

The output signal from the "in service" message register 364 may be provided as the XDTA signal for application to the FSK encoder and select circuit 320 of FIG. 2. The transmitter on/off logic circuit 360 may also provide the transmitter enable TENBL signal for application to the transmitter 322 of FIG. 2.

The SYNC signal and the RDTA signal from the FSK decoder and sync detector 338 of FIG. 2 may be applied to message register and decoder 366 hereinafter described in greater detail. The channel lock signal CHLK from the control signal detector 332 of FIG. 2 may be applied to the message register and decoder 366 and to the transmitter on/off logic circuit 362.

The message register and decoder 366 may provide various decoded control signals in response to the input signals thereto. An ASSIGN signal from the message register and decoder 366 may be applied to one input terminal of a three input terminal AND gate 368, to a call placement logic circuit 370, to the reset input terminal R of a flip-flop 372, to one input terminal of a two input terminal AND gate 374 and to one input terminal of a three input terminal AND gate 376. The output from the AND gate 368 may be applied to the clock input terminal of a "channel assignment acknowledge" message register 378, the output signal from which may be provided as the XDTA signal. The output signal from the AND gate 374 may be applied to the start input terminal ST of a suitable conventional timer 380 and the ring or RNG output signal from the timer 380 may be applied to one input terminal of a four input terminal AND gate 382 and may be provided as one of the tone select or TSEL signals.

The output signal from the AND gate 382 may be applied to one input terminal of a two input terminal OR gate 384 and the output signal from the AND gate 376 may be applied to the other input terminal of the OR gate 384. The output signal from the OR gate 384 may be applied to a "go ahead" message register 386, the output signal from which may be provided as the XDTA signal.

The message register and decoder 366 may supply a frequency control signal FRC for application to the frequency module 334 of FIG. 2 and may also supply a threshold level signal TLVL for application to the control signal detector 332 of FIG. 2. A decoded call-up message may result in the generation of a CALL-UP signal by the message register and decoder 366. The CALL-UP signal may be applied to one input terminal of a two input terminal AND gate 388 and to the control and indicator panel 308 of FIG. 2 as the call-in-progress or CPI signal. The output signal from the AND gate 388 may be applied to the clock input terminal of a "call-up acknowledge" message register 390 and the output signal from the register 390 may be provided as the XDTA signal.

A "call failure" message decoded by the message register and decoder 366 may result in the application of a FAIL signal to one input terminal of a two input terminal OR gate 392 and to the reset terminal R of the timer 380. A "call terminate" message decoded by the message register and decoder 366 may result in the application of a TERM signal to the transmitter on/off logic circuit 360 and to the set input terminal of the flip-flop 372. The message register and decoder 366 may also provide a search inhibit or SINH signal for application to the call placement logic circuit 370 and to one input terminal of a three input terminal AND gate 396.

A call failure tone or CFTN signal from the OR gate 392 may be provided as one of the tone select or TSEL signals and may be applied to the message register and decoder 366 and to the transmitter on/off logic circuit 360. The output signal from the false output terminal Q of the flip-flop 372 may be applied to one input terminal of a three input terminal AND gate 400 and the output signal from the AND gate 400 may be applied to a terminate message register 401, the output signal from which may be provided as the XDTA signal.

The call switch signal CSW from the control and indicator panel 308 of FIG. 2 may be applied to the call placement logic circuit 370 and to the transmitter on/off logic circuit 360. The hook switch signal HKSW from the control and indicator panel 308 of FIG. 2 may be applied to one input terminal of the three input terminal AND gate 382, to the trigger input terminal T of a monostable multivibrator 403 and to the tone generator 328 of FIG. 2 as the TSEL signal. The output signal from the true output terminal of the monostable multivibrator 403 may be provided as the on hook output signal OHK and may be applied to one input terminal of the AND gate 400, to the message register and decoder 366 and to the transmitter on/off logic circuit 360.

The test signal TS from the key set 306 of FIG. 2 may be applied to the transmitter on/off logic circuit 360 and to one input terminal of a two input terminal AND gate 402. The output signal from the AND gate 402 may be applied to the clock input terminal of a "test" message register 404, the output signal from which may be provided as the XDTA signal. The tuning complete or TCOMP signal from the frequency module 334 of FIG. 2 may be applied to one input terminal of each of the AND gates 376 and 382.

The call placement logic circuit 370 generates various gating and control signal primarily in response to the call switch signal CSW. An inhibit or INH signal from the call placement logic circuit 370 may be applied to one input terminal of the three input terminal AND gate 368 and to one input terminal of the AND gate 374. A gate enable signal GTEN from the call placement logic circuit 370 may be applied to the control input terminal of each of a plurality of gates 394 to gate the ADR signal from the address register 316 of FIG. 2 through the gates 394. A call-up message enable CEN from the call placement logic circuit 370 may be applied to one input terminal of the AND gate 396 and a call placement failure signal CPF may be applied from the call placement logic circuit 370 to the message register and decoder 366 and to one input terminal of the OR gate 392.

The output signals from the gates 394 may be applied to the parallel data input terminal of a "call-up" message register 398 and the output signal from the AND gate 396 may be applied to the clock input terminal of the register 398. The output signal from the "call-up" message register 398 may be provided as the XDTA signal.

An audio enable signal AENBL generated by the call placement logic circuit 370 may be provided as an output signal from the control logic circuit 314 for application to the audio amplifier 330 of FIG. 2 and may be applied to a suitable encoder selector circuit 405. The zone change signal ZC from the key set 306 of FIG. 2 may be applied to the encoder selector circuit 405 and to one input terminal of a two input terminal AND gate 406. The output signal from the AND gate 406 may be applied to the clock input terminal of a "zone change" message register 408, the output signal from which may be provided as the XDTA signal. The select signal SLCT from the encoder selector circuit 405 may be provided as an output signal from the control logic circuit 314 for application to the FSK encoder and select circuit 320 of FIG. 2.

The generation of timing signals for the control logic circuit 314 may be provided by a suitable clock generator 410. The clock generator 410 may generate a clock signal CLK and the CLK signal may be applied to one input terminal of each of the gates 362, 368, 388, 400, 402, 382, 376, 396 and 406.

In operation, the ON/OFF signal from the mobile unit on/off switch 304 of FIG. 2 energizes the mobile unit and enables the transmitter on/off logic circuit 362. As was previously described, the mobile unit is stepped through the various control channel frequencies until a control channel having a received signal level exceeding the threshold level TLVL is received. When a suitable control channel signal having both the desired received signal level and the desired encoding is received, the control channel lock-on signal CHLK causes the transmitter on/off logic circuit 360 to enable the AND gate 362 and clock the "in services" message of the register 364. The transmitter 322 of FIG. 2 is enabled by the TENBL signal from the transmitter on/off logic circuit 360 and the "in service" message is broadcast.

When a call is placed to the mobile unit, a "call-up" message is received as the RDTA signal. The message register and decoder 368 detects the "call-up" message and provides a call-in-progress signal CPI to the control and indicator panel 308 of FIG. 2. The CALL-UP signal enables the AND gate 388 and the "call-up acknowledge" message is clocked out of the register 390 to the FSK encoder and select circuit 320 of FIG. 2 for broadcast to the base station.

As was previously described, the "call-up" message sets a timer and the mobile unit awaits receipt of a "channel assignment" message. When the "channel assignment" message is received by the control logic circuit 314 in the RDTA signal, the ASSIGN signal from the message register and decoder 366 causes the AND gate 368 to clock the "channel assignment acknowledge" message out of the register 378 for broadcast by the transmitter 322 of FIG. 2. The ASSIGN signal also starts the timer 380 resulting in the generation of the ring signal RNG. The RNG signal from the timer 380 selects the ringing tone from the tone generator 328 of FIG. 2 for application to the speaker 310 as was previously described to alert the mobile unit operator that a call is being placed to his unit. The RNG signal also enables the AND gate 382 and when the mobile unit operator lifts the handset 312 of FIG. 2 from the hook switch, the hook switch signal HKSW provides an enabling signal to the AND gate 382. When the "channel assignment" message has tuned the RF transceiver and frequency control unit 301 of FIG. 2 to the appropriate channel, the tuning complete signal TCOMP enables the AND gate 382 and the clock signal CLK from the clock generator 410 clocks the "go ahead" message out of the message register 386 for broadcast by the transmitter 322.

If the handset 312 of FIG. 2 is returned to the hook switch at the completion of a call and prior to the receipt of a "call terminate" message from the base station, the hook switch signal HKSW triggers the multivibrator 403 resulting in the generation of the on hook or OHK signal. The OHK signal clocks the "terminate" message out of the register 401 for broadcast by the transmitter 322, effects the deenergization of the transmitter 322 by the transmitter on/off logic circuit 360 and enables the mobile unit to return to the control signal channel.

In placing a call from the mobile unit, the mobile unit operator enters an address into the address register 316 of FIG. 2 and depresses the call switch on the control and indicator panel 308. The call switch signal CSW results in the generation of the gate enable signal GTEN enabling the gates 394 and thus loading the address signal ADR into the call-up register 398. Shortly thereafter, the CEN signal from the call placement logic circuit 370 enables the AND gate 396 resulting in the broadcast of the "call-up" message from the register 398 by the transmitter 322 of FIG. 2.

The "call-up" message may be repetitively broadcast by the mobile unit three times unless a "channel assignment" message is received and decoded as the ASSIGN signal. If, after the third broadcast of the "call-up" message the ASSIGN signal has not been generated, the call placement failure signal CPF causes the mobile unit to continue to monitor the designated control channel and sounds a call failure tone through application of the CFTN siganl to the tone generator 328 of FIG. 2. If the "channel assignment" message is received and decoded by the message register and decoder 366 after broadcasting the "call-up" message, the RF transceiver and frequency control unit 301 is tuned to the appropriate frequency of the assigned channel by the FRC signal and the AND gate 376 is enabled when the TCOMP signal indicates that the tuning is complete. The clock signal CLK clocks the "go ahead" message out of the register 386 through the enabled AND gate 376 and the OR gate 384 and the "go ahead" message is broadcast by the transmitter 322. The mobile unit thereafter receives a ring back signal which is applied through the enabled audio amplifier 330 to the speaker 310 or the handset 312, depending upon the position of the handset 312.

The ring back signal indicates to the mobile unit operator that the call has been placed and that the telephone of the called party is ringing. When the called party answers the call, the initial response will be heard over the speaker 310 and the handset 312 may be removed from the hook switch if this has not already been accomplished. When the call is complete, a "terminate" message is transmitted to the mobile unit if the called party hangs up before the mobile unit operator hangs up. The TERM signal inhibits the AND gate 400 so that the "terminate" message from the register 401 cannot be transmitter to the base station when the mobile unit operator hangs up. In addition, the TERM signal may reset the transmitter on/off logic circuit 360 to deenergize the mobile unit transmitter 322.

If the mobile unit operator places the handset 312 on the hook switch before a "terminate" message initiated by the called party is received from the base station, the on hook signal OHK enables the AND gate 400 resulting in the broadcast of the "terminate" message from the register 401 from the transmitter 322.

When the mobile unit 58 is not engaged in a call, the mobile unit operator may initiate the broadcast of a "test" message to determine the operability of the mobile unit 58. The mobile unit operator may depress the test key on the keyset 306 of FIG. 2 to generate the TS signal and the TS signal may effect the energization of the transmitter 322 and the broadcast of a "test" message from the register 404. Moreover, during a conversation between the mobile unit operator and either another mobile unit or a fixed telephone, the operator may determine that the assigned channel is unacceptable for conversation. The operator may depress the zone change request key ZC on the keyset 306 to generate the zone change signal ZC. The zone change signal ZC may generate an appropriate select signal SLCT to select the XDTA signal for broadcast by the transmitter 322 and may clock an appropriate "zone change" message out of the register 408 to the transmitter 322. The "zone change" message may be transmitted over the assigned talking channel and, when received by the central control terminal, may initiate a vote of adjacent zones to determine which zone should serve the call.

Although not illustrated in FIG. 5, the broadcast of a "test" message by the mobile unit 58 may be initiated by the central control terminal and broadcast to the mobile unit 58 as the RDTA signal. The message register and decoder 366 may decode the received "test" message and clock the "test" message out of the register 404 for broadcast by the transmitter 322. The initiation of the broadcast of the "test" message by the central control terminal in this manner may be utilized for diagnostic purposes or may be utilized as was previously described for voting in adjacent zones when a zone change is deemed necessary.

Moreover, the zone change signal ZC may be generated automatically by the mobile unit 58 in response to a drop in received signal level RLVL below a predetermined threshold as is generally indicated in phantom in FIG. 2. The control signal detector 332 of FIG. 2 may monitor the RLVL signal after a talking channel has been assigned in response to the ASSIGN signal from the control logic circuit 314. If the RLVL signal received over the talking channel drops below a predetermined threshold, the control signal detector 332 may initiate the zone change request by generating the zone change signal ZC. With this arrangement, the continuous monitoring of the established call is not required at the base station in order to initiate a vote of adjacent zones.

C. Message Register and Decoder

One embodiment of a logic circuit for performing the previously described functions of the message register and decoder 366 of FIG. 5 is illustrated in detail in FIG. 6 to facilitate an understanding of the invention.

Referring now to FIG. 6, the SYNC and RDTA signals from the FSK decoder and sync detector 338 of FIG. 2 may be applied to the respective input terminals of a two input terminal AND gate 412 and the output signal from the AND gate 412 may be applied to the data input terminal of a received message register 414. The output signals from predetermined stages of the message register 414 may be applied, respectively, to a plurality of gates 416, an address caparator 418, and a plurality of gates 420. An enable output signal ENBL from the address comparator 418 may be applied to the control input terminals of the gates 416 to apply the signals from the message register 414 to a suitable conventional message decoder 422.

The message decoder 422 may decode the received "call failure," "call-up, " "channel assignment, " and "terminate" messages, as well as a "test" message if desired, and generate the respective FAIL, CALL-UP, ASSIGN, TERM, and TS signals. The FAIL signal from the message decoder 422 may be applied to one input terminal of a five input terminal OR gate 424 and may be supplied as an output signal from the message register and decoder 366. The CALL-up output signal from the message decoder 422 may be applied to the start input terminal ST of a suitable conventional timer 426 and may be supplied as an output signal from the message register and decoder 366. The ASSIGN signal from the message decoder 422 may be applied to the reset input terminal R of the timer 426, to the set input terminal S of a flip-flop 428, to the control input terminals of the gates 420 and may be supplied as an output signal from the message register and decoder 366. The TERM signal from the message decoder 422 may be applied to another input terminal of the OR gate 424, to one input terminal of a three input terminal OR gate 430 and may be supplied as an output signal from the message register and decoder 366. The TS signal from the message decoder 422 may be applied to the AND gate 402 of FIG. 5 as was previously described.

The increment or INCR signal from the OR gate 424 may be applied to a transmitter/receiver frequency control counter 432 and to an end-of-cycle detector 434. A frequency assignment message stored by the message register 414 may be applied through the gates 420, when enabled by an ASSIGN signal, and a frequency control signal FRC indicative of the count in the counter 432 may be applied to the frequency control module 334 of FIG. 2 and to the end-of-cycle detector 434. The end-of-cycle signal END from the detector 434 may be applied to one input terminal of a two input terminal AND gate 436 and the output signal from the AND gate 436 may be provided as the TLVL signal from the message register and decoder 366 for application to the control signal detector 332 of FIG. 2.

The channel lock signal CHLK from the control signal detector 332 of FIG. 2 may be applied to a control signal loss detector 338 and the output signal from the control signal loss detector 338 may be applied to one input terminal of a two input terminal AND gate 340. The output signal from the AND gate 340 may be applied to one input terminal of the OR gate 424 and to the other input terminal of the AND gate 436.

The call placement failure signal CPF from the call placement logic circuit 370 of FIG. 5 may be applied to one input terminal of the OR gate 424 and the call failure tone signal CFTN from the OR gate 392 of FIG. 5 may be applied to one input terminal of the OR gate 430. The on hook signal OHK from the multivibrator 403 of FIG. 5 may be applied to the third input terminal of the OR gate 430 and the output signal from the OR gate 430 may be applied to the reset input terminal R of the flip-flop 428. The output signal from the false output terminal $\overline{Q}$ of the flip-flop 428, the search inhibit signal SINH, may be applied to the other input terminal of the AND gate 340 and may be provided as the SINH output signal from the message register and decoder 366.

In operation, the FSK decoder and sync detector 338 of FIG. 2 detects a SYNC signal preceding each message. The SYNC signal enables the AND gate 412 and the subsequent message RDTA is stored by the received message register 414.

The portion of the received message containing the mobile unit address is compared to an address assigned to the mobile unit by the address comparator 418 and ENBL signal is generated in response to a favorable comparison. The gates 416 are enabled by the ENBL signal and the portion of the received message stored by the register 414 which contains the control message is applied to the message decoder 422 for decoding. If the message is decoded as a "call failure" message, the FAIL signal initiates a search of the control channels by the T/R frequency control counter 432 and effects the generation of a call failure tone as was previously described. If the message is a "call-up" message, the CALL-UP signal starts in the timer 426 as well as performing other functions previously described. If, after a time period determined by the timer 426 a "channel assignment" message has not been received and decoded as the ASSIGN signal, the search for a control channel is initiated by the timer 426 through the OR gate 424. If the "channel assignment" message is received, the ASSIGN signal resets the timer 426, sets the flip-flop 428, enables the gates 420 and performs the other functions previously described.

When the flip-flop 428 is set, the AND gate 340 is inhibited and the subsequent loss of the control signal when a transmitter and receiver are tuned to the assigned talking channel does not affect the operation of the mobile unit. Moreover, the search inhibit signal SINH inhibits the AND gate 396 of FIG. 5 to prevent further broadcast of the "call-up" message.

When the gates 420 are enabled by the ASSIGN signal, a digital signal representing the assigned talking channel is applied through the enable gates 420 to the T/R frequency control counter 432 to preset the counter 432 to the numerical code of the assigned talking channel. This numerical code may be applied to the frequency module 334 of FIG. 5 to tune the transmitter 322 and receiver 336 to the talking channel represented by the numerical code. Moreover, the FRC signal may be stored by the end-of-cycle detector 434 so that when scanning the control signal channels for a new channel at a later time, the end-of-cycle detector 434 contains an indication of the starting point from which the scan was initiated. If the mobile unit scans the entire group of predetermined control channels without achieving control channel lock-on, the TLVL signal may initiate a change in the threshold lever with which the received signal level RLVL is compared in the control signal detector 332 of FIG. 2 as will hereinafter be described in greater detail.

If a "terminate" message is decoded by the message decoder 422, the INCR signal is generated to initiate a search for a control channel and the flip-flop 428 is reset to enable the control signal loss detector 338. The TERM signal also performs various functions previously described in connection with FIGS. 2–5. The receipt of a "test" signal by the mobile unit may result in the generation of the TS signal by the message decoder 422 for use during the voting procedure as was previously described.

At any time after the "channel assignment" message has been decoded as the ASSIGN signal by the message decoder 422, the generation of a call failure tone signal SFTN or the on hook signal OHK will reset the flip-flop 428 through the OR gate 430. Thus, the generation of either of the aforementioned signals enables the AND gate 340 so that the control signal loss detector 338 is operable during the search for a control signal channel.

D. Transmitter On/Off Logic Circuit

One embodiment of a logic circuit for performing the previously described functions of the transmitter on/off logic circuit 360 of FIG. 5 is illustrated in FIG. 7 to facilitate an understanding of the invention.

Referring now to FIG. 7, the call switch signal CSW and the test signal TS from the respective control and indicator panel 308 and keyset 306 of FIG. 2 may be applied to respective input terminals of a four input terminal OR gate 450. The test signal TS may also be inverted by an inverter 452 and applied to one input terminal of a five input terminal OR gate 454. The CALL-UP signal from the message register and decoder 366 of FIGS. 5 and 6 may be applied to another input terminal of the OR gate 450 and the output signal from the OR gate 450 may be applied to the set input terminal S of a flip-flop 456. The output signal from the true output terminal Q of the flip-flop 456 may be provided as the transmitter enable signal TENBL from the transmitter on/off logic circuit 360.

The channel lock signal CHLK from the control signal detector 332 of FIG. 2 may be applied to one input terminal of a two input terminal AND gate 458 and the on/off signal from the mobile unit on/off switch 304 of FIG. 2 may be applied to the other input terminal of the AND gate 458. The output signal from the AND gate 458 may be applied to the trigger input terminal T of a monostable multivibrator 460 and the inservice signal INSV from the true output terminal Q of the multivibrator 460 may be applied to an input terminal of the OR gate 450 and to the AND gate 362 of FIG. 5. The output signal from the false output terminal $\overline{Q}$ of the multivibrator 460 may be applied to an input terminal of the OR gate 454.

The call failure tone signal SFTN from the OR gate 392 of FIG. 5 may be applied to another input terminal of the OR gate 454 and the on hook signal OHK from the multivibrator 403 of FIG. 5 may be applied to another input terminal of the OR gate 454. The terminate signal TERM from the message decoder 422 of FIG. 6 may be applied to the fifth input terminal of the OR gate 454. The output signal from the OR gate 454 may be applied to the reset input terminal R of the flip-flop 456.

In operation, any one of the call switch signal CSW, the test signal TS, or the call-up signal CALL-UP may set the flip-flop 456 to enable the transmitter 322 of FIG. 2. In addition, when a mobile unit is first turned on and is locked onto a control channel, the multivibrator 460 is triggered and the transmitter 322 is enabled for a predetermined period of time to transmit the "in service" message.

After the "in service" message has been transmitted by the transmitter 322, the monostable multivibrator 460 resets the flip-flop 456 and deenergizes the transmitter 322. Moreover, if any of the CFTN, OHK or TERM signals is generated, the flip-flop 456 is reset and the transmitter 322 is deenergized.

E. Call Placement Logic Circuit

One embodiment of a logic circuit for performing the previously described functions of the call placement logic circuit 370 of FIG. 5 is illustrated in FIG. 8 to facilitate an understanding of the invention.

Referring now to FIG. 8, the call switch signal CSW from the control and indicator panel 308 of FIG. 2 may be provided as the gate enable output signal GTEN of the call placement logic circuit and may be applied to the reset input terminal R of a flip-flop 464 and through a suitable delay circuit 466 to one input terminal of a three terminal OR gate 468. The output signal from the OR gate 468 may be provided as the call enable or CEN output signal from the call placement logic circuit 370 and may be applied through a suitable delay circuit 470 to the clock input terminal CL of a suitable counter 472. The decoded counts of 1 and 2 output signals from the counter 472 may be applied to the other two input terminals, respectively, of the OR gate 468. The count of 3 output signal from the counter 472 may be delayed through a suitable delay circuit 474 and applied to the reset input terminal R of the counter 472 and may be applied to one input terminal of a two input terminal AND gate 476. The output signal from the AND gate 476 may be provided as the call placement failure signal CPF from the call placement logic circuit 370.

The ASSIGN signal from the message register and decoder 366 of FIGS. 5 and 6 may be delayed through a suitable delay circuit 478 and applied to one input terminal of a two input terminal OR gate 480. The output signal from the OR gate 480 may be applied to the set input terminal S of the flip-flop 464 and the inhibit output signal INH from the true output terminal Q of the flip-flop 464 may be provided as the INH output signal from the call placement logic circuit 370 and may be delayed through a suitable delay circuit 482 and applied to the set input terminal S of a flip-flop 484. The output signal from the true output terminal of the flip-flop 484 may be provided as the audio enable AENBL signal from the call placement logic circuit 370. The scan inhibit signal SINH from the message register and decoder 366 of FIGS. 5 and 6 may be applied to the other input terminal of the AND gate 476, to the other input terminal of the OR gate 480 and to the reset input terminal R of the flip-flop 484.

In operation, the operator may depress the call switch on the control and indicator panel 308 to generate the call switch signal CSW when a call is to be placed from the mobile unit. The call switch signal may immediately enable the gates 394 of the control logic circuit 314 of FIG. 5 as the GTEN signal, may reset the flip-flop 464 to generate a low level inhibit signal INH for inhibiting the AND gates 368 and 374 of FIG. 5. The call switch signal CSW is also delayed and applied through the OR gate 468 to effect the broadcast of a "call-up" message through the enabling of the AND gate 396 of FIG. 5 by the CEN signal. The delay circuit 466 ensures that the called address ADR is loaded into the call-up message register 398 of FIG. 5 by the GTEN signal prior to clocking the call-up message register 398.

After the "call-up" message has been broadcast in response to the CEN signal, the mobile unit awaits receipt of a "channel assignment" message. If, after a period of time determined by the delay circuit 470, the ASSIGN signal has not been generated in response to receipt of a "channel assignment" message, the counter 472 is clocked to a count of 1 and the "call-up" message is again broadcast. The repetitive broadcast of the "call-up" message may continue until the counter 472 reaches a predetermined count. e.g., the count of 3, at which time the call placement failure signal CPF may be generated if a "channel assignment" message still has not been received. If, however, the "channel assignment" message is received before the counter 472 reaches a count of 3, the AND gate 476 is inhibited by the SINH signal, the flip-flop 464 is set shortly thereafter, and the flip-flop 484 is also shortly thereafter reset to enable the audio amplifier 330 of FIG. 2. In this manner, placement of a call from the mobile unit 58 may be initiated by the mobile unit operator by merely depressing the call switch. The call placement logic circuit 370 thereafter generates the appropriate signals in an appropriate time relationship to broadcast and receive the various messages involved in placing a call.

F. Random Call Placement Time Delay Circuit

In accordance with the preferred embodiment of the present invention, a single control and signaling channel serves all mobile units having access to the system through each base station 54 in each of the zones 60. If two mobile units simultaneously attempt to access the same control signal channel, "call-up" message may be garbled and may not be properly detected by the CPU 108 at the central control terminal 50 of FIG. 1. In accordance with the present invention, each mobile unit may be provided with a random call placement time delay circuit so that the control signal channel is not repeatedly accessed simultaneously by more than one mobile unit. If signaling collision does occur on the control signal channel on the first attempt to place a call, the random call placement time delay circuit ensures that a signaling collision does not occur on the second attempt.

Since the preferred signaling format employed in conjunction with the present invention is digital, a digital random call placement time delay circuit which may be employed to avoid signaling collision is illustrated in FIG. 9 and described hereinafter. Referring now to FIG. 9, the call-up enable signal CEN from the call placement logic circuit 370 of FIGS. 5 and 8 may be applied to set input terminal S of a flip-flop 490 and to one input terminal of a two input terminal AND gate 492. The output signal from a conventional random number generator 494 may be applied to the other input terminal of the AND gate 492 and the output signal from the AND gate 492 may be applied to the load input terminal L of a suitable conventional counter 496.

The zero output signal from the counter 496, e.g., a binary one output signal when the count in the counter 496 is zero, may be provided as the random call enable signal RCEN for application to the AND gate 396 of FIG. 5 which controls the broadcast of the "call-up" message. The RCEN signal may also be applied to the reset input terminal of the flip-flop 490 and the output signal from the true output terminal Q of the flip-flop 490 may be applied to one input terminal of a two input terminal AND gate 498. A suitable clock signal CLK from a conventional clock generator 500 may be applied to the other input terminal of the AND gate 498 and the output signal from the AND gate 498 may be applied to the clock input terminal CL of the counter 496.

In operation, the call enable signal CEN generated by the mobile unit operator when the call switch on the control and indicator panel 308 of FIG. 2 is depressed, loads a random number from the random number generator 494 into the counter 496 through the enabling of the AND gate 492. The CEN signal also sets the flip-flop 490 enabling the AND gate 498. Thereafter, the clock signal CLK clocks the counter 496 down from the loaded random number until the counter reaches a count of zero. When the counter 496 reaches a count of zero, the RCEN signal enables the AND gate 396 of the control logic circuit 314 of FIG. 5 to effect broadcast of the "call-up" message and resets the flip-flop 400 thereby resetting the random call placement time delay circuit.

Since, as is described more fully in the referenced Wells et al. application, the call enable signal CEN is repetitively generated, the first CEN signal applied to the random call placement time delay circuit of FIG. 9 may result in the generation of the random call enable signal RCEN simultaneously with the generation thereof by another mobile unit. If a signaling collision results, the central control terminal will not return a "channel assignment" message and the CEN signal will again be applied to the random call placement time delay circuit of each mobile unit. On the second attempt to place the call, there is very little probability that the same delay will result in both mobile units and on the third attempt the probability is near zero. Thus, one of the mobile units will seize the control signal channel and the central control terminal 50 of FIG. 1 will place a busy status indicator on the control channel. The busy/idle status indicator on the control signal channel may be decoded as the B/I signal and gated with the CEN signal as generally indicated in phantom at 502 in FIG. 9 to prevent further call placement attempts by the mobile unit. Moreover, it will be apparent to one skilled in the art that the initial call-up signal may be initiated without delay and if no response is received from the base station (as would occur when two or more signals collided and garbled each other) the random time delay thereafter be invoked for subsequent call attempts. In addition, if the mobile unit operator attempts to place a call when the control signal channel is busy, the CEN signal may be stored and when the status signal reverts to the idle condition, the stored CEN signal may be applied through the random call placement time delay circuit in all mobile units which are still waiting to place a call. Again, the first mobile unit to successfully seize the control signal channel will be selected at random by the random call placement time delay circuit and the remaining mobile units will wait until the idle status indicator is received over the control signal channel.

As an alternative to delaying the call enable signal CEN itself, the detected transition from the busy condition to the idle condition on the control signal channel over the failure to receive a "channel assignment" message from the base station on the control signal channel may initiate the operation of the random call placement time delay circuit. The output signal from the random call placement time delay circuit of FIG. 9 may, under these conditions, be utilized to trigger the call-up initiation sequence after the random time delay. In any event, the use of the random call placement time delay circuit ensures that each mobile unit has an equal opportunity (over a number of trials) to become the first mobile unit to transmit a call-up signal and thus seize the control signal channel. Thus, no mobile unit is penalized by having a longer time delay on every attempt than other mobile units operating in the system.

G. Control Signal Selector

In the foregoing discussions of control signal monitoring by the mobile units, it was assumed that the control signal detector 332 of FIG. 2 may select any control signal channel having a received level RLVL above a fixed threshold level TLVL, as well as a proper code. In FIG. 10, there is illustrated a control signal selector which may be utilized in a multiple zone system such as that of the present invention for selecting the control signal having the proper ID code and having the highest signal level of those control signals received.

Referring now to FIG. 10, the search inhibit signal SINH from the message register and decoder 366 of FIGS. 5 and 6 may be applied to one input terminal of a two input terminal AND gate 504 and the output signal from the AND gate 504 may be applied to an enable input terminal of a conventional sample and hold circuit 506. The received signal from the receiver 336 of FIG. 2 may be applied to a suitable control signal code detector 508 and the detected ID code or DID may be applied from the control signal code detector 508 to the other input terminal of the AND gate 504. The received signal level or RLVL signal from the receiver 36 of FIG. 2 may be applied to the sample input terminal of the sample and hold circuit 506 and the output signal from the sample and hold circuit 506 may be applied to a conventional A/D converter 510. The digital output signal representing the value of the RLVL signal may be applied from the A/D converter 510 to one input terminal of a conventional comparator 512 and to a plurality of AND gates 514. The output signal from the AND gates 514 may be applied to a digital level register 516 and the digital TLVL signal from the register 516 may be applied to another input terminal of the comparator 512. The threshold level signal TLVL from the message register and decoder 366 of FIGS. 5 and 6 may be applied to a threshold level selector 518 and the output signal from the threshold level selector 518 may be applied to the digital level register 516.

A suitable sequence timer 520 may apply timing signals T1, T2 and T3 to the sample and hold circuit 506 the A/D converter 510 and the comparator 512, respectively. The RLVL ≤ TLVL signal from the comparator 512 may be applied to one input terminal of the OR gate 424 in the message register and decoder 366 of FIG. 6, only a portion of which is illustrated in FIG. 10. The RLVL > TLVL signal from the comparator 512 may be applied to the control input terminals of the AND gates 514, to another input terminal of the OR gate 424, to the control input terminals of a plurality of AND gates 522 in the message register and decoder 366 and to the set input terminal S of a flip-flop 524 in the message register and decoder 366. The output signal from the OR gate 424 may be applied to the T/R frequency control counter 432 and to the end-of-cycle detector 434 as was previously described. The output signal from the T/R frequency control counter 432 may be applied to the end-of-cycle detector 434 as was previously described and may also be applied to the AND gates 522 and to one input terminal of a three input terminal AND gate 526. The output signal from the AND gate 526 may be supplied as the frequency control signal FRC from the message register and decoder 366 for application to the frequency module 334 of FIG. 2.

The output signal from the AND gates 522 may be applied to a channel number register 528 for temporary storage thereof and the output signal from the channel number register 528 may be applied to a plurality of AND gates 530. The output signals from the AND gates 530 may be applied through a plurality of OR gates 532 to a parallel load input terminal of the T/R frequency control counter 432 and the output signal from the AND gates 420 previously described may be applied through the OR gates 532 to the counter 432. The END signal from the end-of-cycle detector 434 may be applied to the control input terminal of the AND gates 530 and may be delayed through a suitable delay circuit 534 and applied to another input terminal of the AND gate 526, to one input terminal of a two input terminal AND gate 536 and to one input terminal of a two terminal AND gate 538. The delayed END signal from the delay circuit 534 may also be further delayed by a delay circuit 540 and applied to the reset input terminal R of the flip-flop 524.

The output signal from the true output terminal Q of the flip-flop 524 may be applied to the other input terminals of the AND gates 526 and 536. The output signal from the false output terminal $\bar{Q}$ of the flip-flop 524 may be applied to the other input terminal and the AND gate 538 and the output signals from the AND gates 536 and 538 may be applied, respectively, to the set and reset input terminals of a flip-flop 542. The output signal from the true output terminal Q of the flip-flop 542 may be provided as the channel lock signal CHLK previously described as being provided by the control signal detector 332.

In operation, when the search for a control channel is not inhibited by the SINH signal and the received control signal contains the proper ID information, the sample and hold circuit 506 is enabled by the SENB signal from the AND gate 504. The sequence timer 520 triggers the sample and hold circit 506 and the level of the received control signal is sampled and held. The sequence timer then enables the A/D converter 510 and the digital RLVL signal is applied to the comparator 512.

The threshold level signal TLVL from the message register and decoder 366 selects an initially high threshold level for application from the threshold level selector 518 to the digital level register 516. The digital threshold level TLVL is applied to the comparator 512 and the sequence timer 520 enables the comparator 512 to compare the digital RLVL and TLVL signals.

If the RLVL signal is less than or equal to the TLVL signal in amplitude, the T/R frequency control counter 432 is incremented and a new control channel is monitored. If the RLVL signal is greater than the TLVL signal is amplitude, the RLVL signal is gated into the digital level register 516 and replaces the previous TLVL signal as the new threshold standard. The AND gates 522 are also enabled and the number of the channel to which the mobile unit is tuned is stored in the channel number register 528 and the flip-flop 524 is set enabling the AND gate 536 and inhibiting the AND gate 538.

The T/R frequency control counter 432 is then incremented and a new control channel is monitored. The control signal level received for the new control channel is compared by the comparator 512 with the TLVL signal which may now be a slightly higher threshold if a favorable comparison was previously detected. If any other control signal channel having a higher level than the TLVL signal is monitored, the number of the new control channel is stored by the channel number register 528 and the received signal level RLVL become the new threshold level.

At the end of the cycle, i.e., after the T/R frequency control counter 432 has been incremented through all of the control channels assigned to the system, the number in the channel number register 528 is gated through the AND gate 530 into the frequency control counter 432. If at least one signal of sufficient signal strength has been monitored, the flip-flop 524 is set and the number now stored in the frequency control counter 432 is gated through the AND gate 526 as the FRC signal. In addition, the flip-flop 542 is set and the channel lock signal CHLK assumes a high signal level indicating that channel lock-on has been achieved. The control signal selector comprising the control signal detector 332 and a portion of the message register and decoder 366 thereafter continues to scan control signal channels to ensure that the mobile unit remains locked onto the best signal channel.

IF, at the end of a cycle, the flip-flop 524 is not set, the flip-flop 542 is reset and the channel lock signal CHLK indicates a loss, or at least a failure to lock onto, a control signal channel throughout one entire scan cycle. The control signal loss detector 438, the AND gate 440 and the AND gate 436 may generate a TLVL signal as was previously described in connection with FIG. 6 to effect the selection of a slightly lower threshold level by the threshold level selector 518 of the control signal detector 332 of FIG. 10. On the next scan of all of the control channels, the initial threshold level entered into the digital level register 516 may thus be slightly lower than the intial threshold level on the previous scan. This lowering of the threshold level may continue either a predetermined number of times or indefinitely until the best available control signal is finally monitored.

H. RF Transceiver and Frequency Control Unit

The RF transceiver and frequency control unit 301 of the mobile unit 58 of FIG. 2 may include any suitable conventional transmitter, receiver, frequency control module, duplexer and antenna. The frequency control module 334 may be, for example, any suitable frequency controller such as that disclosed in the referenced Wells et al application of a suitable frequency synthesizer.

Figure 11:
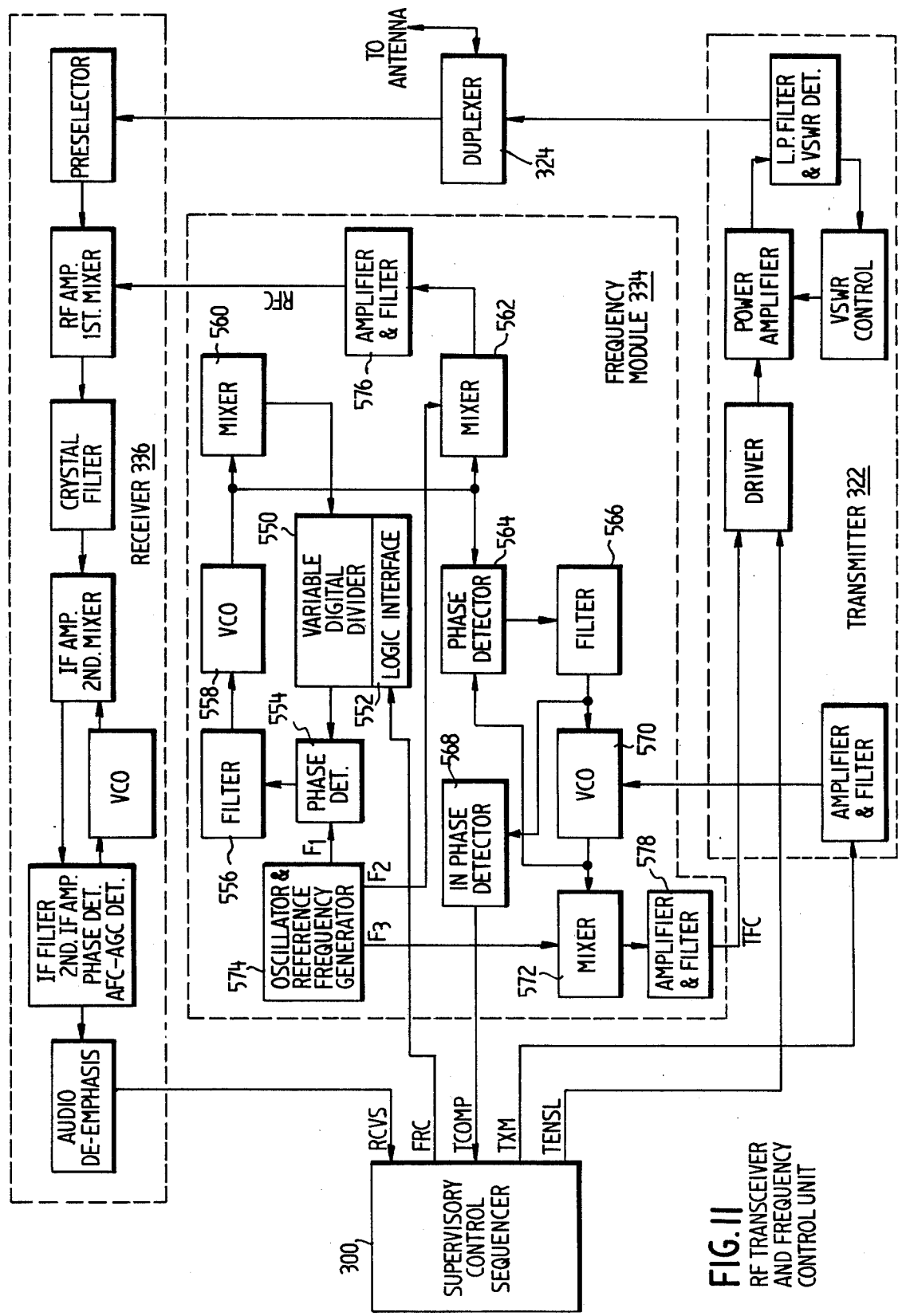
FIG. 11 is a functional block diagram of one embodiment of the RF transceiver and frequency control unit of the mobile unit of FIG. 2.

For example, FIG. 11 illustrates one embodiment of the RF transceiver and frequency control unit 301 of FIG. 2 employing a frequency synthesizer for control of transmitter and receiver frequency. Referring now to FIG. 11, the frequency control signal FRC from the supervisory control sequencer 300 may be applied to a conventional variable digital divider 553 through a suitable logic interface circuit 562. The output signal from the variable digital divider 550 may be applied to a suitable conventional phase detector 554 and the output signal from the phase detector 554 may be filtered by a suitable filter 556 and applied to the control input terminal of a voltage controlled oscillator 558. The output signal from the voltage controlled oscillator 558 may be applied through a conventional mixer 560 to an input terminal of the variable digital divider 550, to a mixer 562 and to a phase detector 564.

The output signal from the phase detector 564 may be filtered by a filter 566 and applied to a suitable "in phase" detector 568 and to a voltage controlled oscillator 570. The output signal from the in phase detector 568 may be provided as the tuning complete or TCOMP output signal from the frequency module 334 and may be applied to the supervisory control sequencer 300. The output signal from the voltage controlled oscillator 570 may be applied to a second input terminal of the phase detector 564 and to a mixer 572.

A suitable reference frequency generator 574 may provide reference frequencies $F_1$, $F_2$ and $F_3$ for use in synthesizing the desired transmitter and receiver frequencies in conjunction with the voltage controlled oscillators 558 and 570. The reference frequency $F_1$ from the reference frequency generator 574 may be applied to the second input terminal of the phase detector 554 and the reference frequency $F_2$ may be applied to a second input terminal of the mixer 562. The reference frequency $F_3$ may be applied to a second input terminal of the mixer 572.

The output signal from the mixer 562 may be amplified and filtered by a suitable amplifier and filter 576 and applied to a suitable stage of the receiver 336 as the receiver frequency control signal RFC. For example, the RFC signal may be applied to the first RF amplifier and mixer stage of the receiver 336 if a receiver such as that illustrated is employed. Since receivers of the type illustrated in FIG. 11 are conventional, the receiver 336 will not be described in detail.

The output signal from the mixer 572 may be amplified and filtered by a suitable amplifier and filter 578 and applied to the transmitter 322 as the transmitter frequency control signal TFC. For example, the TFC signal may be applied to a driver amplifier if a transmitter of the type illustrated is employed. Since the transmitter 322 is entirely conventional, it will not be discussed hereinafter in detail.

The output signal RCVS from the receiver 336 may be applied to the supervisory control sequencer 300 for use therein as was previously described. A separate signal RLVL (FIG. 2) may be provided from an appropriate stage of the receiver 336 to provide an indication of received signal level. However, the RCVS signal may be utilized for this purpose.

The data signal to be transmitted by the transmitter 322, i.e., the TXM signal, may be applied from the supervisory control sequencer 300 to the transmitter 322 and the transmitter enable signal TENBL may be applied from the supervisory control sequencer 300 to an appropriate stage of the transmitter 322. The TENBL signal may be utilized to control the energization and deenergization of the transmitter 322 in any suitable manner.

In operation, the frequency module 334 of FIG. 11 synthesizes two frequencies TFC and RFC which are offset by a predetermined difference frequency, i.e., the frequency offset between the up-link and the down-link of the selected channel. The frequency control signal FRC selects the frequencies at which the VCOs 558 and 570 oscillate and the combined output signals from the mixers 562 and 572 thus contain the selected transmitter and receiver frequencies for the selected channel. The receiver 336 may be energized at all times when the mobile unit is energized and the transmitter 322 may be selectively energized as was previously described by the TENBL signal. The carrier frequency of the signal transmitted by the transmitter 322 may be determined by the TFC signal and the TXM signal may modulate the carrier in any suitable manner. Similarly, the RFC signal applied to the receiver 336 may select the desired one of the received signals for amplification and demodulation by the receiver in any suitable manner.

III. IMTS Mobile Unit Embodiment

An embodiment of the mobile unit according to the present invention, compatible with a system employing IMTS control and signaling techniques, as illustrated in FIGS. 12–27. As in the mobile unit described in connection with FIGS. 2–11, the mobile unit of the IMTS compatible embodiment includes a supervisory control sequencer or control head 600 and an RF transceiver and frequency control unit 601. The supervisory control sequencer 600 includes an input/output panel generally indicated at 602 and various circuits through which calling and receiving functions may be performed either automatically or under the control of the subscriber (i.e. the mobile unit operator) as will hereinafter be described. The RF transceiver and frequency control unit 601 receives and broadcasts voice signals and, in the IMTS type system, various audio frequency and coded messages under the control of the supervisory control sequencer 600.

The input/output panel 602 may be similar to the input/output panel previously described in connection with FIG. 2 and may include a keyset and address storage unit 603, a control and indicator panel 604, an address display unit 605, a handset 606 and a speaker 607 with its associated volume control 608. The keyset and address storage unit 603 may be a conventional touch-tone pad and may supply keyset data signals KD through an encoder to an input circuit 610. The keyset 603 may also supply ketset strobe and rollover signals KSTB and KRO respectively, to the input circuit 610.

The control and indicator panel 604 may provide a home/roam or H/R signal, a hook switch or HKSW and a call switch or CSW signal to the input circuit 610 and may provide a test signal TST to a data processing circuit 612. An output circuit 614 supplies signals channel lock (CHLK), transmitter on (TXON) and call-in-progress or call back (CPI) through appropriate drivers to the indicators on the control and indicator panel 604. The output circuit 614 also supplies a display inhibit or DYINH signal and BCD-DATA signal through conventional BCD decoders and display drivers to the address display 604. A handset audio signal AUDIO(H) is supplied from the output circuit 614 to the handset 606 and a transmit audio signal AUDIO(T) is supplied from the handset 606 to the output circuit 614. A speaker audio signal AUDIO(S) is supplied to the speaker 607 and volume control terminals VCA and VCB are connected through a volume control unit 608 such as the illustrated rheostat.

The input circuit 610 supplies tone clock signals TCL and display clock signal DCL to the output circuit 614 and the output circuit 614 supplies a timing resynchronization signal TSYNC to the input circuit 610. The input circuit 610 also supplies a power on reset signal RST, data input signals IN0–IN3, and system clock signals SCL (CL1 and CL2) to the data processing circuit 612. The data processing circuit 612 supplies function select address signals BCS0–BCS3 to the input circuit 610 and to the output circuit 614 and also supplies data output signals OUT0–OUT3 and an output strobe signal OSTB to the output circuit 614.

The output circuit 614 supplies a transmitter enable signal TENBL, a frequency control signal FRC and a transmitter modulation signal TXM to the RF transceiver and frequency control unit 601. The received signal RCVS from the RF transceiver and frequency control unit 601 is supplied both to the output circuit 614 and the input circuit 610.

Figure 12:
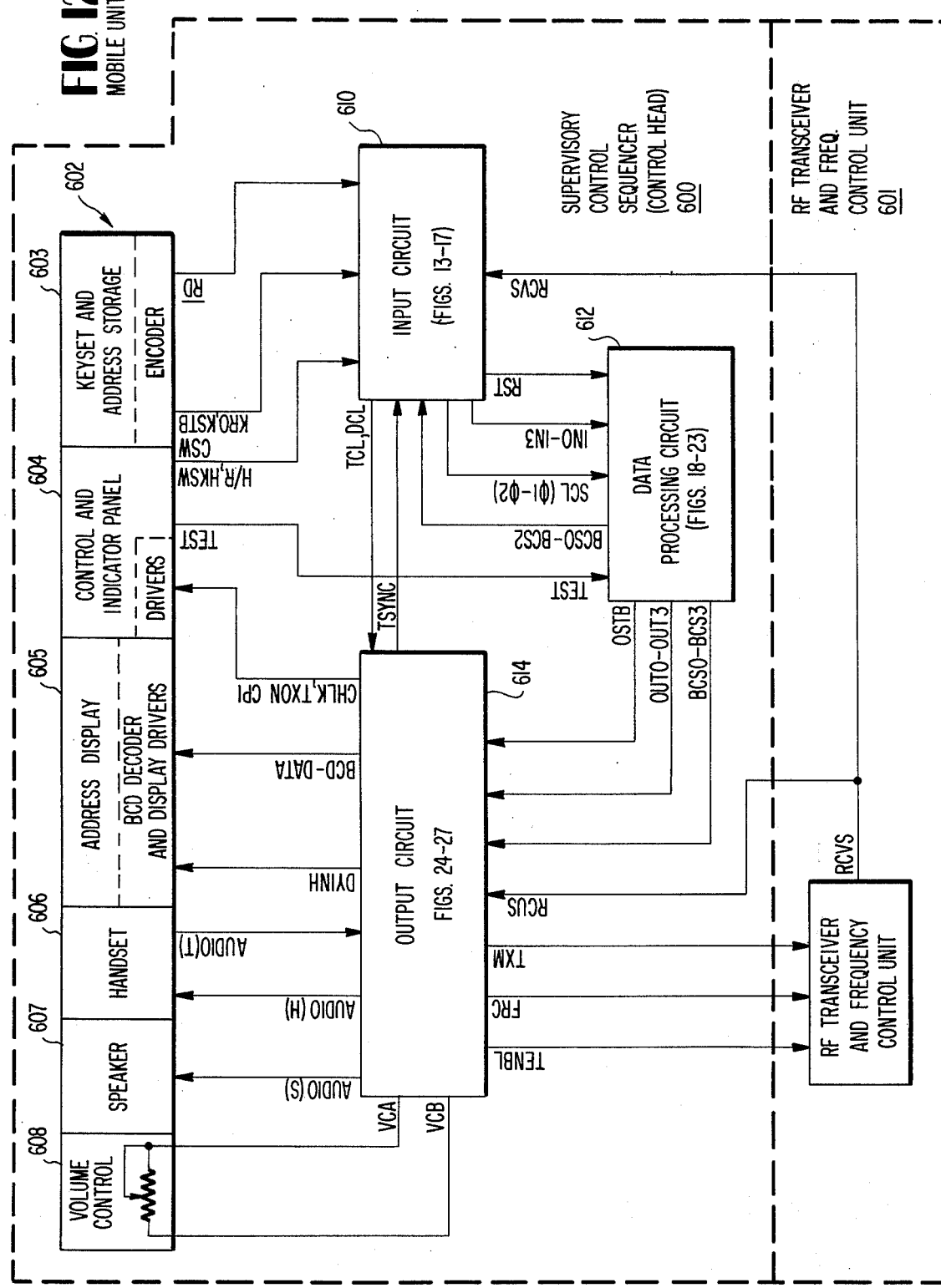
FIG. 12 is a functional block diagram of an IMTS compatible embodiment of the present invention.

The operation of the mobile unit illustrated in FIG. 12 is essentially identical to that of the mobile unit of FIG. 2 except that all control and signaling functions are accomplished using IMTS techniques, e.g., idle channel signaling and seizure. As in the FIG. 2 embodiment, the operator may enter a called address either through the ketset or the address storage unit and the address is displayed by the address display 605. If the entered address is correct, the operator may depress the call switch on the control and indicator panel 604 to initiate the call-up procedure without lifting the handset from the hookswitch. The call-up procedure is then automatically carried out by the mobile unit control head when an idle channel is available.

The input circuit 610 receives various input signals from the control and indicator panel 604 and the keyset and address storage unit 603 and multiplexes the signals for sampling by the data processing circuit 612. The input circuit 610 also generates clock signals utilized by the data processing circuits 612 and by the output circuit 614. A power-on reset circuit in the input circuit 610 generates the RST signal to initialize the processing circuits when the mobile unit is first turned on.

The input circuit 610 also receives the RCVS signal from the RF transceiver and frequency control unit 601 and detects the 1800 Hertz SEIZE tone and 2000 Hertz IDLE tone. The detected SEIZE and IDLE tones are supplied to the data processing circuit 612 as part of the multiplexed input data IN0–IN3 as will hereinafter be described in greater detail.

The data processing circuit 612 receives the input data signals IN0–IN3 and the system clock signals SCL from the input circuit 610 and performs various control and data processing functions necessary for call processing. The data processing circuit 612 stores various data and instructions and is stepped through a preset program by the system clock signals SCL. The data processing circuit, under program control, transfers either data from memory or the input data IN0–IN3 to the output circuit 614 as the output data OUT0–OUT3. As the data processing circuit 612 is stepped through its prestored program, the function select address signals BCS0–BCS3 are also generated and supplied as control signals to the output circuit 614 and the input circuit 610.

The output circuit 614 operates under the control of the data processing circuit 612 to supply data, control signals, tones and audio or voice signals to other subassemblies of the mobile unit. As will be described hereinafter in greater detail, the output circuit 614 supplies output signals to the input/output panel 602 of the control head 600 and to the RF transceiver and frequency control unit 601 from port latches having preassigned output terminals connected directly to the output devices. For example, the port latches, under the control of the data processing circuit 612, supply output signals to all panel indicators, to the transmitter and frequency synthesizer in the RF transceiver and frequency control unit 601, to the address display unit 605 and to both the handset 606 and the speaker 607. In addition to this data and control signaling, the output circuit 614 includes circuits for filtering of tones and control and amplification of the audio signals to the speaker and handset.

As will be appreciated from the foregoing and the more detailed description hereinafter, the mobile unit illustrated in FIG. 12 operates in conjunction with conventional IMTS system in a much improved manner. The mobile unit includes the transceiver 601 and supervisory control sequencer 600 (control head) previously described and described hereinafter in greater detail. The control head 600 is essentially the heart of the mobile unit and controls and supervises the functions of the transceiver and sends appropriate signals to the central terminal of the system through base stations. More specifically, it will be appreciated that the control head 600 performs the functions of:

1. scanning the available channels to locate the IDLE tone (2,000 Hz) and locking the mobile unit to that channel;
2. causing the mobile unit to send an acknowledged tone (2150 Hz) Guard tone) whenever it correctly receives its calling code;
3. turning on the mobile ringer, upon receipt of the ringing signals to alert the subscriber of an incoming call;
4. causing the mobile unit to send a 1633 Hz Connect tone when the subscriber goes "off-hook" to answer a call and, upon termination of a call, transmitting an alternating 1336/2150 Hz Disconnect tone;
5. causing the mobile unit to trnsmit a connect sequence and its identification code when the mobile unit initiates a call;
6. lighting the transmitter on (TXON) and other indicators on the input/output panel at apropriate times.

When a call is placed from a base station to a mobile unit, the call is first received at the terminal and the terminal replaces the IDLE tone (2000 Hz) with the SEIZE tone (1800 Hz). All of the mobile units, previously locked on to the IDLE tone now use the SEIZE tone as a latch. The terminal then sends the calling code of the desired mobile unit typically by interrupting the SEIZE tone with the IDLE tone, with each transition from SEIZE to IDLE representing one count.

All of the mobile units receive the calling code, but only one mobile unit can decode the call. As soon as an incorrect digit is recognized, the other mobile units unlock from the seized channel and start searching for a new idle channel. After correctly decoding the call, the called mobile unit sends an acknowledged signal (2150 Hz) Guard tone for 750 milliseconds). Upon receipt of the acknowledged signal, the base station sends the ringing signal, an alternating 200 Hz IDLE and 1800 Hz Seize tone, to actuate the mobile buzzer for the normal 2 seconds on-4 seconds off cycle and turn on the call-in progress (CIP) lamp.

When the subscriber answers the call by going "off-hook", i.e. by hook-switch, the mobile unit sends a 1633 Hz CONNECT tone for 400 milliseconds. Upon receipt of this signal, the central terminal removes the ringing signal and opens the conversation path to thus complete the call.

Upon completion of the conversation when the subscriber goes "on hook", the mobile unit transmits a disconnect signal (alternating 25 millisecond pulses of 1336 Hz DISCONNECT tone and 2150 Hz GUARD tone) for 750 milliseconds. This signal informs the base station that the channel has become vacant. At the end of the 750 millisecond disconnect signal, the mobile unit unlatches from the channel and start to search for idle channel.

If the call is unanswered after 45 seconds, the SEIZE tone is removed and the ringin ceases, but the "call-in-process" or "call back " indicator (CIP) remains on. The mobile unit then starts it search for another idle channel.

In a mobile unit-to-base station call, the mobile unit is usually locked on to an idle channel although this is not essential in accordance with the present invention. Thus when the subscriber goes "off-hook", the mobile unit transmits a 2150 Hz GUARD tone for 350 milliseconds followed by a 50 millisecond 1633 Hz CONNECT tone. Upon receipt of the CONNECT tone, the terminal removes the IDLE tone from the channel and designates another channel is idle. After at least 250 milliseconds, the terminal transmits an 1800 Hz SEIZE tone. The mobile then identifies itself in alternate pulses of 1633 Hz CONNECT tone with the 2150 Hz GUARD tone after each even cummulative pulse as parity. After the correct identification has been received, the terminal provides a dial tone.

When this subscriber goes "on hook" at the end of the conversation, the mobile unit transmits a disconnect signal for 750 milliseconds (alternating 25 millisecond pulses of 1336 Hz DISCONNECT 2150 Hz GUARD tones). After the 750 millisecond disconnect period, the mobile is unlatched and starts searching for idle channel.

As will be appreciated by one skilled in art to which the invention pertains, calls may be placed in accordance with the present invention without lifing the handset from the hook-switch. The handset need only be lifted after the called party answers. The called number is displayed on a readout so that the number can be verified before the call is placed, which can provide a significant saving of air time. Moreover, calls are placed automatically if the system is busy when the desired number is dialed. In addition, frequently called numbers can be stored in advance so that the user can place a call by simply pressing one key.

It is also contemplated in accordance with the present invention that Touch-Tone signaling may be utilized to increase the efficiency of channel use by reducing the time required to transmit address information. The time saved can then be translated into additional calls handled for increase revenue from the system.

A. Input Circuit

Figure 13:
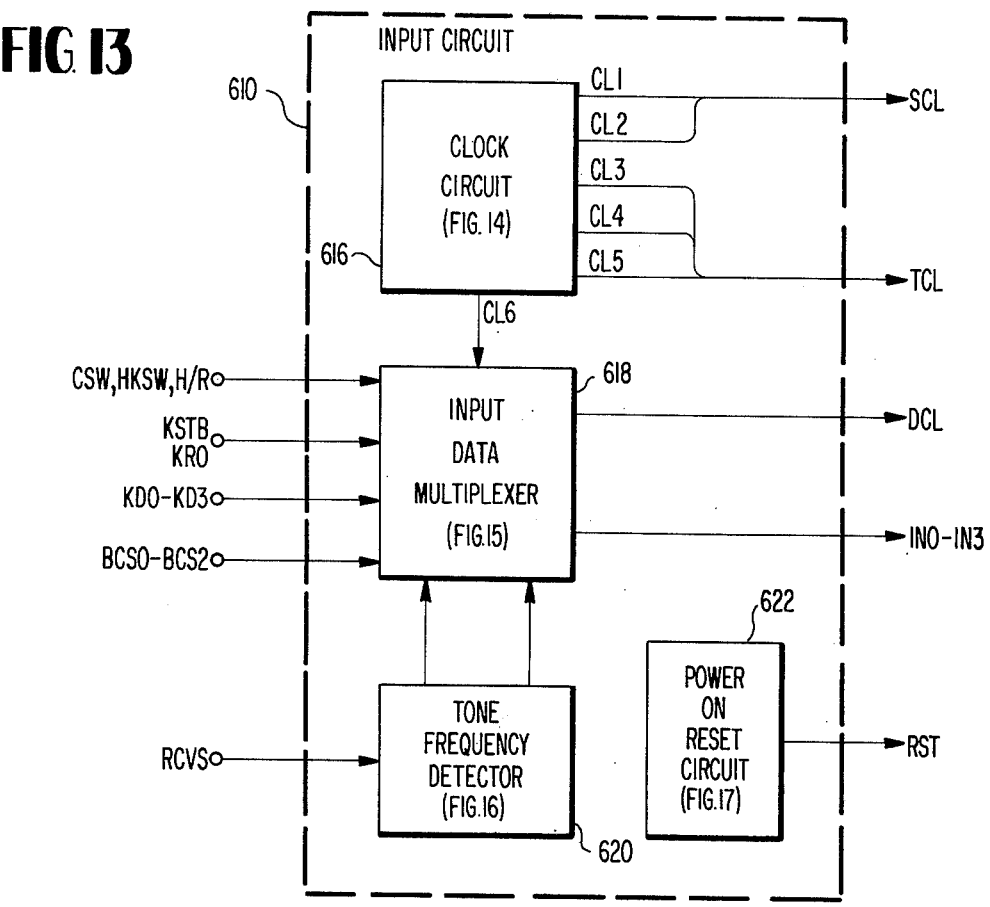
FIG. 13 is a functional block diagram of the input circuit of FIG. 12.

The input circuit 610 of FIG. 12 is illustrated in greater detail in FIGS. 13–17 to facilitate an understanding of the IMTS compatible embodiment of the invention. Referring now to FIG. 13, the input circuit includes a clock circuit 616 which generates various clock signals CL1–CL6 for the timing of the supervisory control sequencer and for generation of signaling tones. The clock signals CL1 and CL2 are provided as the system clock signals SCL and the clock signals CL3–CL5 are provided as the tone clock signals TCL. The clock signal CL6 is supplied to an input data multiplexer 618 to provide the timing therefor.

The input data multiplexer 618 receives various input signals and provides multiplexed output data. The CSW, HKSW and H/R signals from the control and indicator panel 604 of FIG. 12 and the keyboard data, roll-over and strobe signals KD0–KD3, KRO and KSTB are all supplied to the input data multiplexer from the input/output panel 602. A tone frequency detector 620 is supplied with the RCVS signal from the RF transceiver and frequency control unit 601 and detects the SEIZE and IDLE tones on the received signal. Indications of SEIZE and IDLE tone detection are provided as input data to the input data multiplexer 618 and the date, together with the date from the input/output panel, is multiplexed under the control of the BCS0–BCS2 signls from the data processing circuit 612 to provide the multiplexed input signals IN0–IN2. The display clock DCL is also supplied as an output signal from the input data multiplexer 618.

The input circuit 610 also includes a power-on reset circuit 622. The power-on reset circuit provides a delayed reset signal RST at some time after the initial turn-on of the mobile unit. The reset signal RST thus resets or initializes the control circuits of the mobile unit control head after initial transients have settled out.

1. Clock Circuit

Figure 14:
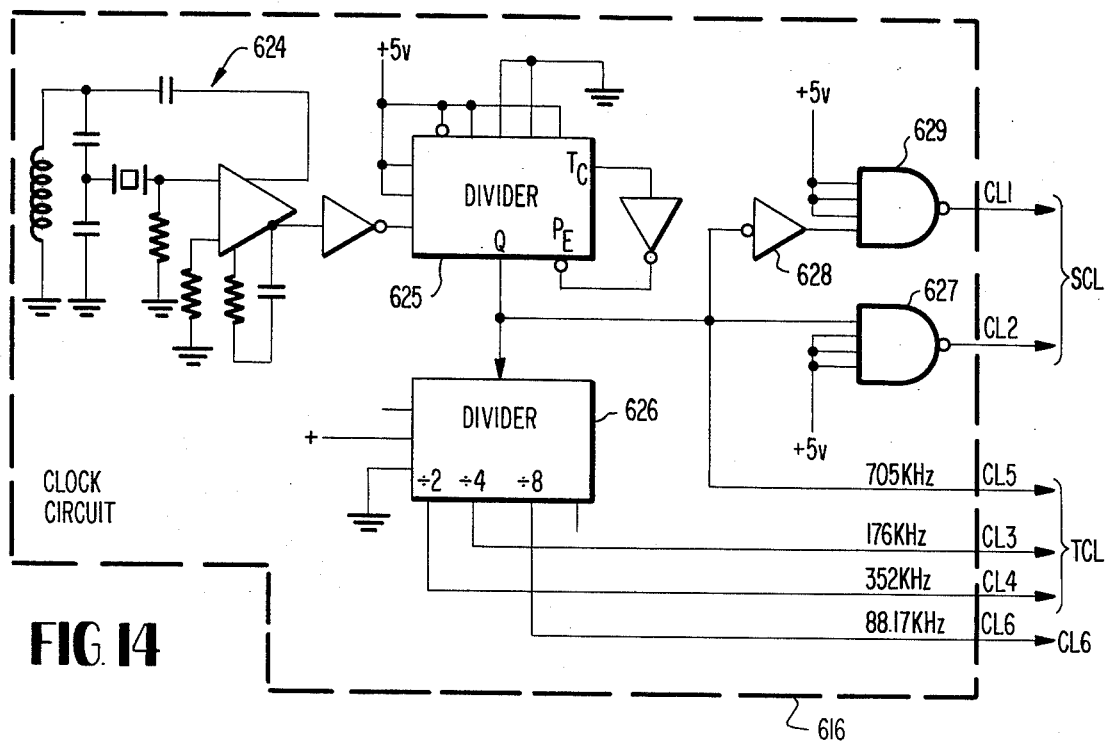
FIG. 14 is a detailed functional block diagram of the clock circuit of FIG. 13.

The clock circuit 616 of FIG. 13 may be any suitable conventional circuit capable of supplying various clock signals utilized for control head timing and tone generation. For example, as illustrated in FIG. 14, the clock circuit 616 may include a conventional crystal controlled oscillator generally indicated at 624 and frequency dividers 625 and 626. In the embodiment illustrated in FIG. 14, the crystal controlled oscillator 624 provides a 4.93752 megahertz output signal to the divider 625. The divider 625 divides the oscillator output signal be seven so as to provide a 705 kilohertz output signal at the output terminal Q of the divider 625.

A 705 kilohertz output signal from the divider 625 is supplied directly to an output terminal of the clock circuit as the CL5 tone clock signal. The 705 kilohertz output signal from the divider 625 is also supplied through a NAND gate 627 connected to operate as a driver/inverter and through an inverter 628 and a second NAND gate 629 connected to operate as a driver/inverter. The output signals from the NAND gates 627 and 629 are provided as the system clock signals SCL (CL1 and CL2).

The 705 kilohertz output signal from the divider 625 is also supplied to an input terminal of a divider 626. The divider 626 divides the 705 kilohertz signal by two, four and eight to supply the respective 352 KHg, 176KHg and 88.17 KHg clock signals CL4, CL3 and CL6. Accordingly, a single oscillator supplies synchronized system clock signals and clock signals uitlized for tone generation as will hereinafter be described in greater detail.

2. Input Data Multiplexer

Figure 15:
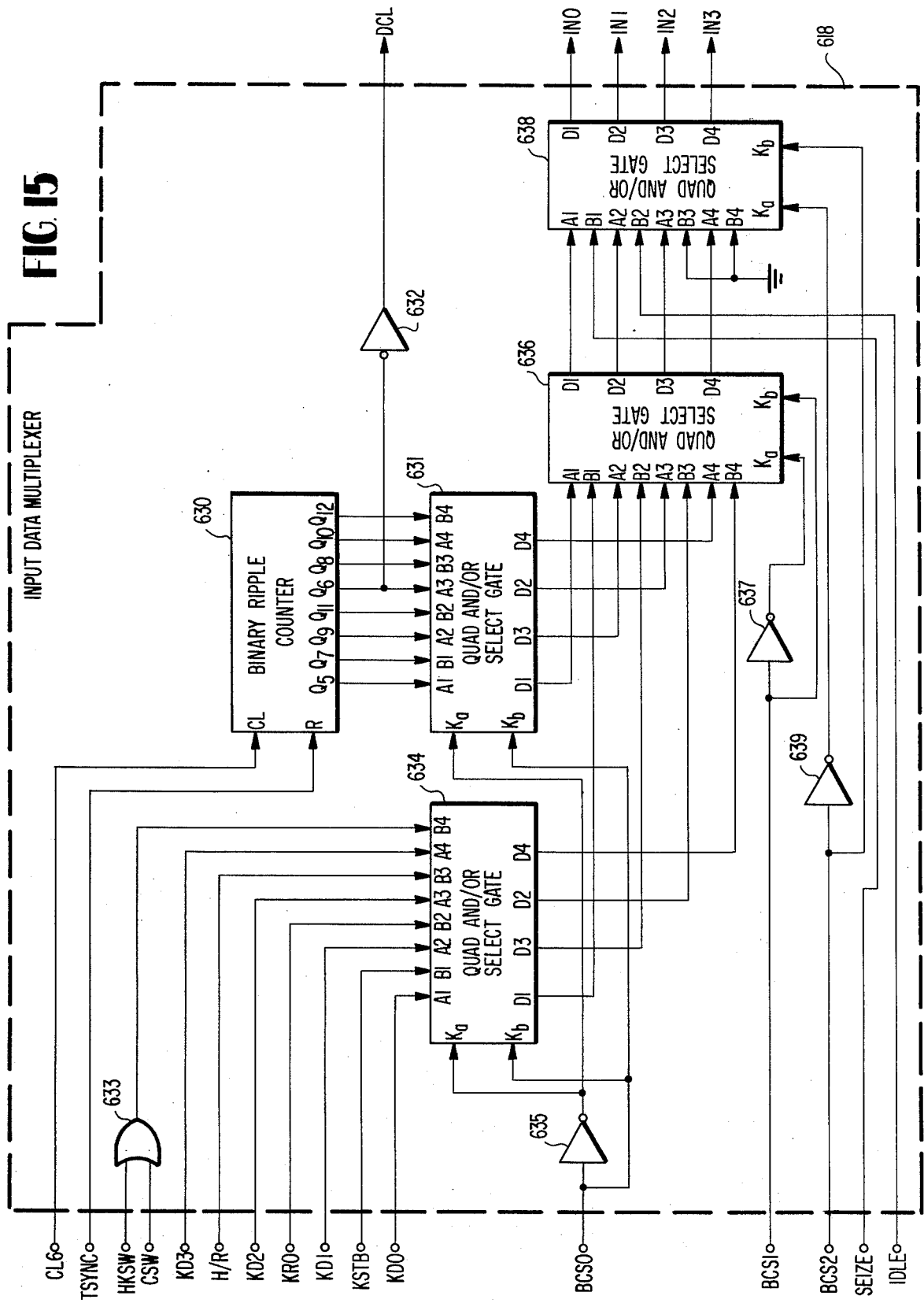
FIG. 15 is a detailed functional block diagram of the input data multiplexer of FIG. 13.

One embodiment of the input multiplexer 618 of FIG. 13 is illustrated in greater detail in FIG. 15 to facilitate and understanding of the IMTS embodiment of the present invention.

Referring now to FIG. 15, the clock signal CL6 from the clock circuit 616 of FIGS. 13 and 14 is applied to the clock input terminal CL of a conventional binary ripple counter 630. The timing resynchronization signal TSYNC is supplied to the reset input terminal R of the counter 630 and the output signals from the respective Q5, Q7, Q9, Q11, Q6, Q8, Q10 and Q12 output terminal of the counter 630 are supplied to the respective input terminals A1, B1, A2, B2, A3, B3, A4 and B4 of a conventional quad AND/OR select gate 631 e.g., a model CD 4019 multifunctional integrated gating circuit commercially available from Radio Corporation of America. The output signal from the Q6 output terminal of the counter 630 is also supplied through an inverter 632 as the display clock signal DCL of the multiplexer 618.

The hook-switch signal HKSW and the call switch signal CSW from the input/output panel of the mobile unit may be supplied through a two input terminal OR gate 633 to the D4 input terminal of a conventional quad AND/OR select gate 634. The keyboard data signals KD0-KD3 may be supplied to the respective A1, A2, A3 and A4 input terminals of the quad AND-/OR select gate 634. The keyboard strobe signal KSTB, the keyboard rollover signal KRO and the home/roam signal H/R may be supplied to the input terminals B1, B2, and B3 of the quad AND/OR select gate 634 and the function select address signal BCS0 may be supplied through an inverter 635 to the K$a$ input terminals of the gates 634 and 631. The BCS0 signal may also be supplied directly to the K$b$ input terminals of the gates 634 and 631.

The ouput signal from the D1, D3, D2 and D4 output terminals of the quad AND/OR select gate 631 may be supplied to the respective input terminals A1, A2, A3 and A4 of a conventional quad AND/OR select gate 636. The output signals from the D1, D3, D2 and D4 output terminals of the quad AND/OR select gate 634 are supplied to the respective input terminals B1, B2, B3 and B4 of the gate 636. The BCS1 signal from the date processing circuit 612 of FIG. 12 is applied through an inverter 637 to the K$a$ input terminal of the gate 636 and is also supplied directly to the K$b$ input terminal of the gate 636.

The output signals from the D1, D3 D2 and D4 output terminals of the gate 636 are applied to the respective input terminals A1, A2, A3 and A4 of a quad AND/OR select gate 638. The BCS2 signal from the data processing circuit 612 of FIG. 12 is applied through an inverter 639 to the K$a$ input terminal of the gate 638 and is applied directly to the K$b$ input terminal thereof. The SEIZE and IDLE signals from the tone frequency detector 620 of FIG. 13 are applied to the respective input terminals B1 and B2 of the gate 638 and the terminals B3 and B4 of the gate 638 are grounded. The output signals from the D1, D3, D2 and D4 output terminals of the gate 638 are supplied as the respective IN0-IN3 output signals for application to the data processing circuit 612 of FIG. 12.

In operation, input data multiplexing is accomplished in the illustrated embodiment by cascading quad AND-/OR select gates as illustrated. The AND/OR select gates are conventional multi-functional gates available from Radio Corporation of America under the model designation CD 4019A and operate such that the output signal from any output terminal may be defined by the boolean expression $D1=(A1 \cdot Ka)+(B1 \cdot Kb)$ where the plus sign indicates a logical OR function and the dot indicates a logical AND function. Thus, each of the output signals from the terminals D1–D4 of the illustrated quad AND/OR gates may be defined by this same boolean equation.

The input signals from the keyset 603 of FIG. 12 are supplied to the gate 634 for selection by the function select address signal BCS0. Timing is provided by the binary ripple counter 630 and the gate 631 in response to the CL6 clock signal and the timing resync or TSYNC signal. The keyboard and switch functions are multiplexed with the seize and idle tone functions in the quad AND/OR select gates 638 to supply the multiplexed data word IN0–IN3 for input sampling by the data processing circuit 612 as described hereinafter. The input data multiplexer thus effectively converts the various input functions related to signals to a four bit, port selectable data word IN0–IN3, the ports being selected in response to the function select address signals BCS0–BCS2 supplied by the data processing circuit 612 of FIG. 12.

3. Tone Frequency Detector

Figure 16:
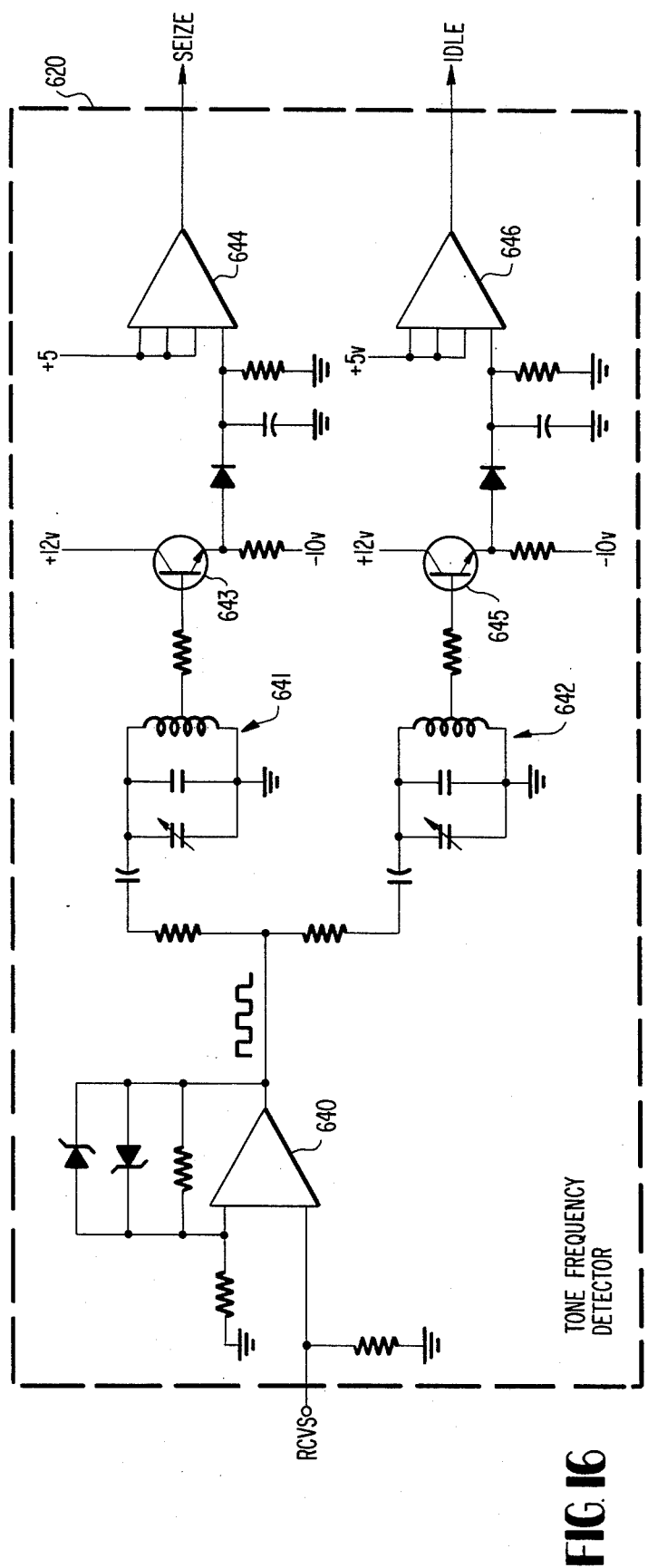
FIG. 16 is a schematic diagram of the tone frequency detector of FIG. 13.

One embodiment of the tone frequency detector 620 of FIG. 13 is illustrated in greater detail in FIG. 16 to facilitate an understanding of the invention.

Referring now to FIG. 16, the RCVS signal from the RF transceiver and frequency control unit 601 of FIG. 12 is supplied to the tone frequency detector 620 for detection of either the 1,800 Hertz SEIZE or the 2,000 Hertz IDLE tone. As was previously described, the IDLE tone is transmitted on the one of the communications channels designated the idle channel and not currently in use in the system. The SEIZE tone is transmitted on the channel when the channel is seized to service a call and receipt of the SEIZE tone tells all receivers to search for and monitor a new idle channel.

The RCVS signal is supplied to a shaping amplifier 640 which provides a squaring action and supplies a constant amplitude square wave to a pair of resonant circuits generally indicated at 641 and 642. The resonant circuit 641 responds to an 1,800 Hertz signal and rejects signals on either side thereof. When an 1,800 Hertz tone is received, a NPN transistor 643 is turned on and, if the tone is present for a sufficient period of time, a Shmitt trigger circuit 644 is turned on to provide the SEIZE signal.

Similarly, the resonant circuit 642 responds to a 2,000 Hertz signal to trigger a transistor 645 and a Shmitt trigger 646. Accordingly, the IDLE signal is provided in response to the receipt of a 2,000 Hertz tone for a sufficient period of time.

4. Power On Reset Circuit

Figure 17:
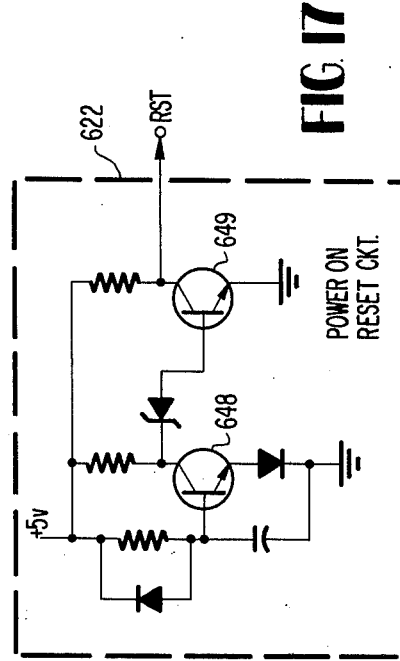
FIG. 17 is a schematic diagram of the power on reset circuit of FIG. 13.

The power on reset circuit 622 of FIG. 13 is illustrated in greater detail in FIG. 17. Referring now to FIG. 17, the power on reset circuit may include two PNP transistors 648 and 649 connected to the logic power supply voltage to provide an output pulse a short time after the mobile unit power is turned on.

Such circuits are well known and may include the two PNP transistors 648 and 649 connected in a circuit arrangement with passive circuit elements, e.g., resistor capacitors and diodes, as illustrated in FIG. 17. The various circuit elements may be sized in accordance with the characteristics of the mobile unit power supplies so as to provide the appropriate reset output signal RST at a desired interval after turn on, i.e. at a time when all transients have settled out.

B. Data Processing Circuit

One embodiment of the data processing circuit 612 of FIG. 12 is illustrated in greater detail in FIGS. 18–23 to facilitate an understanding of the IMTS embodiment of the present invention.

Figure 18:
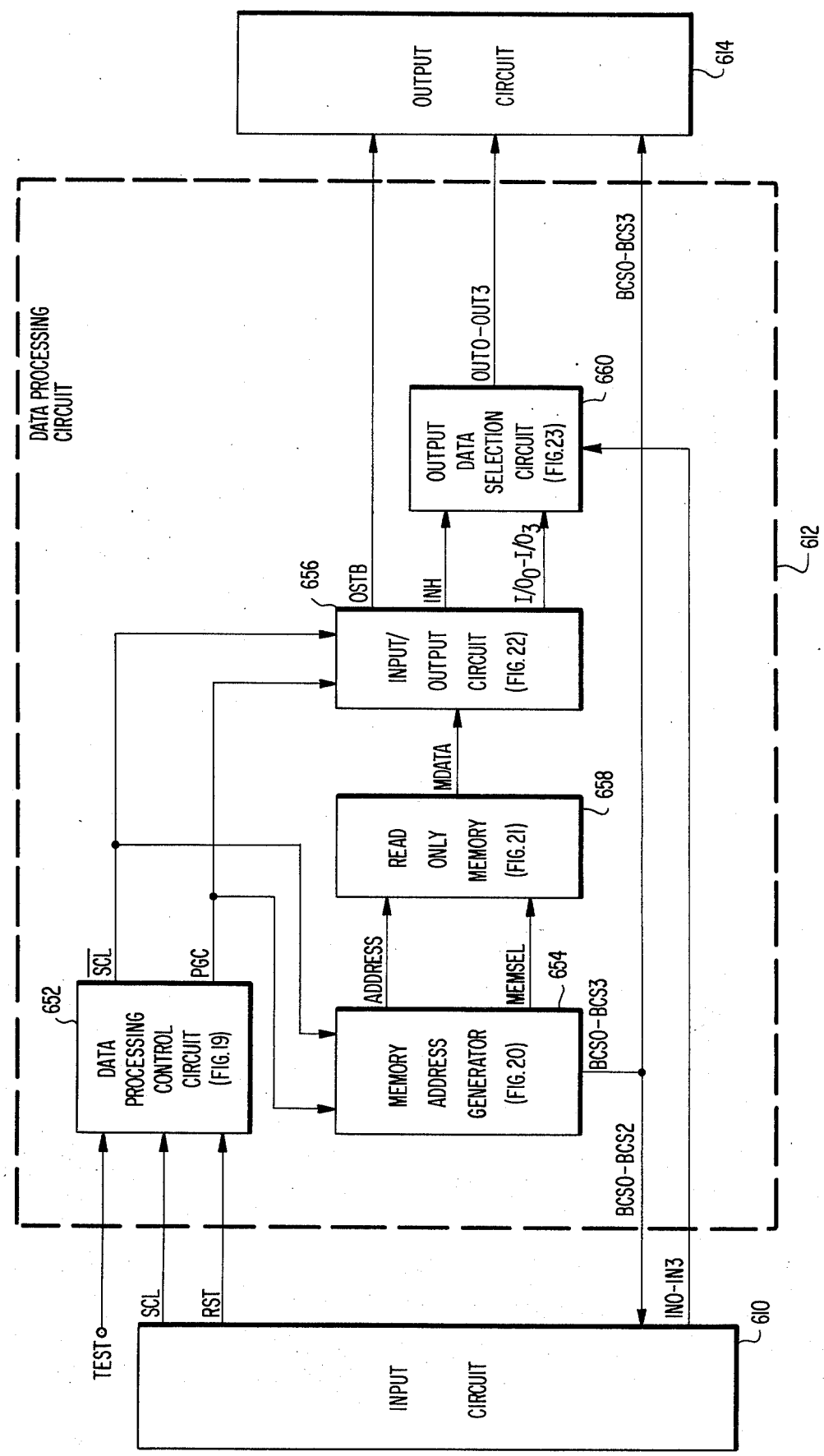
FIG. 18 is a functional block diagram of the data processing circuit of FIG. 12.

Referring now to FIG. 18 wherein the data processing circuit is illustrated functionally, the test signal from the control and indicator panel 604 of FIG. 12 may be applied to a data processing control circuit 652 described hereinafter in connection with FIG. 19. The system clock signals SCL and the reset signal RST may be supplied to the data processing control circuit 652 from the input circuit 610 described previously.

The inverted system clock signals $\overline{SCL}$ may be supplied from the data processing control circuit 652 to a memory address generator 654 and to an input/output circuit 656. A program control signal PGC from the data processing control circuit 652 may be supplied to the memory address generator 654 and to the input-/output circuit 656.

The memory address generator 654 may generate the function select address signals BCS0–BCS3 and may supply these signals to the output circuit 614. The function select address signals BCS0–BCS2 may be supplied to the input circuit 610 for use in the multiplexing of the input data as was previously described. The memory address generator 654 may also generate an address signal ADDRESS and a mamory select signal MEMSEL and supply these signals to a read-only memory 658. Data from the read only memory 658, i.e. the signal MDATA, may be supplied to the input/output circuit 656.

The input/out circuit 656 may supply an output strobe signal OSTB to the output circuit 614 and may supply both an inhibit signal INH and input/output bits I/00–I/03 to an output data selection circuit 660. The multiplexed input signals IN0–IN3 from the input circuit 610 may be supplied to the output data selection circuit 660 and the output signals OUT0–OUT3 from the data selection circuit 660 may be supplied to the output circuit 614.

In operation, the data processing control circuit 652 is clocked by the system clock signal SCL and generates a sequence of program control signals PGC. The program control signals PGC successively step the memory address generator 654 through a series of memory addresses so that a predetermined sequence of microprograms and data for call processing and control of the mobile unit. The stored data MDATA is supplied to the input/output circuit 656 for transfer to the output data selection circuit 660 under the control of the program control signal PGC. The input data IN0–IN3 from the input circuit 610 is also supplied to the output data selection circuit 660 and, in response to the inhibit INH, the output data selection circuit 660 selects between the input signals IN0–IN3 and the signals I/0-0–I/02 for application as the output signal OUT-0–OUT3 to the output circuit 614.

In addition, the memory address generator 654 in the data processing circuit 612 generates the address select signals BCS0–BCS3. The function select address signals are indicative of the functions being performed by the mobile unit at any particular time and are employed both in the multiplexing of the input data by the input circuit 610 and in the generation of output data by the output circuit 614 as will hereinafter be described in greater detail.

1. Data Processing Control Circuit

Figure 19:
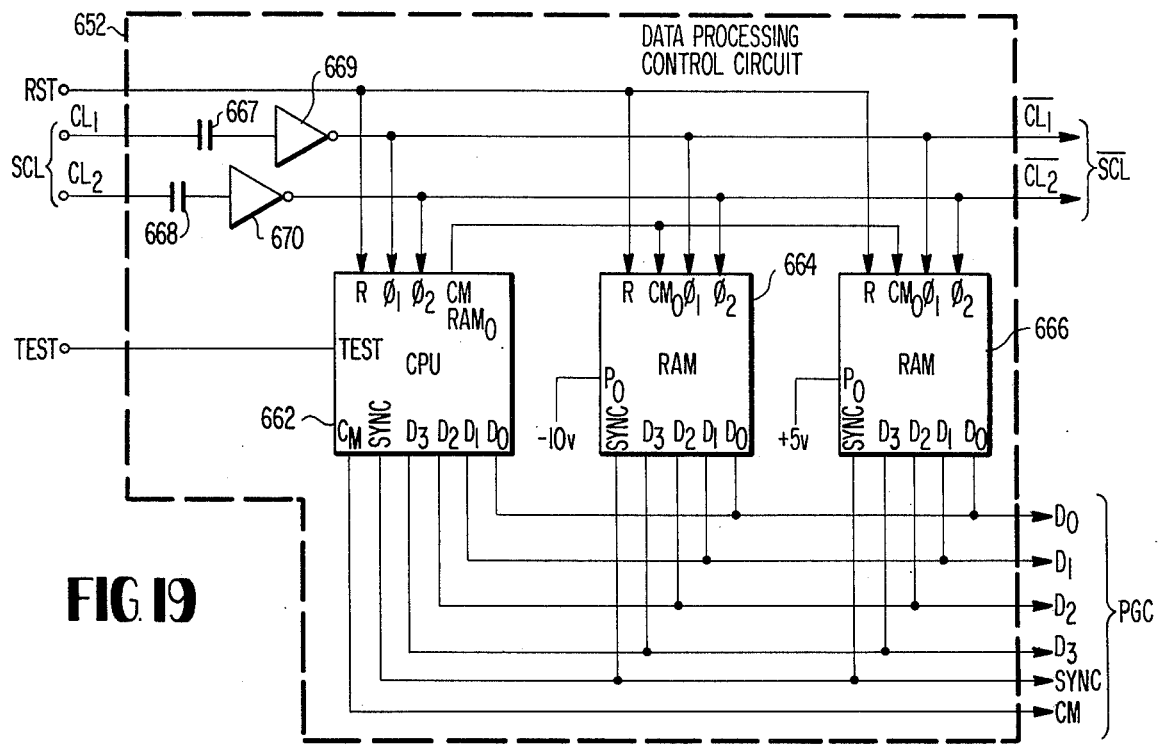
FIG. 19 is a detailed functional block diagram of the data processing control circuit of FIG. 18.

One embodiment of the data processing control circuit 652 of FIG. 18 is illustrated in greater detail in FIG. 19 to facilitate an understanding of the IMTS embodiment of the invention.

Referring now to FIG. 19, the data processing control circuit 652 of the present embodiment includes a suitable conventional integrated circuit central processing unit (CPU) 662 and two conventional integrated circuit random access memories (RAM) 664 and 666. For example, the integrated circuit CPU 662 may be a commercially available INTEL MOdel No. 4004 CPU and the RAM's 664 and 666 may be commercially available INTEL Model No. 4002 RAM's, with the terminals connected as illustrated.

Specifically, the reset input signal RST from the power on reset circuit 622 of FIG. 13 is supplied to the reset input terminal R of each of the integrated circuits 662, 664 and 666. The system clock signals CL1 and CL2 are supplied through suitable coupling capacitors 667 and 668 and inverters 669 and 670, respectively, to the respective C1 and C2 input terminals of the integrated circuits 662, 664 and 666. The inverted system clock signals $\overline{CL1}$ and $\overline{CL2}$ are also supplied as output signals from the data processing control circuit 652.

The TEST signal from the input/output panel is supplied to the test input terminal of the CPU chip 662 and the CM-RAMO output terminal of the CPU 662 is connected to the CMO terminals of the RAMs 664 and 666. The output signal from the CM output terminal of the CPU 662 is provided as one of the program control output signals PGC. The D0–D3 output signals and the SYNC output signal of each of the integrated circuit chips 662, 664 and 666 are provided as the other program control signals PGC.

In operation, the CPU 662 operates in conjunction with the RAMs 664 and 666 and the read only memory 658 of FIG. 18 to control the operation of the mobile unit and to perform data processing functions necessary for mobile unit call processing as previously described. The RAMs 664 and 666 contain stored data and instructions and, under the control of the CPU 662, provide these data and instructions as the program control signal PGC in response to the system clock signals SCL. The CPU 662 also provides control signals for control of data transfer from the input data bus to the output data bus and the like.

2. Memory Address Generator

Figure 20:
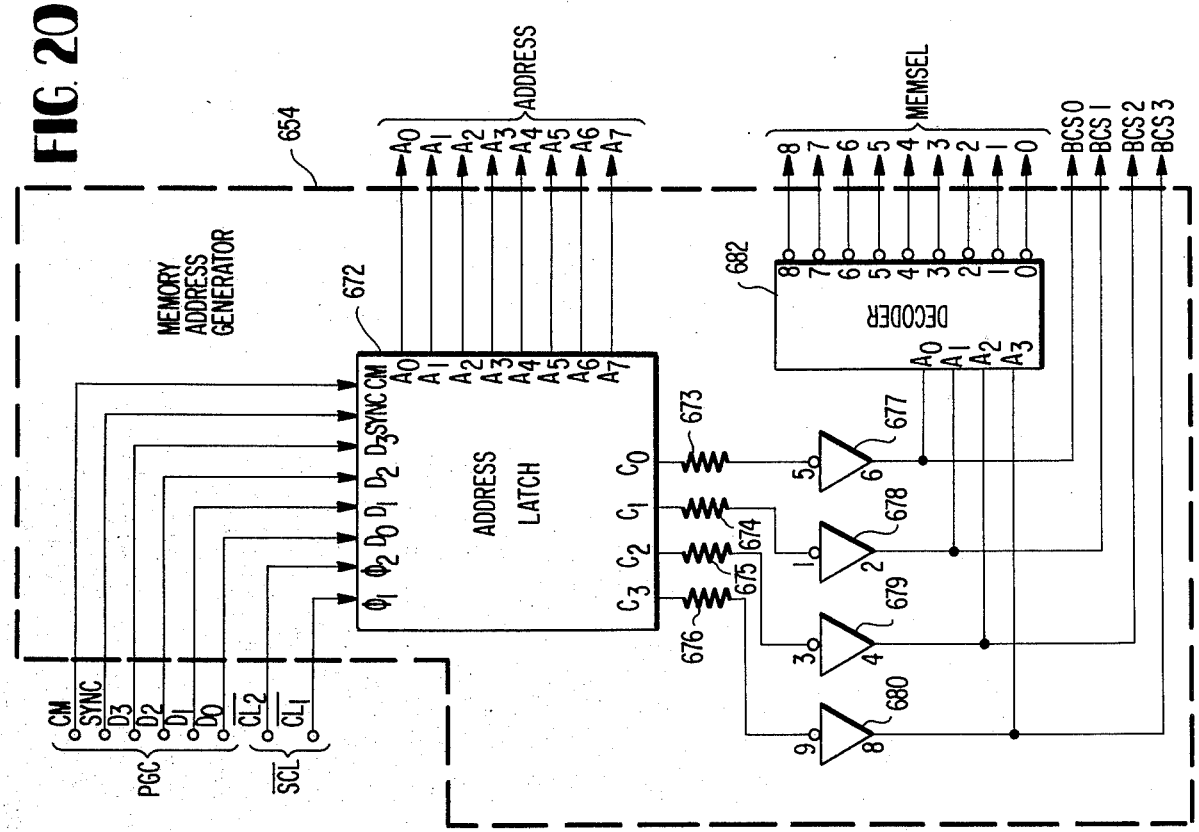
FIG. 20 is a detailed functional block diagram of the memory address generator of FIG. 18.

One embodiment of the memory address generator 654 is illustrated in greater detail in FIG. 20 to facilitate an understanding of the IMTS embodiment of the present invention.

Referring now to FIG. 20, the memory address generator 654 generates the memory address and select signals ADDRESS and MEMSEL as well as the function select address signals BCS0–BCS3 in response to the program control signals PGC and system clock signals SCL. The program control signals PGC from the data processing control circuit 652 of FIG. 18 are supplied to the like designated input terminals CM, SYNC, D0–D3 of an address latch 672. The address latch 672 in the illustrated embodiment essentially interfaces the data processing control circuit 652 with the read only memory 658 of FIG. 18 with other circuits of the control head. In this connection, the illustrated address latch is preferably an INTEL 4008 address latch having the input and output terminal configuration illustrated in FIG. 20.

The A0–A7 output signals from the like designated output terminals of the address latch 672 are provided as the ADDRESS output signal for addressing the read only memory 658 of FIG. 18. The output signals from the C0–C3 output terminals of the address latch 672 are supplied through respective current limiting resistors 673–676 and inverters 677–680 to the respective input terminals A0–A3 of a suitable conventional four-to-10 line decoder 682, e.g. a BCD/decimal decoder. The signals from the inverters 677–680 are also supplied as the respective function select address signals BCS0–BCS3 for use by the input circuit 610 and the output circuit 614 as illustrated in FIG. 18. The 0–8 output signals from the four-to-10 line decoder 682 are provided as the memory select signals MEMSEL.

In operation, the address latch 672 decodes the program control signals PGC from the data processing control circuit 652 of FIG. 18 and generates various addresses for the selection of data from the read only memory 658 of FIG. 18. The address latch 672 also provides a four bit output signal indicative of the general functions or modes of operation of the control head specified by the program signals PGC. This four bit signal is supplied to the decoder 682 so that a particular read only memory may be enabled by one of the memory select signals MEMSEL and then addressed by the ADDRESS signal. Moreover, the four bit signal from the address latch 672 indicative of the current function being performed by the mobile unit control head is supplied as the function select address signal BCSO-BCS3 for control of other circuits in the mobile unit control head.

3. Read Only Memory

Figure 21:
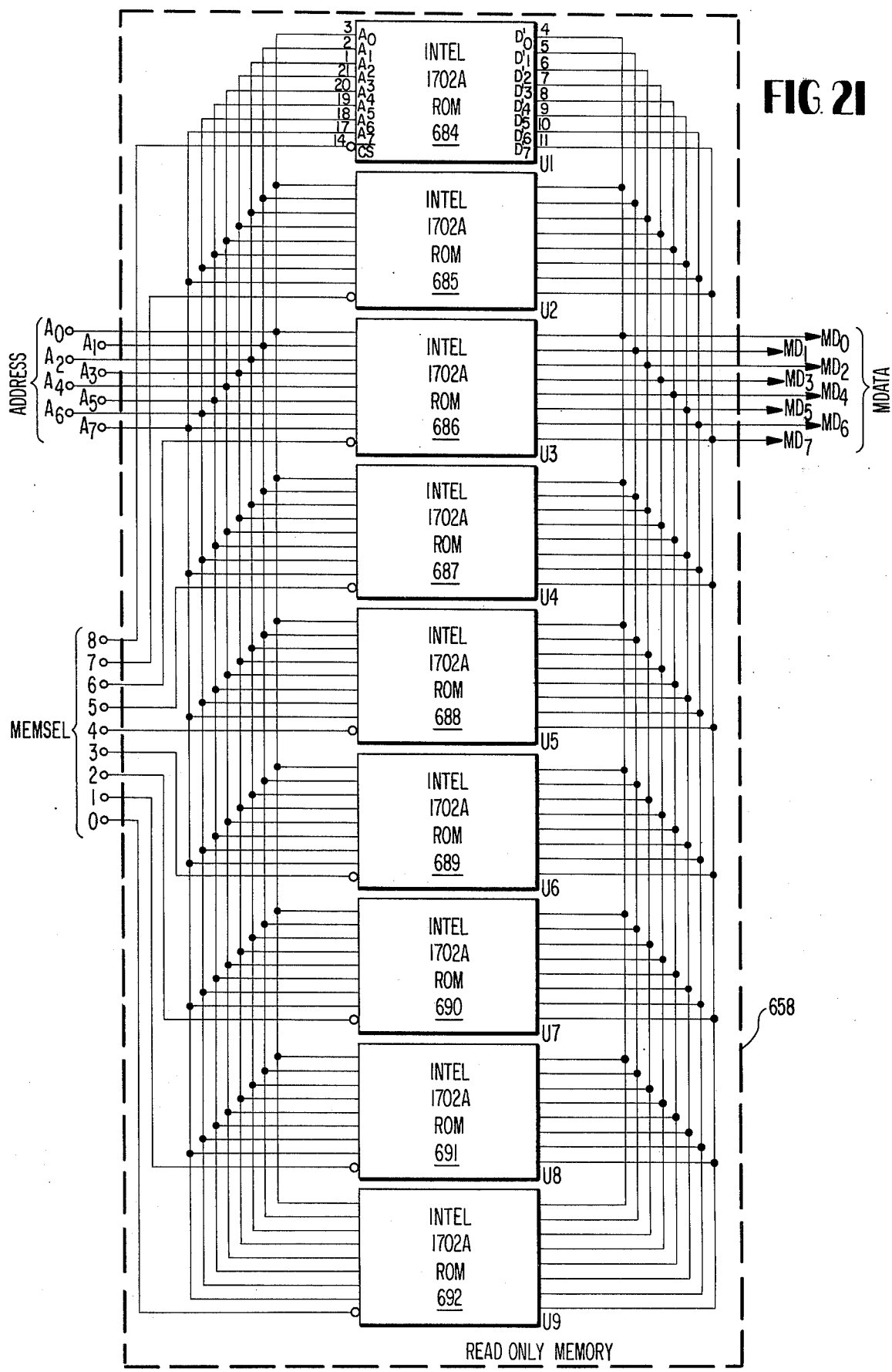
FIG. 21 is a detailed functional block diagram of the read only memory of FIG. 18.

One embodiment of the read only memory 658 of FIG. 18 illustrated in greater detail in FIG. 21 to facilitate an understanding of the IMTS embodiment of the present invention.

Referring now to FIG. 21, the read only memory 658 of the illustrated embodiment includes a plurality of individual INTEL model 1702A read only memories (ROM) 684-692 arranged to be addressed and provide the output data as illustrated. The address signal AO-A7 are supplied to the like designated input terminals of each of the read only memories 684-692. The memory select signals 0-8 are individually supplied to an associated one of the read only memories 684-692 to the enable or $\overline{CS}$ input terminal thereof. The memory data output signals MDO-MD7 are supplied from the respective DO-D7 output terminals of each of the read only memories 684-692 as the memory data output signal MDATA for use in controlling the operation of the mobile unit.

In operation, the memory select signal MEMSEL enables one of the read only memories 684-692. For example, the data processing control circuit 652 may instruct the mobile unit control head to transmit a particular tone. The instruction from the data processing control circuit 652 of FIG. 18 may be decoded by the memory address generator 654 as described previously and the memory select signal may indicate that the desired data or instruction is stored in one of the read only memories, e.g. the ROM 692. The memory select signal O may thus enable the ROM 692 and the address signal ADDRESS may select a particular instruction or particular data stored by the ROM 692. The selected data is then provided as the memory data signal MDATA to the input/output circuit 656 of FIG. 22. In this manner, commercially available integrated circuit ROMs may be utilized and power consumption may be minimized since only one ROM is enabled at any given time.

4. Input/Output Circuit

Figure 22:
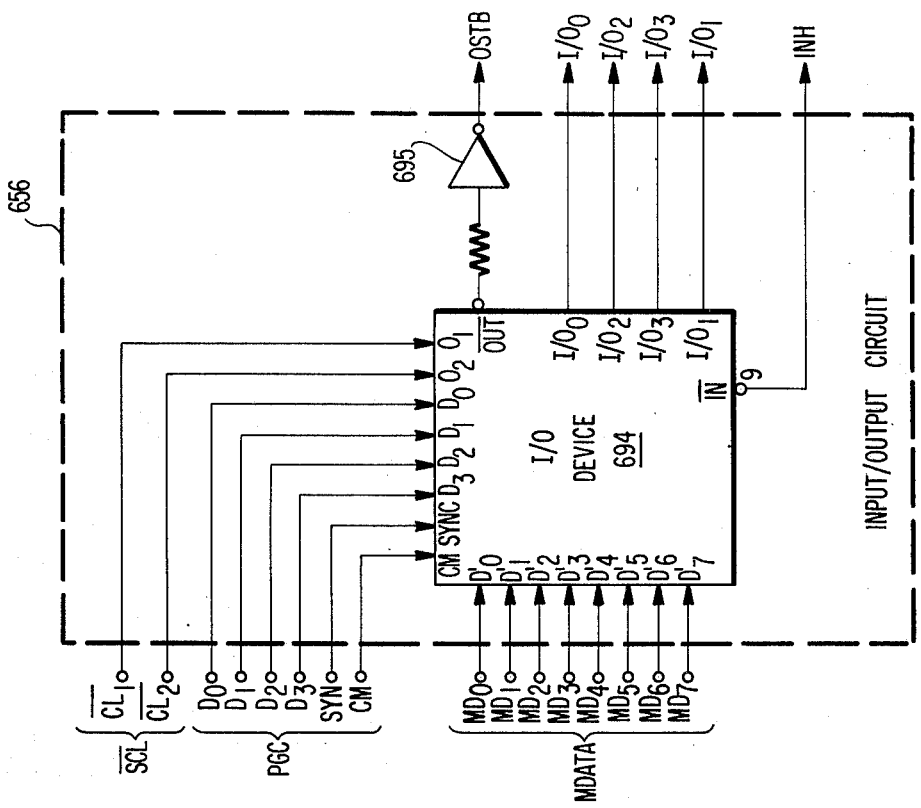
FIG. 22 is a detailed functional block diagram of the input/output circuit of FIG. 18.

One embodiment of the input/output circuit 656 of FIG. 18 is illustrated in greater detail in FIG. 22 to facilitate an understanding of the IMTS embodiment of the present invention.

Referring now to FIG. 22, the input/output circuit interfaces the read only memory 658 of FIG. 18 with the output data selection circuit 660 of FIG. 18. In the illustrated embodiment of FIG. 22, the input/output circuit preferably comprises a commercially available INTEL model 4009 I/O device connected as illustrated. Specifically, the inverted system clock signals $\overline{CL1}$ and $\overline{CL2}$ are applied to the respective C1 and C2 input signals of the I/O circuit 694 and the program control signals PGC are supplied to the like designated input terminals CM, SYNC, DO-D3 of the I/O circuit 694. The memory data signals MDO-MD7 are applied from the read only memory 658 of FIG. 18 to the respective D0-D7 data input terminals of the I/O circuit 694 and the output signals from the I/O0-I/O3 output terminals of the I/O circuit 694 are supplied as the respective I/O0-I/O3 output signals for application to the output data selection 660 of FIG. 18. The output signal from the $\overline{IN}$ output terminal of the input/output circuit 694 is supplied as the inhibit output signal INH and the output signal from the $\overline{OUT}$ terminal of the I/O device 694 is supplied through inverter 695 as the output strobe or OSTB signal.

In operation, the I/O device 694 operates under control of the data processing control circuit 652 of FIG. 18 to transfer data from the read only memory 658 of FIG. 21 to the output data selection circuit 660 of FIG. 18. In this regard, the program control signal PGC and the system clock signals $\overline{CL1}$ and $\overline{CL2}$ transfer the memory data MDATA at an appropriate time during the program as controlled by the data processing control circuit 652. The I/O data is then transferred to the output bus for use by the output circuit 614 as illustrated in FIG. 18 at the time determined by the system clock and the program control signals.

5. Output Data Selection Circuit

Figure 23:
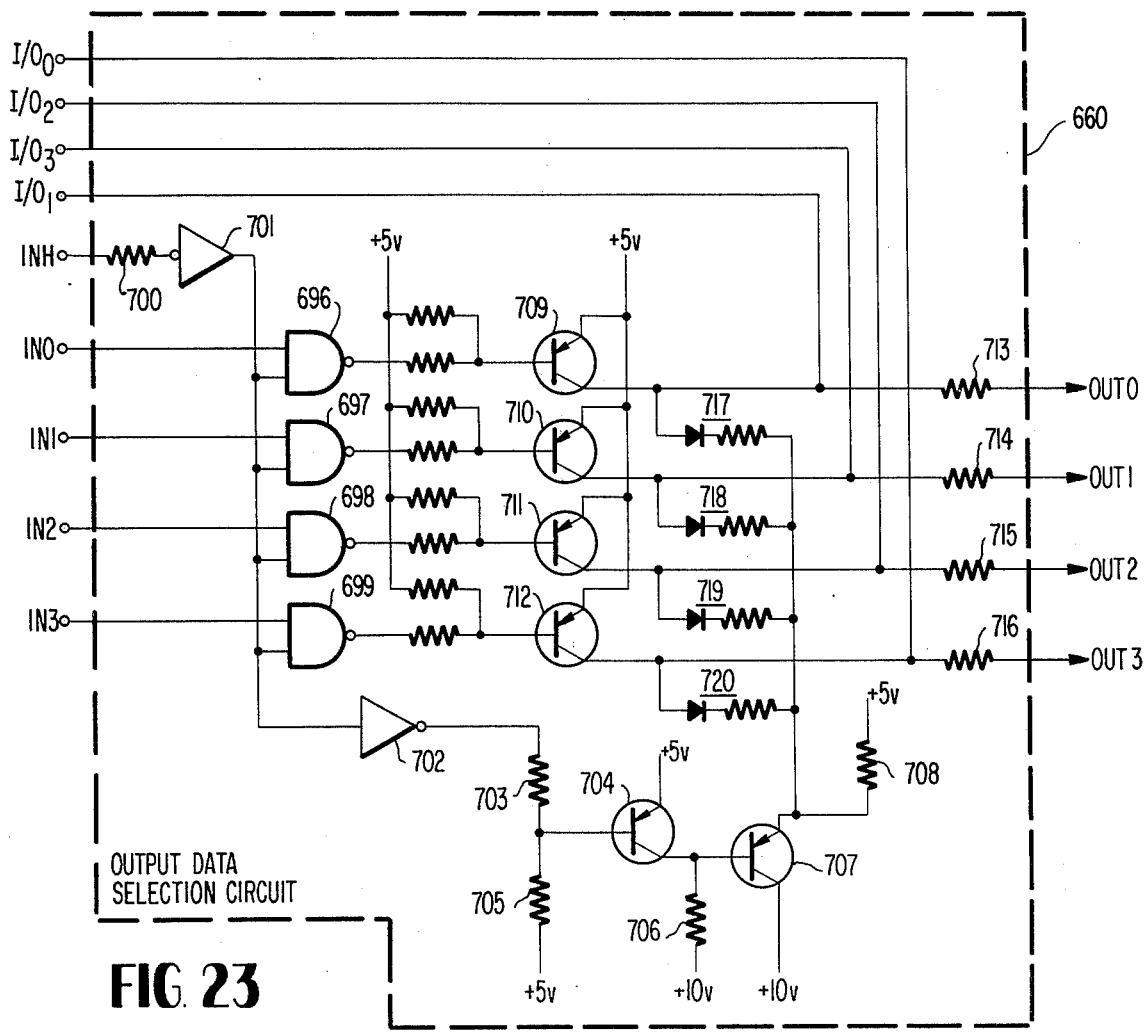
FIG. 23 is a detailed circuit diagram of the output data selection circuit of FIG. 18.

One embodiment of the output data selection circuit 660 of FIG. 18 is illustrated in greater detail in FIG. 23 to facilitate an understanding of the IMTS embodiment of the present invention.

Referring now to FIG. 23, the IN0-IN3 signals from the input circuit 610 of FIG. 18 are supplied to one input terminal of respective two input terminal NAND gates 696-699. The inhibit signal INH from the input/output circuit 656 of FIG. 18 is applied through a series resistor 7000 and an inverter 701 to the other input terminal of each of the NAND gates 696-699 and through a second inverter 702 and series resistor 703 to the base electrode of a PNP transistor 704. The base electrode of the transistor 704 may be connected through a resistor 705 to a positive 5 volt supply and the emitter electrode may be connected directly to the 5 volt supply. The collector electrode of the transistor 704 may be connected through a resistor 706 to a negative 10 volt supply and to the base electrode of a PNP transistor 707. The emitter electrode of the transistor 707 may be connected through a resistor 708 to the 5 volt supply and the collector electrode is connected to the negative 10 volt supply.

The output terminal of each of the NAND gates 696-699 is connected through a series resistor to the base electrode of respective PNP transistors 709-712 as illustrated and the base electrode of each of the transistors 709-712 is connected to the 5 volt supply through an associated resistor. The emitter electrode of each of the transistors 709-712 is connected to the 5 volt supply and the collector electrodes supply the respective output signals OUT0-OUT3 through series resistors 713-716. The I/O0-I/O3 signals from the input/output circuit 656 of FIG. 18 are connected to the respective junctions of the collector electrodes of the transistors 709-712 and resistor 713-716 as illustrated and the emitter electrodes of the transistors 709-712 are connected through associated series connected diodes and resistors as generally indicated at 717–720, respectively, to the emitter electrode of the transistor 707.

The output data selection circuit 660 operates to provide a common input/output bus between the input and data processing circuits 610 and 612 and the output circuit 614. Data from the input circuit 610 of FIG. 18, together with data from the input/output circuit 656 of FIG. 18, are supplied to the output data selection circuit 660 and provided as the output signals OUT0–OUT3 in response to the INH signal. Such circuits are well-known and may be implemented in any suitable conventional manner other than that illustrated.

C. Output Circuit

The output circuit 614 of FIG. 12 is illustrated in greater detail in FIGS. 24–27 to facilitate an understanding of the IMTS embodiment of the present invention.

Figure 24:
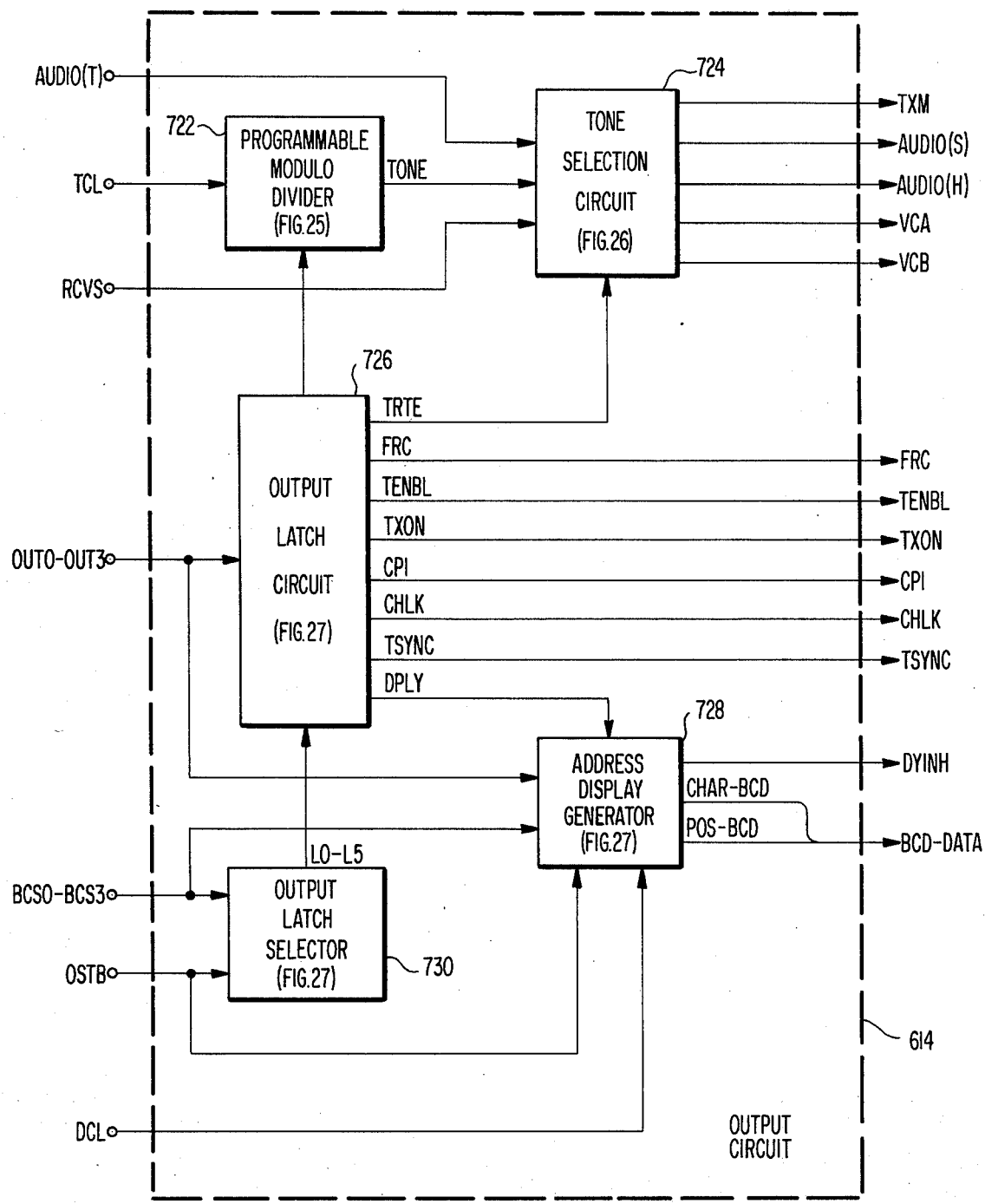
FIG. 24 is a functional block diagram of the output circuit of FIG. 12.

Referring now to FIG. 24, the tone clock signals TCL from the input circuit 610 of FIG. 12 are supplied to a programmable modulo divider 722 which provides a TONE signal to a tone selection circuit 724. The AUDIO(T) signal from the handset 606 of FIG. 12 is supplied to the tone selection circuit 724 together with the RCVS signal from the RF transceiver and frequency control unit 601 of FIG. 12. The tone selection circuit 724 supplies the transmitter modulation signal TXM, the speaker audio signal AUDIO(S), the handset audio signal AUDIO(H) and the volume control signals VCS and VCB to other subassemblies of the mobile unit as previously described.

The OUT0–OUT3 output signal from the data processing circuit 612 of FIG. 12 are supplied to an output latch circuit 726 and to an address display generator 728. The output latch circuit 726 supplies a tone select signal TSEL to the programmable modulo divider 722 and a tone routine signal TRTE to the tone selection circuit 724. The output latch circuit 726 also provides the frequency control signal FRC, the transmitter enable signal TENBL, the transmitter on signal TXON, the call-in-progress or call back signal CPI, the channel lock signal CHLK and the timing resync signal TSYNC to other subassemblies of the mobile unit as was previously described. The output latch circuit additionally supplies a display signal DPLY to the address display generator 728.

The function select address signals BCS0–BCS3 and the output strobe signal OSTB from the data processing circuit 612 of FIG. 12 are supplied to an output latch selector 730 and to the address display generator 728. The display clock signal DCL from the input circuit 610 of FIG. 12 is supplied to the address display generator 728 and the address display generator 728 provides the display inhibit signal DYINH and the BCD–DATA signals, including the character BCD signals CHAR–BCD and the position BCD signals POS–BCD, to the address diaplay 605 of FIG. 12.

In operation, the output circuit 614 of FIG. 24 provides data, control signals, tones and voice signals to other subassemblies of the mobile unit. The output circuit 614 operates under the control of the data processing circuit 612 and primarily comprises a plurality of port organized and addressed latches and interface drivers. In addition, the output circuit 614 of FIG. 24 includes analog components required for the filtering of tones and for the control and amplification of the audio to the handset and speaker.

More specifically, the output signals OUT0–OUT3 from the data processing circuit 612 of FIG. 12 actuate particular latches in the output latch circuit 726 in dependence upon the function select address signals BCS0–BCS3 supplied to the output latch selector 730. Thus, for example, the output signals OUT0–OUT3 and the function select address signals BCS0–BCS3 may indicate that a particular tone such as the GUARD tone is to be selected and transmitted. The output latch circuit thus provides a particular tone select signal TSEL to the programmable modulo divider 722 and the desired tone is selected. The tone is applied to the tone selection circuit 724 and the tone routing signal TRTE routes that particular tone to the transmitter as the TXM signal.

If, on the other hand, the tone to be transmitted is other than a signaling tone, e.g. the voice signal from the handset, then the tone select signal TSEL inhibits the generation of the TONE signal by the programmable modulo divider 722 and the tone routing signal TRTE routes the AUDIO(T) signal to the transmitter as the TXM signal. Similarly, the tone routing signal from the output latch circuit 726 routes the received signal RCVS to the speaker or the handset under the control of the signals from the data processing circuit 612 of FIG. 12.

The output signals from the data processing circuit 612 of FIG. 12 may alternately provide some other command or instruction indicative of a control function of the mobile unit. For example, the signals may command the tuning of the transceiver to a particular frequency and thus the output latch circuit 726 may provide a particular frequency control signal FRC. The TENBL, TSON, CPI, CHLK and TSYNC signals may be similarly provided in response to other commands from the data processing circuit 612 of FIG. 12.

The output signals from the data processing circuit 612 of FIG. 12 may also command the display of a particular address. In this connection, the output latch circuit 726 may be commanded to provide a particular display signal DPLY to the address display generator 728. The display clock signal DCL clocks the address display generator 728 and, in conjunction with the output strobe signal OSTB, the character and position BCD data signals CHAR–BCD and POS–BCD are supplied to the address display 605 of FIG. 12 to display the address entered by the mobile unit operator.

1. Programmable Modulo Divider

Figure 25:
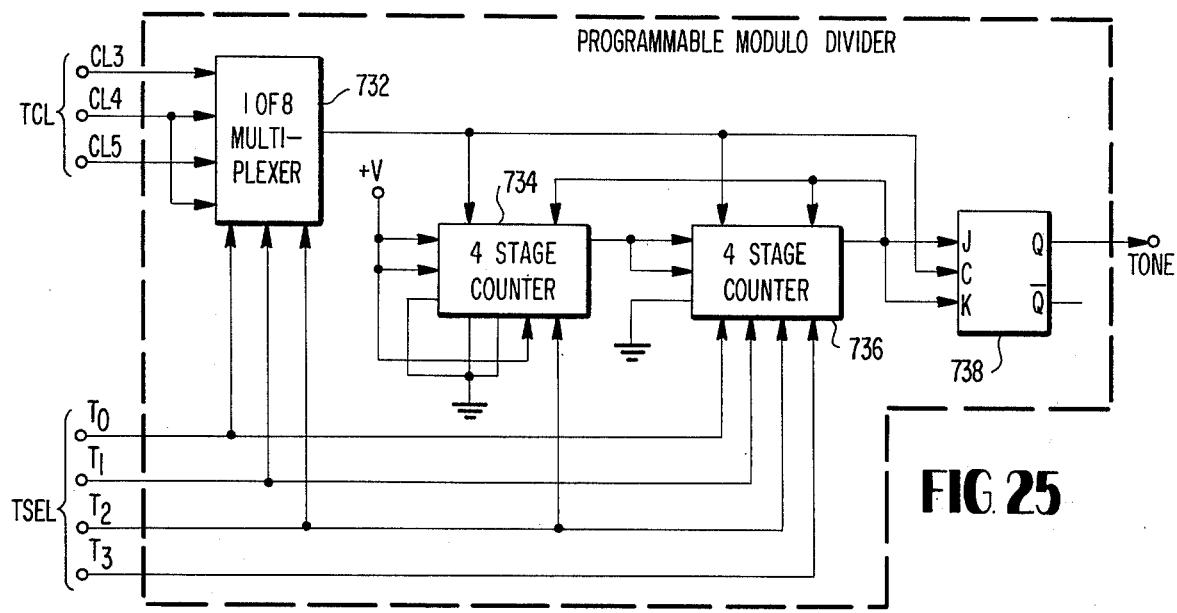
FIG. 25 is a detailed functional block diagram of the programmable modulo divider of FIG. 24.

One embodiment of the programmable modulo divider 722 of FIG. 24 is illustrated in greater detail in FIG. 25 to facilitate an understanding of the IMTS embodiment of the present invention.

Referring now to FIG. 25, the tone clock signals CL3, CL4 and CL5 are supplied from the input circuit 610 of FIG. 12 to a conventional one-of-eight multiplexer 732. The tone select signal TSEL from the output latch circuit 726 of FIG. 24 is supplied to the multiplexer 732 and the clock signal selected by the multiplexer 732 is supplied to the clock input terminals of conventional presetable four-stage counters 734 and 736. The tone select signal T2 is applied to the four-stage counter 734 and the tone select signals T0–T3 are supplied to the four-stage 736.

The four-stage counter 734 is enabled by a positive voltage V as illustrated and the output signal from the counter 734 is supplied to the input terminal of the counter 736. The output signal from the counter 736 is applied to the J and K input terminals of a conventional JK flip-flop 738 and to the preset enable input terminals of each of the counters 734 and 736. The output signal from the multiplexer 732 is applied to the clock input terminal of the flip-flop 738 and the TONE signal is supplied from the Q output terminal of the flip-flop 738.

The programmable modulo divider 722 operates to select a particular tone in the following manner. The one-of-eight multiplexer 732 first selects a particular one of the clock signals CL3–CL5 in response to the T0–T2 tone select signals. The desired tones include a 400 Hz tone, 1336 Hz tone, a 1633 Hz tone and a 2150 Hz tone. The 176 KHz clock signal CL3 is selected by the multiplexer 732 for generation of the 400 Hz tone, the 352 KHz clock signal CL4 is selected for the generation of the 1336 and 1633 Hz tones and 705 KHz clock signal CL5 is selected for the generation of the 2150 Hz tone. The four-stage counters 734 and 736 then perform programmable modulo division on the selected clock signal.

Programmable modulo division is accomplished by presetting the counters 734 and 736 to an initial count in response to the tone select signals and then clocking the counters with the selected clock signal to an on ONEs condition. When the terminal count or all ONEs condition is reached, the counters are preset to reduce the modulo from the count of 256 to the desired preset value. The flip-flop 738 is toggled to provide a further division by 2 and provide the desired output TONE signal. For the desired system tones, the following division ratios are provided by the programmable modular divider 722:

400 Hertz = (176 KHz/220)/2

1336 Hertz = (352 KHz/132)/2

1633 Hertz = (352 KHz/108)/2

2150 Hertz = (705 KHz/164)/2

The above division ratios translate to the following:
220 = 4×55 = 24 HEX

132 = 4×33 = 94 HEX

108 = 4×27 = 7C HEX

164 = 4×41 = 5FC HEX

In all of the above 8 bit or HEX notations for the various division ratios, bit zero is always a binary ZERO, bit one is always a binary ZERO, bit two is always a binary ONE, and bit three is always equal to six. Therefore, only four bits are required to select the desired modulo or division ratio. The pattern for the tone select signal is thus 4 HEX for a 400 Hz tone, 7 HEX for a 1336 Hz tone, A HEX for a 1633 Hz tone and 3 HEX for a 2150 Hz tone. Using only the three least significant bits of this pattern to select input clocks, the 4 octal selects the 176 KHz clock, the 7 and 2 octal select the 3.02KHz clock and the 3 octal selects the 705 KHz clock.

The JK flip-flop 738 produces an additional division by 2 and also restores the duty cycle of the signal to produce a square wave tone for fundamental extraction by filtering circuits in the tone selection circuit described hereinafter. Moreover, all tone generation may be halted by supplying any of the 8 HEX patterns to the one-of-eight multiplexer 732 which do not select a clock source.

2. Tone Selection Circuit

Figure 26:
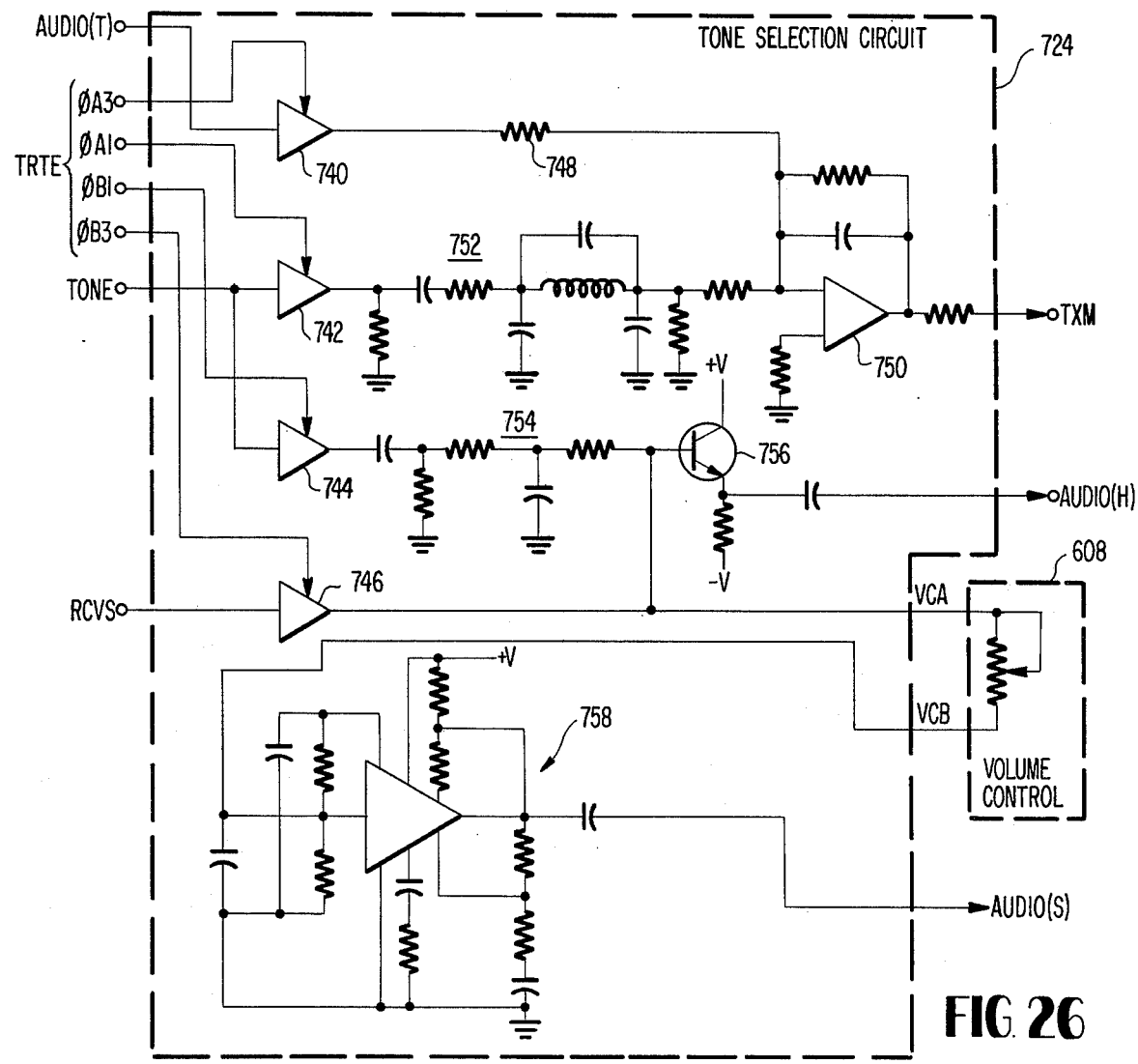
FIG. 26 is a detailed circuit diagram of the tone selection circuit of FIG. 24; and, FIG. 27 is a detailed functional block diagram of the output latch circuit, the output latch selector and the address display generator of FIG. 24.

One embodiment of the tone selection circuit 724 of FIG. 24 is illustrated in greater detail in FIG. 26 to facilitate an understanding of the IMTS embodiment of the present invention.

Referring now to FIG. 26, the AUDIO(T) signal from the handset 606 of FIG. 12 is supplied to the input terminal of a conventional gated amplifier of multiplexer 740. The TONE signal from the programmable modulo divider 722 of FIG. 24 is applied to an input terminal or each of the gated amplifiers or multiplexers 742 and 744 and the RCVS signal from the RF transceiver and frequency control unit 601 of FIG. 12 is supplied to the input terminal of a gated amplifier of multiplexer 746. The tone routing signals TRTE ($\phi$A3, $\phi$A1, $\phi$B1, $\phi$B3) are supplied to the control input terminals of the respective multiplexers 740, 742, 744 and 746.

The output from the multiplexer 740 may be applied through a series resistor 748 to the input terminal of a conventional buffer amplifier 750, the output signal from which may be provided as the transmitter modulation signal TXM. The gated tone output signals froam the multiplexers 742 and 744 are supplied through suitable conventional shaping filters generally indicated at 752 and 754 respectively, so as to provide generally sinusoidal signals in response to the square wave TONE signal. The output signal from the filter 752 is applied to the input terminal of the amplifier 750 and the output signal from the filter 754 is applied to the base electrode of a NPN drive transistor 756. The AUDIO(H) signal is supplied from the emitter electrode of the drive transistor 756 to the handset 606 of FIG. 12.

The received output signal RCVS gated by the multiplexer 746 is applied to the base electrode of the transistor 756 and is supplied as the VCA signal to the volume control-circuit 608. The amplitude controlled signal from the volume control circuit 608 is supplied as the VCB signal to a conventional amplifying and filtering circuit generally indicated 758. The output signal from the amplifying and filtering circuit 758 is supplied to the speaker 607 of FIG. 12 as the AUDIO(S).

In operation, the AUDIO(T) signal from the handset, together with the TONE signal from the module divider and the received signal RCVS from the transceiver are applied to the multiplexers 740–746. The tone routing signal TRTE from the output latch circuit 726 of FIG. 24 enables one of the multiplexers 740–746 to select one of these three input signals. The audio signal from the handset, if selected, is supplied to the transmitter as the TXM signal. Similarly, if the TONE selected is a control signal requiring transmission to the central station, the multiplexer 742 is enabled and the tone signal is filtered by the filter 752 and applied to the transmitter as the TXM signal. If the tone signal is a supervisory tone for the mobile unit operator, e.g. a busy tone, then the multiplexer 744 is enabled and the tone signal is filtered and supplied to the handset as the AUDIO(H) signal. If a call has been established, the RCVS signal is routed through the multiplexer 746 to both the handset and, in the illustrated embodiment, through the volume control 608 to the speaker.

In this connection, the volume control may be provided with an on/off switch to turn the speaker off when the operator does not wish to receive audio via the speaker. for convenience, the on/off switch may be slaved to the hookswitch so that the speaker is inhibited when the handset is removed from the bookswitch.

3. Output Latch Circuit-Output Latch Selector-Address Display Generator

Figure 27:
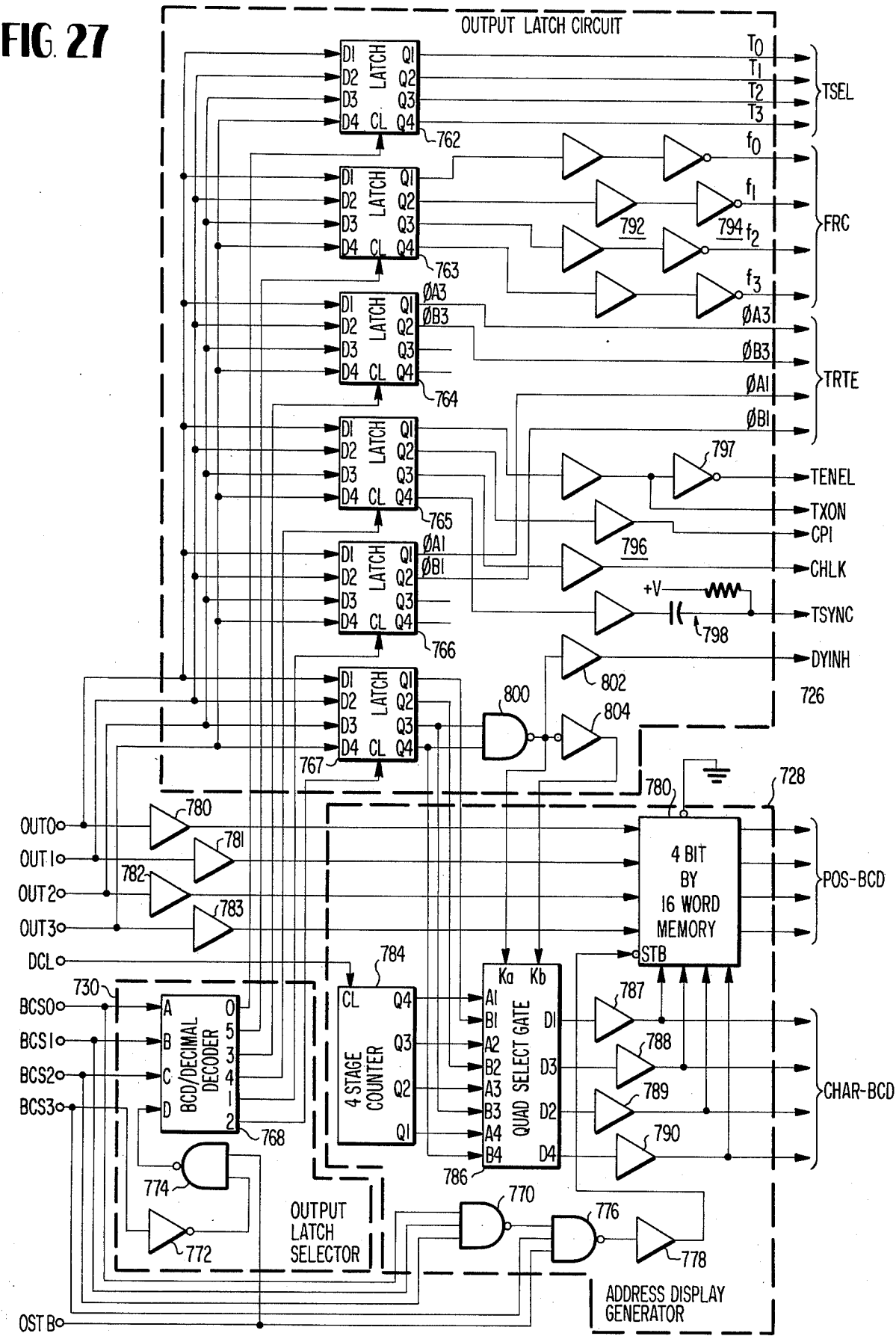

One embodiment of the output latch circuit 726, the address display generator 728 and the output latch selector 730 of FIG. 24 is illustrated in greater detail in FIG. 27 to facilitate an understanding of the IMTS embodiment of the present invention.

Referring now to FIG. 27, the output signals OUT-0–OUT3 from the data processing circuit 612 of FIG. 12 are supplied to the respective input terminals D1–D4 of each of a plurality of clocked latches 762–767. The latches 762–767 may be, for example, quad clocked D latches commercially available from Radio Corporation of America under the model designation CD4042A.

The function select address signals BCS0–BCS2 from the data processing circuit 612 of FIG. 12 are supplied to the respective A, B and C input terminals of a conventional BCD/decimal decoder 768 and to the input terminals of a conventional three input terminal NAND gate 770. The BCS3 signal is applied through an inverter 772 to one input terminal of a conventional two input terminal NAND gate 774, the output terminal of which is connected to the D input terminal of the decoder 768. The BCS3 signal is also supplied to one input terminal of a three input terminal NAND gate 776 and the output strobe signal OSTB from the data processing circuit 612 of FIG. 12 is supplied to another input terminal of the NAND gate 776. The output signal from the NAND gate 770 is applied to the third input terminal of the NAND gate 776 and the output signal from the NAND gate 776 is applied through a suitable conventional buffer amplifier 778 to the strobe input terminal STB of a conventional 4 bit by 16 word memory 780.

The OUT0–OUT3 signals from the data processing circuit 612 of FIG. 12 are applied through conventional buffer amplifiers 780–783 to four of the address lines of the memory 780. The display clock signal DCL from the input circuit 610 of FIG. 122 is applied to the clock input terminal of a four-stage counter 784. The output signals from the Q4, Q3, Q2 and Q1 output terminals of the counter 784 are applied to the respective A1, A2, A3 and A4 input terminals of a conventional quad AND/OR select gate 786 such as those previously described. The output signals from the D1, D3, D2 and D4 output terminals of the quad AND/OR select gate 786 are supplied through respective buffer amplifiers 787–790 to four of the address lines of the memory 780. The signals from the buffer amplifiers 787–790 are also supplied as the CHAR–BCD output signal of the address display generator.

The output latch selector 730 supplied a latch selection signal to each of the latches of the output latch circuit 726. In this regard, the respective 0, 5, 3, 4, 1 and 2 output terminals os the BCD/decimal decoder 768 are connected to the clock input terminald DL of the respective latches 762, 767. The output signals from the Q1–Q4 output terminals of the latch 762 are supplied as the T0–T3 tone select signals TSEL for application to the programmable modulo divider 722 of FIG. 24. The output signals from the respective Q1–Q4 output terminals of the latch 763 are supplied through buffers generally indicated at 792 and inverters generally indicated at 794 to provide the $f0$–$f3$ frequency control signals FRC for use in tuning the RF transceiver and frequency control unit 601 of FIG. 12.

The latches 764 and 767 provide, froam the respective Q1 and Q2 output terminals thereof, the tone routing signals 0A3, 0B3, 0A1, 0B1. The output signals from the Q1–Q4 output terminals of the latch 765 are supplied through buffers generally indicated at 796 as the respective TXON, CPI, CHLK and TSYNC signals. The TXON signal is also inverted through an inverter 797 to provide the TENBL signal. A pulse forming circuit generally indicated at 798 insures that the timing resynchronization signal TSYNC is a short duration pulse.

The output signals from the Q1–A4 output terminals of the latch 767 are supplied to the respective B1–B4 input terminals of the quad AND/OR select gate 786. The output signals from the Q3 and Q4 output terminals of the latch 767 are applied to the input terminals of a two input terminal NAND gate 800. The output signal from the NAND gate 800 is supplied through a buffer amplifier 802 as the display inhibit or DYINH output signal of the output latch circuit 726. The output signal from the NAND gate 800 is also applied to the K$a$ input terminal of the quad AND/OR select gate 786 and is inverted through an inverter 804 and applied to the k$b$ input terminal of the gate 786.

In operation, the signals OUT0–OUT3 are supplied to each of the latch circuits 762–767. The BCS$o$–BCS3 function select address signals are decoded by the BCD/decimal decoder 768 to provide latch selection signals and the output signals OUT0–OUT3 are clocked into the latch designated by the latch selection signals, i.e. the latch selected by the function select address signals.

As was previously mentioned, the output latch circuit 726 is a port organized and addressed latch and interface driver circuit. Each of the latches 762–767 may be viewed as an output port with output signals having preassigned functions and connected to all other output devices such as the panel indicators, the transmitter, the frequency synthesizer, the display, the handset and the speaker. Specific port assignments for the output signals in the illustrated embodiment are:

Port0-Tone Selection-Latch 762
Port1-Tone Routing-Latch 766
Port2-Display Address-Latch 767
Port3-Audio (headset, speaker)-Latch 764
Port4-Front Panel Indicators and Timer Resync-Latch 765
Port5-Synthesizer Control-Latch 763

In addition, the address display generator 728 may also be viewed as an output port for the display data.

The functions performed by the signals from the various latches may be briefly described as follows. Port0 (latch 762) supplies the tone select signals TSEL which control tone generation by the programmable modulo divider 722 of FIG. 24 as was previously described. Port1 (latch 766) provides signals for selection of the tones generated by the programmable modulo divider 722 by the tone selection circuit 724 of FIG. 24. Specifically, bit 0 when set routes synthesized tones to the modulator of the transceiver. Bit 1 routes synthesized tones to the earphone and speaker. Clearing these bits inhibits the corresponding function.

Similarly, Port 3 controls the application of audio signals to the headset and speaker. When bit 0 of Port3 is set, the handset microphone is connected to the modulator of the transceiver. Bit 1 of Port3, when, set, connects received audio from the transceiver to the earphone and speaker. Clearing these bits inhibits the corresponding functions.

Port2 (latch 767) operates in conjunction with the address display generator 729 to control the display and the display memory 780. If the contents of Port2 are any of the digits O through B HEX, the display is turned off and the display memory 780 is prepared to accept new display data for the corresponding digit position, with only the first ten positions being significant. To activate the display, Port2 must contain either a HEX C, D, E or F.

Port4 (latch 765) has 4 bit positions which control four independent functions. Bit 0 controls the transmitter on control line TENBL to the transceiver and also the transmit indicator TXON on the control head input output panel 602 of FIG. 12. A binary ONE in bit 0 position of port 4 is equivalent to transmitter on. Bit 1 operates the call back indicator CPI on the control head with a binary ONE (set condition) in that position equivalent to indicator on. Bit 2 operators the channel lock indicator (CHLK) on the control head input/output panel 602 of FIG. 12 with a binary ONE in that position equivalent to channel lock indicator on. Bit 3 resets the elapsed time counter of the input circuit 610 (timing resync). To protect the elapsed time counter the signal is differentiated to prohibit a continuous reset, Port5 (latch 765) controls the frequency synthesizer and the RF transceiver and frequency control unit 601 of FIG. 12. The 4 bit code placed in the latch 763 indicates a particular frequency to which the transceiver is to be tuned.

The address diaplay generator 728 provides display data and operates in conjunction with Port2 (latch 767). The address display generator 728 provides the actual BCD character to be displayed and the position of that character. The address display generator 728 is refreshed or framed at a rate set by the incoming display clock signal DCL. The framing rate is preferably about 1 kilohertz or 100 frames per second so that any disconible flicker of the display is precluded.

The present invention may be embodied in other specific forms without departing from the spirit or essential characteristics thereof. The presently disclosed exemplary embodiments are thereof to be considered in all respects as illustrative annd not restrictive, the scope of the invention being indicated by the appended claims rather than by the foregoing description, and all changes which come within the meaning and range of equivalency of the claims are therefore intended to be embraced therein.

What is claimed is:

1. A mobile telephone unit comprising:
    first storing means for storing aan address signal representing a telephone system subscriber;
    means for displaying the stored address signal;
    a manually depressable call switch for generating a call initiation signal;
    second stroring means for storing said generated call initiation signal;
    means for selecting one of a predetermined plurality of communication channels for broadcast of a call-up signal;
    means for generating a call enabling signal in response to the selection of said one communication channel;
    means for broadcasting a call-up signal including said stored address signal over the selected one of the plurality of communication channels in response to the simultaneous presence of both said call initiation signal generated through the manual depression of said call switch and said call enabling signal generated in response to the selection of said one channel;
    means for receiving a response signal acknowledging said call-up signal for automatically indicating receipt of said response signal; and
    means including a handset removably cooperable with a hook-switch independent of said manually depressable call switch for establishing two-way voice communication over a two-way communication channel in response to removal of said handset from cooperating relationship with said hook-switch, whereby a call may be initiated and acknowledged without removing the handset from the hook-switch.

2. The mobile telephone unit of claim 1 including means independent of said handset and hook-switch for clearing said first storing means.

3. The mobile telephone unit of claim 1 wherein said first storing means is operable to retain the last stored address signal for initiating the broadcast of subsequent call-up signals.

4. The mobile telephone unit of claim 2 wherein said first storing means is operable to retain the last stored address signal for initiating the broadcast of subsequent call-up signals.

5. The moblile telephone unit of claim 3 wherein said receiving and indicating means includes means independent of said handset and hook-switch for providing an audible indication of the receipt of said response signal.

6. The mobile telephone unit of claim 1 including means for visually indicating the selection of said one channel.

7. The mobile telephone unit of claim 1 wherein said channel selecting means comprises:
    means for detecting and recognizing a predetermined code pattern in a signal received over said plurality of communication channels;
    means for detecting the said level of the received signal; and,
    means for selecting said one channel in response to the recognition of said code pattern and is response to a detected level of said received signal.

8. The mobile telephone unit of claim 7 wherein said first storing means is operable to retain the last stored address signal for initiating the broadcast of subsequent call-up signals.

9. The mobile telephone unit of claim 8 wherein said receiving and indicating means includes means independent of said handset and hook-switch for providing an audible indication of the receipt of said response signal.

10. The mobile telephone unit of claim 8 including means independent of said handset and hook-switch for clearing said first storing means.

11. The mobile telephone unit of claim 7 including means for visually indicating the selection of said one channel.

12. The mobile telephone unit of claim 1 wherein said broadcasting means includes a wave energy transmitter and wherein said receiving and indicating means include means for receiving a call terminate signal indicating the termination of an established call, and means for deenergizing said wave energy transmitter in response to receipt of said call terminate signal.

13. The mobile telephone unit of claim 1 including:
means for receiving and detecting an address signal assigned to the mobile telephone unit;
means for providing an audible indication of receipt and detection of said assigned address signal; and,
means for providing and holding a visual indication of receipt and detection of said assigned address signal in response to a continued cooperating relationship of said handset with said hook-switch for a predetermined period of time after initiation of said audible indication.

14. The mobile telephone unit of claim 13 wherein said mobile unit is carried in a vehicle and wherein said indication providing means includes means independent of said handset and said hook switch for providing, outside said vehicle, an audible indication of receipt and detection of said assigned address signal.

15. The mobile telephone unit of claim 1 wherein said receiving and indicating means includes means independent of said handset and hook-switch for providing an audible indication of the receipt of said response signal.

16. The mobile telephone unit of claim 1 wherein said broadcast initiating means includes means for generating a series of alternating tone signals of different frequencies.

17. The mobile telephone unit of claim 1 wherein said receiving and indicating means includes:
means for generating a regularly interrupted tone signal of a predetermined frequency; and,
means for providing an audible indication in response to said interrupted tone signal.

18. A mobile telephone unit comprising:
means for storing a first address signal representing a telephone system subscriber:
means for displaying the stored address signal;
means for storing a plurality of address signals each representing a seven digit number of a plurality of different telephone system subscribers;
means including a single, manually depressable switch associated with each of said plurality of stored address signals for selectively transferring any one of said plurality of address signals from said last-mentioned storing means to said first-mentioned storing means;
a manually depressable switch for generating a call initiation signal;
means for selecting one of a predetermined plurality of communication channels for broadcast of a call-up signal;
means for generating a call enabling signal in response to the selection of said one communication channel;
means for broadcasting a call-up signal including said stored first address signal in response to the generation of both said all initiation signal and said call enabling signal;
means for receiving a response signal acknowledging said call-up signal; and,
means for automatically indicating receipt of said response signal.

19. The mobile unit of claim 18 including:
transceiver means for transmitting and receiving wave energy; and,
means for selectively tuning said transceiver means to respective frequencies of a dual frequency communication channel in response to said received response signal.

20. The mobile telephone unit of claim 18 wherein said receiving and indication means includes means independent of said handset and hook-switch for providing an audible indication of the receipt of said response signal.

21. The mobile telephone unit of claim 18 wherein said broadcast initiating means includes means for generating a series of alternating tone signals of different frequencies.

22. A method of initiating and establishing two-way communications between two telephone system subscribers from a mobile radio-telephone having a handset in removable cooperable engagement with a hook-switch, the method comprising the steps of:
storing an address signal representing a called telephone system subscriber;
displaying the stored address signal for visual verification of the address signal;
selecting one of a predetermined plurality of communication channels for broadcast of a call-up signal and generating a call enabling signal when said one channel has been selected;
manually depressing a call switch to generate and store a call initiation signal while retaining the handset in engagement with the hook-switch;
broadcasting a call-up signal including the stored address signal in response to the generation of both the call initiation signal and the call enabling signal;
receiving a response signal acknowledging the call-up signal; and,
automatically indicating receipt of the response signal to indicate the establishment of a communication link with the called telphone system subscriber with the handset in engagement with the hook-switch.

23. The method of claim 22 including the steps of:
verifying that the displayed address signal is in error; and,
storing and displaying a new address signal prior to manually depressing the call switch.

24. A mobile telephone unit for two-way communication over communications channels comprising:
means for generating a call-up signal including an address signal representing a called telephone system subscriber; and,
means for detecting the availability of a designated one of the communication channels for transmission of the call-up signal;
means for generating and storing a call initiation signal;
means for initiating the transmission of said call-up signal over the designated one of the communication channels in response to the simultaneous detection of the availability of the designated channel and the presence of the stored call initiation signal;
said transmission initiating means being operable to initiate the transmission of said call-up signal repetitively, said transmission initiating means including means for effecting the transmission of said call-up signal a random time interval after initiation of transmission by said initiating means and introducing a random time delay between successive repeated transmissions of said call-up signal.

25. The mobile telephone unit of claim 24 wherein said random time delay introducing means comprises:
means for randomly generating a number representing a random time delay;
means for delaying the transmission of said call-up signal by a time interval related in value to said randomly generated number.

26. The mobile telephone unit of claim 24 including means for receiving a response signal indicative of receipt of the transmitted call-up signal at a central location, said transmission initiating means being rendered inoperable in response to the receipt of said response signal by said receiving means.

27. The mobile telephone unit of claim 26 wherein said random time delay introducing means is responsive to lack of receipt of said response signal by said receiving means to introduce said random time delay between successive transmission of said call-up signal.

28. The mobile telephone unit of claim 24 including means for receiving a response signal indicative of receipt of the transmitted call-up signal at a central location, said random time delay introducing means being responsive to lack of receipt of said response signal by said receiving means to introduce said random time delay between successive transmissions of said call-up signal.

29. A method for transmitting data from a mobile telephone unit to a central control unit over a designated signaling channel, comprising the steps of:
generating a call-up signal including an address signal representing a called subscriber;
detecting the availability of the designated signaling channel for transmission of the call-up signal;
generating and storing a call initiation signal;
transmitting the call-up signal a first time to the central control unit over the designated signaling channel a random time interval after the simultaneous detection of the availability of the designated signaling channel and the presence of the stored call initiation signal; and,
transmitting the call-up signal a second time subsequent to the first time to the central control unit over the designated signaling channel, the interval between the first and second transmissions of the call-up signal including a random time delay.

30. A mobile telephone unit comprising:
first storing means for storing an address signal representing a telephone system subscriber;
means for displaying the stored address signal;
a manually depressable call switch for generating a call initiation signal;
means for selecting one of a predetermined plurality of communication channels for broadcast of said call-up signal including means for detecting and recognizing a predetermined code pattern in a signal received over said plurality of communication channels, means for detecting the said level of the received signal, and means for selecting said one channel in response to the recognition of said code pattern and in response to a detected level of said received signal;
means for generating a call enabling signal in response to the selection of said one communication channel;
means for initiating the broadcast of a call-up signal including said stored address signal over the selected one of the plurality of communication channels in response to the generation of both said all initiation signal generated through the manual depression of said call switch and said call enabling signal generated in response to the selection of said one channel;
means for receiving a response signal acknowledging said call-up signal and for automatically indicating receipt of said response signal; and
means including a handset removably cooperable with a hook-switch independent of said manually depressable call switch for establishing two-way voice communication over a two-way communication channel in response to removal of said handset from cooperating relationship with said hook-switch, whereby a call may be initiated and acknowledged without removing the handset from the hook-swtich.

31. The mobile telephone unit of claim 30 wherein said first storing means is operable to retain the last stored address signal for initiating the broadast of subsequent call-up signals.

32. The mobile telephone unit of claim 31 wherein said receiving and indication means includes means independent of said handset and hook-switch for providing an audible indication of the receipt of said response signal.

33. The mobile telephone unit of claim 31 including means independent of said handset and hook-swtich for clearing said first storing means.

34. The mobile telephone unit of laim 30 including means for visually indicating the selection of said one channel.

35. The mobile telephone unit of claim 30 wherein said broadcasting means includes a wave energy transmitter and wherein said receiving and indicating means include means for receiving a call terminate signal indicating the termination of an established call, and means for deenergizing said wave energy transmitter in response to receipt of said call terminate signal.

36. The mobile telephone unit of claim 30 including:
means for receiving and detecting an address signal assigned to the mobile telephone unit;
means for providing an audible indication of receipt and detection of said assigned address signal; and,
means for providing and holding a visual indication of receipt and detection of said assigned address signal in response to a continued cooperating relationship of said handset with said hook-switch for a predetermined period of time after initiation of said audible indication.

37. The mobile telephone unit of claim 36 wherein said mobile unit is carried in a vehicle and wherein said indication providing means includes means independent of said handset and said hook-switch for providing, outside said vehicle, and audible indication of receipt and detection of said assigned address signal.

38. The mobile telephone unit of claim 30 wherein said receiving and indicating means includes means independent of said handset and hook-switch for providing an audible indication of the receipt of said response signal.

39. The mobile telephone unit of claim 30 wherein said broadcast initiating means includes means for generating a series of alternating tone signals of different frequencies.

* * * * *